US011481100B2

(12) United States Patent
Lyons et al.

(10) Patent No.: US 11,481,100 B2
(45) Date of Patent: Oct. 25, 2022

(54) USER INTERFACES FOR A COMPASS APPLICATION

(71) Applicant: Apple Inc., Cupertino, CA (US)

(72) Inventors: Rich Lyons, San Francisco, CA (US);
Aurelio Guzman, San Jose, CA (US);
Matthew J. Sundstrom, Campbell, CA (US); Christopher Wilson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 324 days.

(21) Appl. No.: 16/737,044

(22) Filed: Jan. 8, 2020

(65) Prior Publication Data

US 2020/0408521 A1    Dec. 31, 2020

Related U.S. Application Data

(60) Provisional application No. 62/866,569, filed on Jun. 25, 2019.

(51) Int. Cl.
*G06F 3/04847*    (2022.01)
*H04W 4/02*    (2018.01)
(Continued)

(52) U.S. Cl.
CPC ......... *G06F 3/04847* (2013.01); *G01C 21/20* (2013.01); *G06F 1/163* (2013.01);
(Continued)

(58) Field of Classification Search
None
See application file for complete search history.

(56) References Cited

U.S. PATENT DOCUMENTS

| 7,113,451 B1 * | 9/2006 | Matthey | G01C 17/30 |
| | | | 33/355 R |
| 9,021,709 B2 * | 5/2015 | Oliver | G01C 17/38 |
| | | | 33/356 |

(Continued)

FOREIGN PATENT DOCUMENTS

| JP | 2017-54256 A | 3/2017 |
| WO | 2016/140705 A1 | 9/2016 |

OTHER PUBLICATIONS

International Search Report and Written Opinion received for PCT Patent Application No. PCT/US2020/025682, dated Jul. 7, 2020, 13 pages.

(Continued)

*Primary Examiner* — Stella Higgs
(74) *Attorney, Agent, or Firm* — Dentons US LLP

(57) ABSTRACT

An electronic device displays a compass user interface with a direction indicator and a bearing indicator. The direction indicator provides an indication of a respective compass direction, wherein the appearance of the direction indicator is determined based on the orientation of the electronic device relative to the respective compass direction. The bearing indicator provides an indication of an offset from the respective compass direction. While displaying the bearing indicator, the electronic device detects rotation of the rotatable input mechanism and, in response, changes the displayed position of the bearing indicator from a first position to a second position by an amount that is determined in accordance with a magnitude of the rotation of the rotatable input mechanism.

51 Claims, 39 Drawing Sheets

(51) Int. Cl.
    *G06F 1/16*         (2006.01)
    *G06F 3/0488*     (2022.01)
    *G01C 21/20*      (2006.01)
    *G06F 3/0362*     (2013.01)

(52) U.S. Cl.
    CPC .......... *G06F 3/0362* (2013.01); *G06F 3/0488* (2013.01); *H04W 4/026* (2013.01)

(56) References Cited

U.S. PATENT DOCUMENTS

| | | | |
|---|---|---|---|
| 10,684,140 B2* | 6/2020 | Annen | G08B 31/00 |
| 2004/0233788 A1 | 11/2004 | Plancon et al. | |
| 2007/0211042 A1* | 9/2007 | Kim | G06F 1/163 |
| | | | 345/184 |
| 2008/0151697 A1* | 6/2008 | Giauque | G04B 47/065 |
| | | | 368/14 |
| 2008/0172174 A1 | 7/2008 | Okeya | |
| 2009/0015514 A1* | 1/2009 | Suzuki | B63C 11/02 |
| | | | 345/3.1 |
| 2015/0094951 A1* | 4/2015 | Gepner | G04G 21/02 |
| | | | 701/487 |
| 2017/0010127 A1* | 1/2017 | Annen | G08B 3/10 |
| 2017/0082983 A1* | 3/2017 | Katzer | G04B 19/048 |

OTHER PUBLICATIONS

Symons Mick, "How to use the Compass on iPhone", Available online at: https://www.imore.com/compass-app, Sep. 1, 2016, 9 pages.

International Preliminary Report on Patentability received for PCT Patent Application No. PCT/US2020/025682, dated Jan. 6, 2022, 9 pages.

* cited by examiner

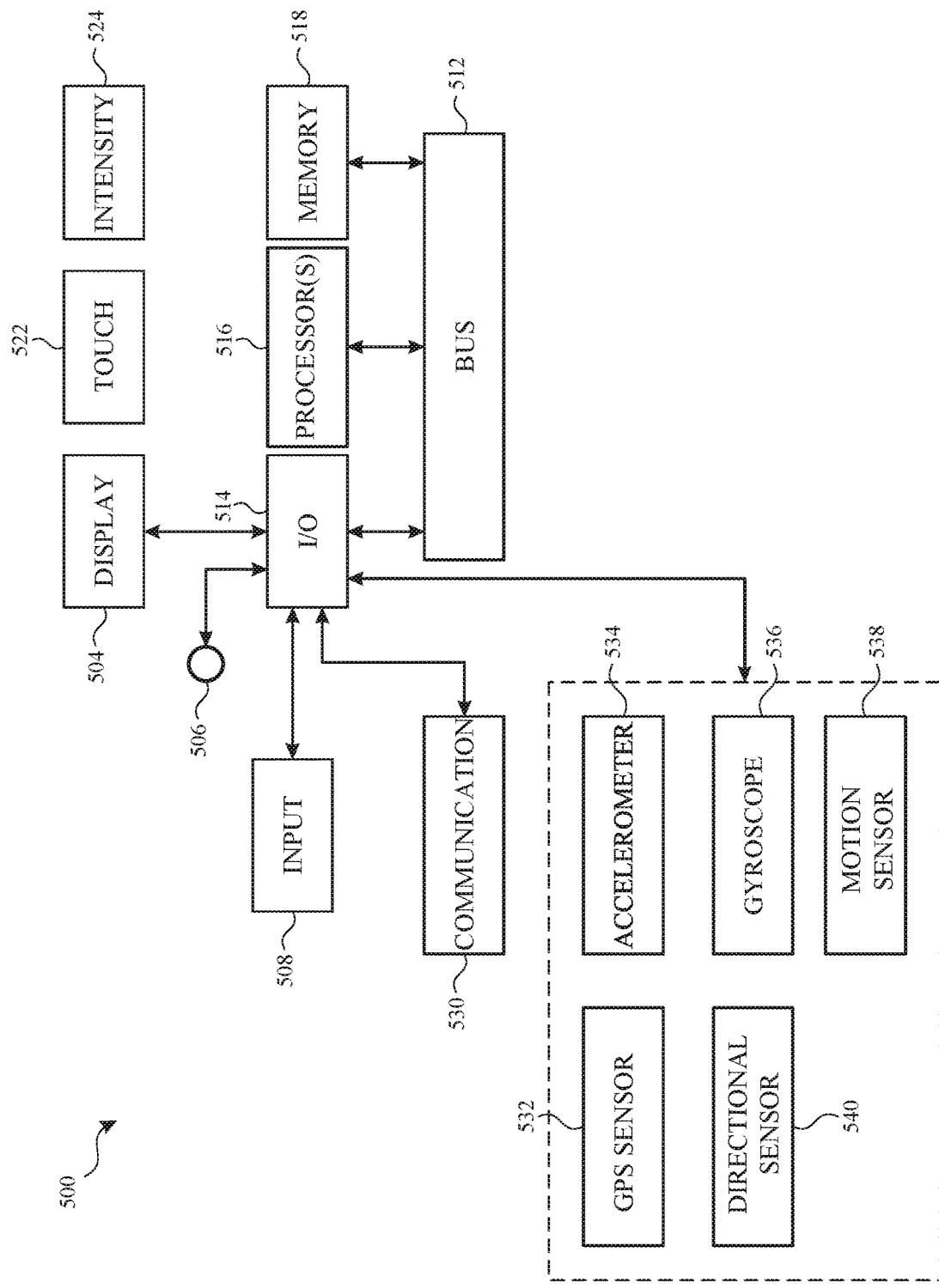

700 ↘

┌─────────────────────────────────────────────────────────────────────────┐
│ 702                                                                     │
│ Display, via the display device, a compass user interface with a direction indicator and a bearing │
│ indicator.                                                              │
└─────────────────────────────────────────────────────────────────────────┘
                                    ↓
┌─────────────────────────────────────────────────────────────────────────┐
│ 704                                                                     │
│ While displaying the bearing indicator, detect rotation of the rotatable input mechanism. │
└─────────────────────────────────────────────────────────────────────────┘
                                    ↓
┌─────────────────────────────────────────────────────────────────────────┐
│ 706                                                                     │
│ In response to detecting rotation of the rotatable input mechanism:     │
│                                                                         │
│ ┌─────────────────────────────────────────────────────────────────────┐ │
│ │ 708                                                                 │ │
│ │ Change the displayed position of the bearing indicator from a first position to a second position │ │
│ │ by an amount that is determined in accordance with a magnitude of the rotation of the rotatable │ │
│ │ input mechanism.                                                    │ │
│ └─────────────────────────────────────────────────────────────────────┘ │
└─────────────────────────────────────────────────────────────────────────┘
                                    ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  710
│ Display, via the display device, a third compass user interface with the direction indicator and the │
  bearing indicator, wherein a visual appearance of the bearing indicator changes as the orientation of the
│ electronic device changes.                                              │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

*FIG. 7*

USER INTERFACES FOR A COMPASS APPLICATION

CROSS-REFERENCE TO RELATED APPLICATIONS

This application claims priority to U.S. Provisional Patent Application Ser. No. 62/866,569, titled "USER INTERFACES FOR A COMPASS APPLICATION," filed Jun. 25, 2019, the content of which is hereby incorporated by reference in its entirety.

FIELD

The present disclosure relates generally to computer user interfaces, and more specifically to techniques for providing compass application features.

BACKGROUND

A compass can be used to guide a user with navigating a physical environment. Some electronic devices provide compass application features to assist with such navigation.

BRIEF SUMMARY

Some techniques for providing compass application features using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for providing compass application features. Such methods and interfaces optionally complement or replace other methods for providing compass application features. Such methods and interfaces reduce the cognitive burden on a user and produce a more efficient human-machine interface. For battery-operated computing devices, such methods and interfaces conserve power and increase the time between battery charges.

In some embodiments, a method comprises: at an electronic device with a display device and a rotatable input mechanism: displaying, via the display device, a compass user interface with a direction indicator and a bearing indicator, wherein: the direction indicator provides an indication of a respective compass direction, wherein the appearance of the direction indicator is determined based on the orientation of the electronic device relative to the respective compass direction; and the bearing indicator provides an indication of an offset from the respective compass direction; while displaying the bearing indicator, detecting rotation of the rotatable input mechanism; and in response to detecting rotation of the rotatable input mechanism, changing the displayed position of the bearing indicator from a first position to a second position by an amount that is determined in accordance with a magnitude of the rotation of the rotatable input mechanism.

In some embodiments, a non-transitory computer-readable storage medium stores one or more programs configured to be executed by one or more processors of an electronic device with a display device and a rotatable input mechanism, the one or more programs including instructions for: displaying, via the display device, a compass user interface with a direction indicator and a bearing indicator, wherein: the direction indicator provides an indication of a respective compass direction, wherein the appearance of the direction indicator is determined based on the orientation of the electronic device relative to the respective compass direction; and the bearing indicator provides an indication of an offset from the respective compass direction; while displaying the bearing indicator, detecting rotation of the rotatable input mechanism; and in response to detecting rotation of the rotatable input mechanism, changing the displayed position of the bearing indicator from a first position to a second position by an amount that is determined in accordance with a magnitude of the rotation of the rotatable input mechanism.

In some embodiments, a transitory computer-readable storage medium stores one or more programs configured to be executed by one or more processors of an electronic device with a display device and a rotatable input mechanism, the one or more programs including instructions for: displaying, via the display device, a compass user interface with a direction indicator and a bearing indicator, wherein: the direction indicator provides an indication of a respective compass direction, wherein the appearance of the direction indicator is determined based on the orientation of the electronic device relative to the respective compass direction; and the bearing indicator provides an indication of an offset from the respective compass direction; while displaying the bearing indicator, detecting rotation of the rotatable input mechanism; and in response to detecting rotation of the rotatable input mechanism, changing the displayed position of the bearing indicator from a first position to a second position by an amount that is determined in accordance with a magnitude of the rotation of the rotatable input mechanism.

In some embodiments, an electronic device comprises: a display device; a rotatable input mechanism; one or more processors; and memory storing one or more programs configured to be executed by the one or more processors, the one or more programs including instructions for: displaying, via the display device, a compass user interface with a direction indicator and a bearing indicator, wherein: the direction indicator provides an indication of a respective compass direction, wherein the appearance of the direction indicator is determined based on the orientation of the electronic device relative to the respective compass direction; and the bearing indicator provides an indication of an offset from the respective compass direction; while displaying the bearing indicator, detecting rotation of the rotatable input mechanism; and in response to detecting rotation of the rotatable input mechanism, changing the displayed position of the bearing indicator from a first position to a second position by an amount that is determined in accordance with a magnitude of the rotation of the rotatable input mechanism.

In some embodiments, an electronic device comprises: a display device; a rotatable input mechanism; means for displaying, via the display device, a compass user interface with a direction indicator and a bearing indicator, wherein: the direction indicator provides an indication of a respective compass direction, wherein the appearance of the direction indicator is determined based on the orientation of the electronic device relative to the respective compass direction; and the bearing indicator provides an indication of an offset from the respective compass direction; means, while displaying the bearing indicator, for detecting rotation of the rotatable input mechanism; and means, in response to detecting rotation of the rotatable input mechanism, for changing the displayed position of the bearing indicator from a first position to a second position by an amount that is determined in accordance with a magnitude of the rotation of the rotatable input mechanism.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing compass application features, thereby increasing the effectiveness, efficiency, and user satisfaction with such devices. Such methods and interfaces may complement or replace other methods for providing compass application features.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 5B is a block diagram illustrating a personal electronic device in accordance with some embodiments.

FIG. 7 is a flow diagram illustrating an exemplary process for a compass application, in accordance with some embodiments.

DESCRIPTION OF EMBODIMENTS

Figure 1A:
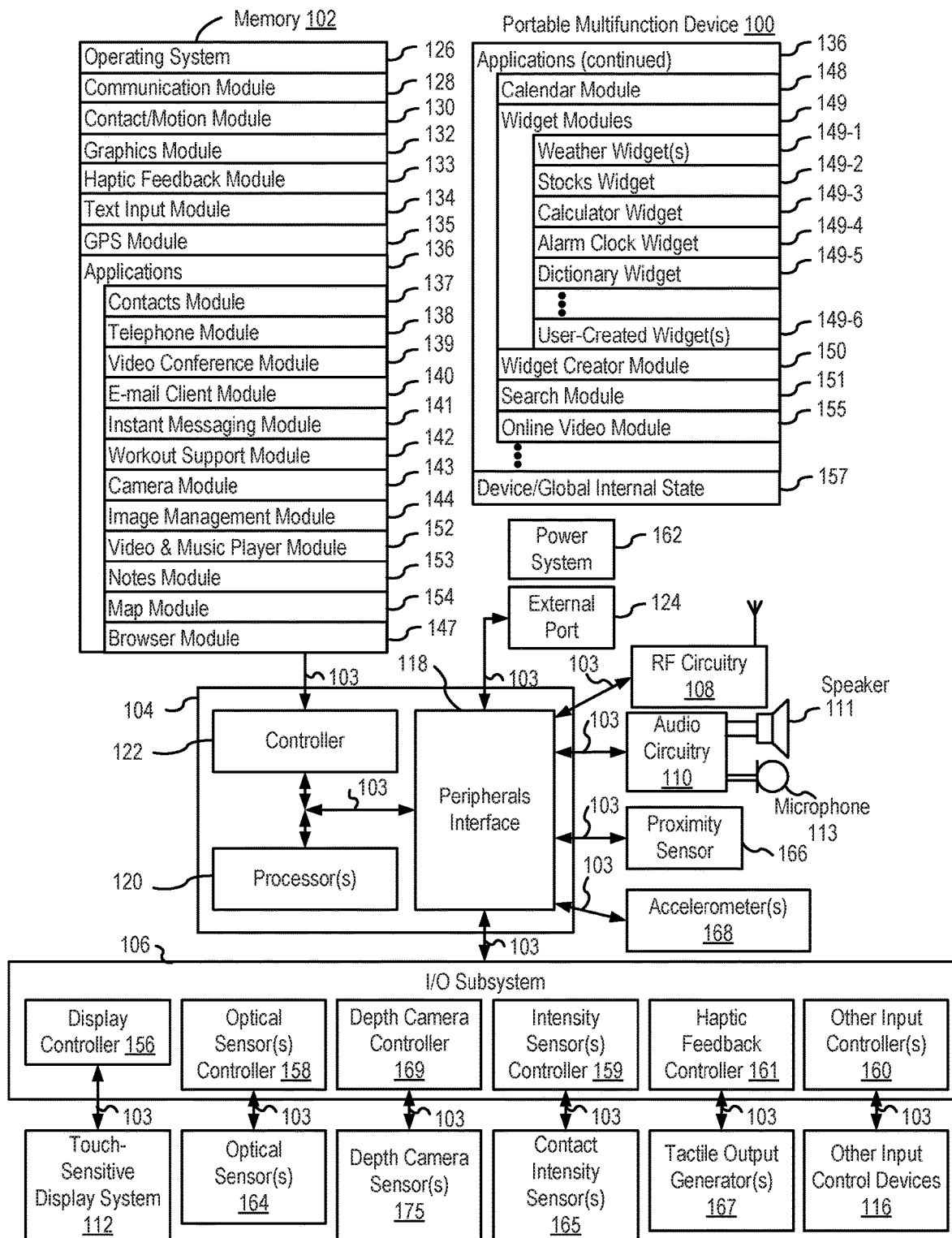
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for providing compass application features. For example, a user would benefit from being able to precisely set a bearing in a compass application that is displayed on a small display. As another example, a user would benefit from being able to set a bearing that is resistant to or unaffected by accidental user inputs on the display. Such techniques can reduce the cognitive burden on a user who uses compass application features, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for managing event notifications. FIGS. 6A-6X illustrate exemplary user interfaces for a compass application in accordance with some embodiments. FIG. 7 is a flow diagram illustrating an exemplary process for a compass application in accordance with some embodiments. The user interfaces in FIGS. 6A-6X are used to illustrate the processes described below, including the processes in FIG. 7.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
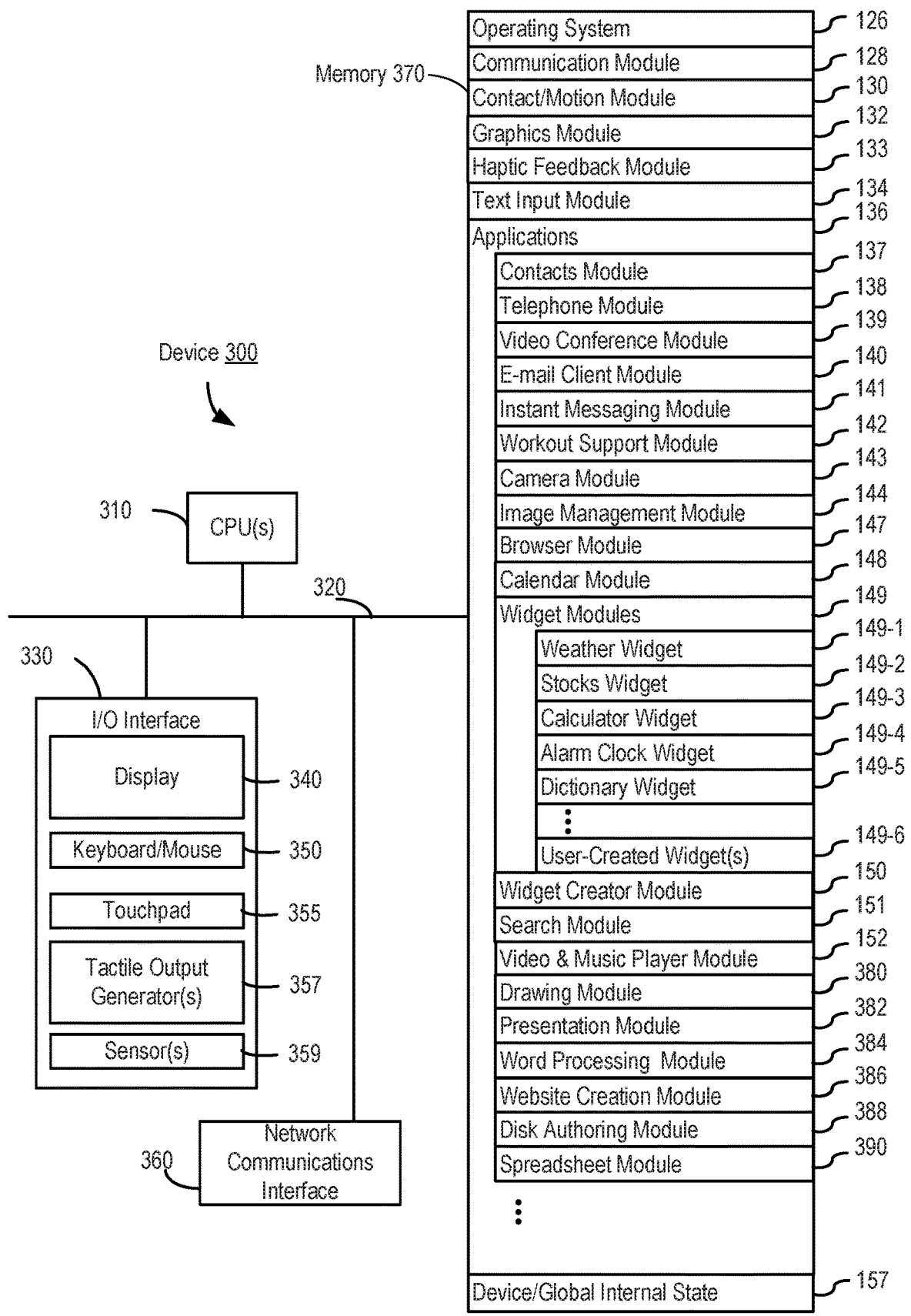
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
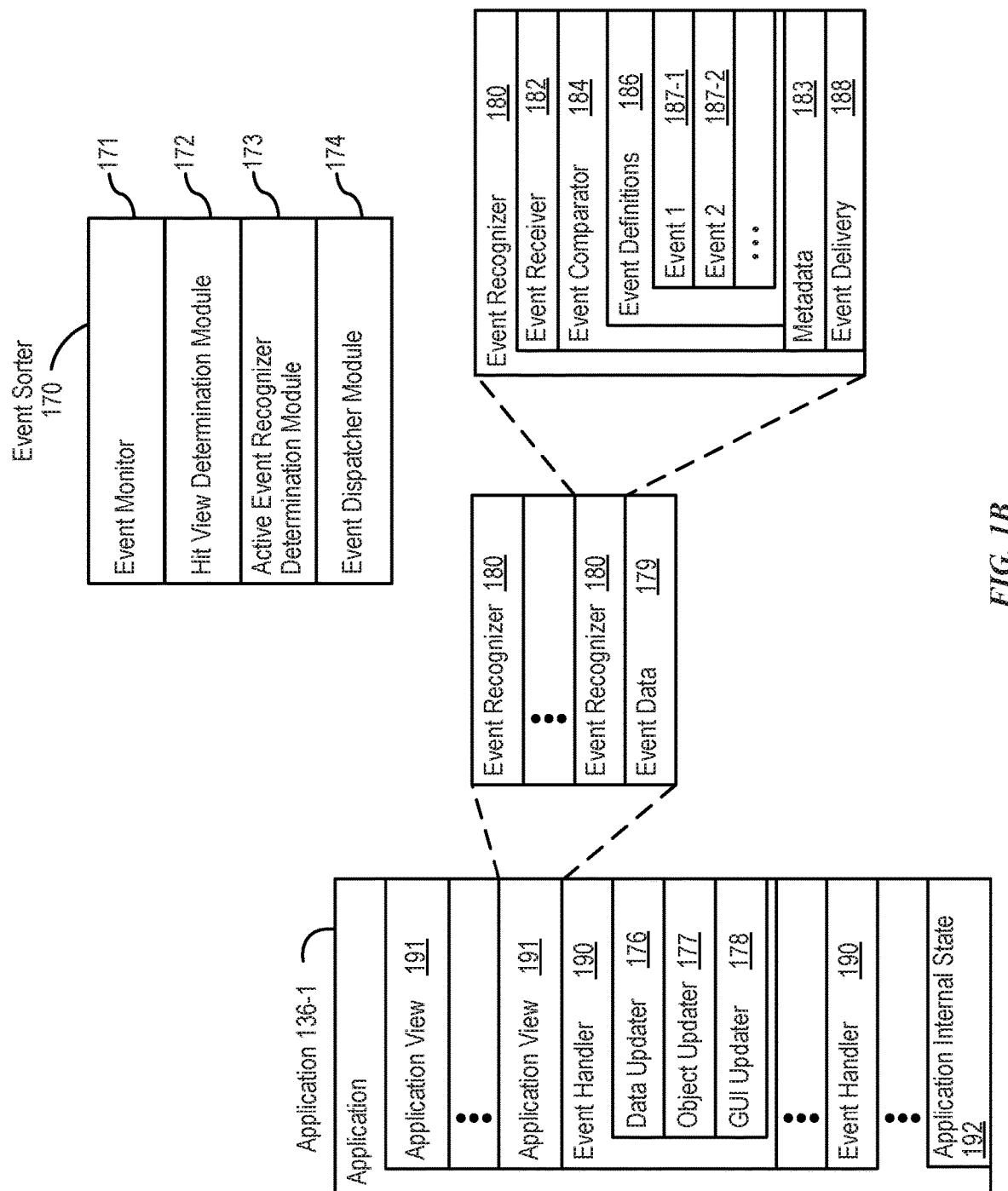
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer

180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
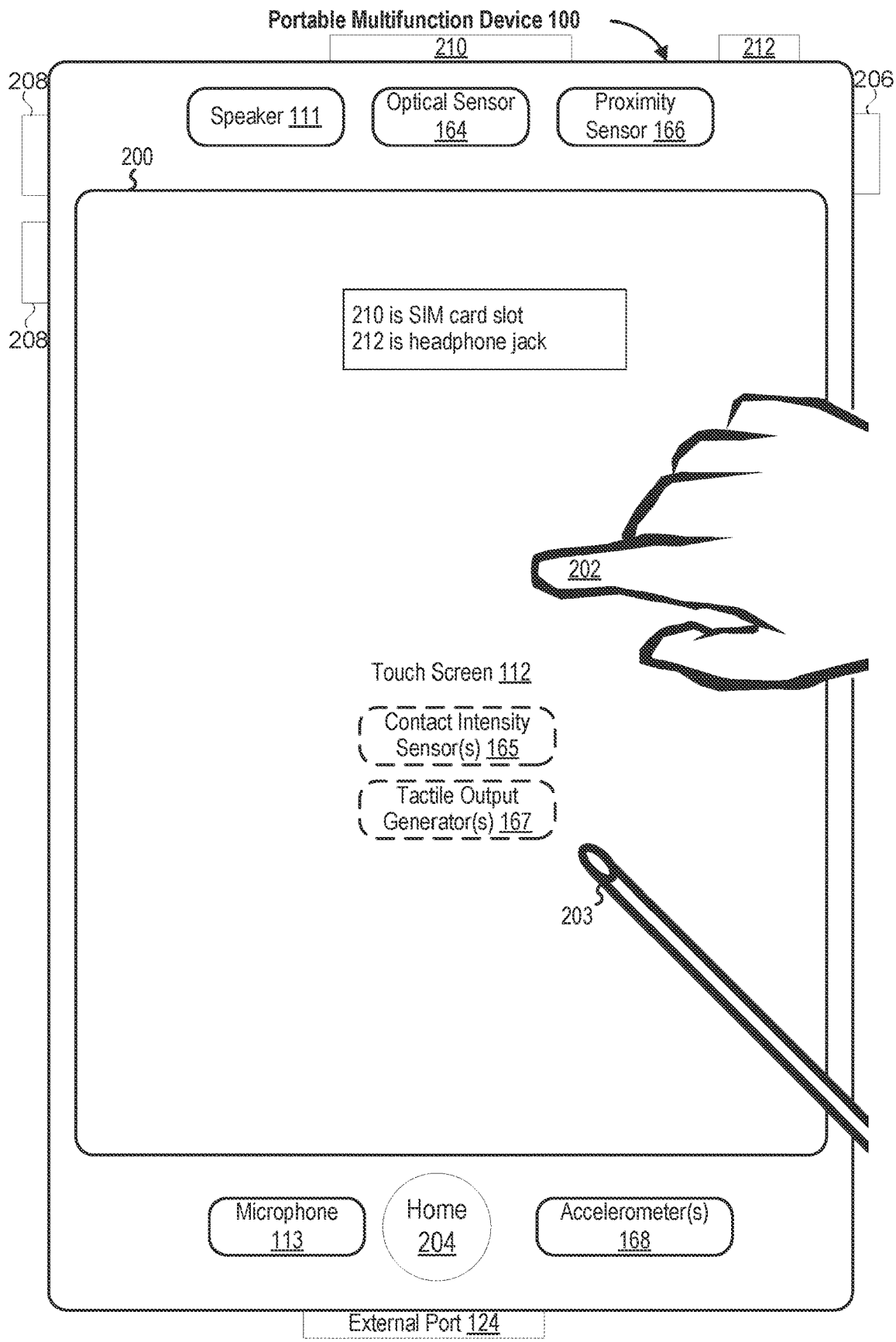
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
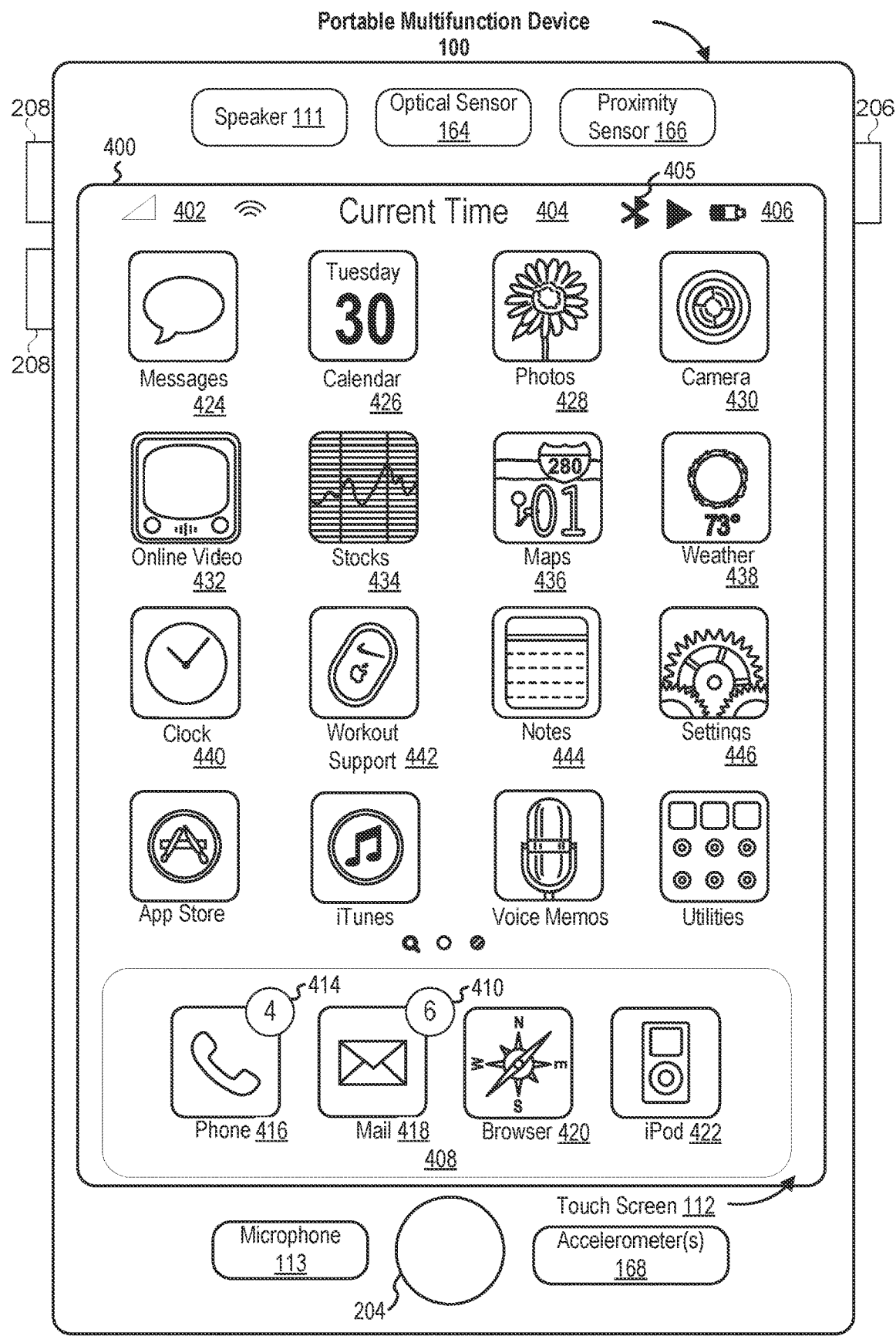
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
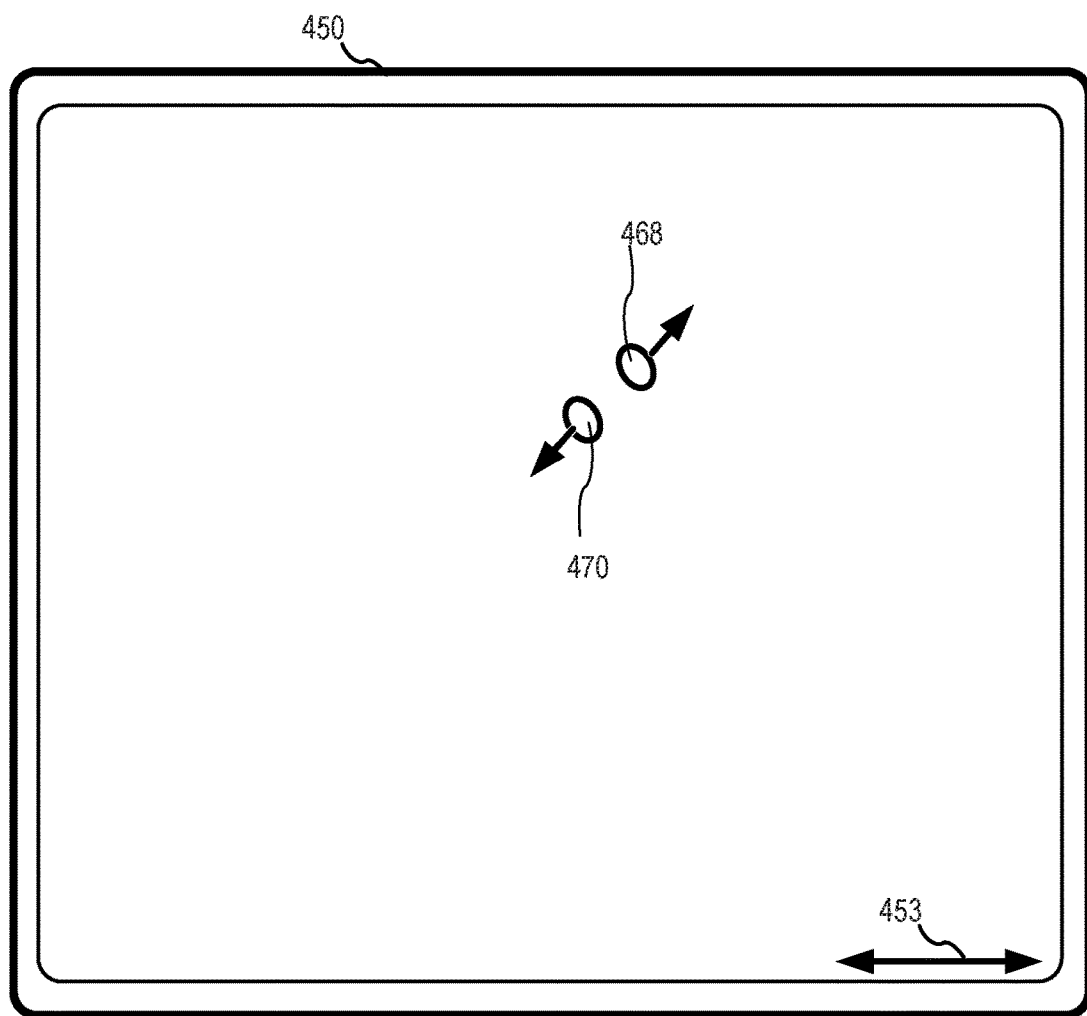
FIG. 4B illustrates an exemplary user interface for a multifunction device with a touch-sensitive surface that is separate from the display in accordance with some embodiments.
Figure 4B:
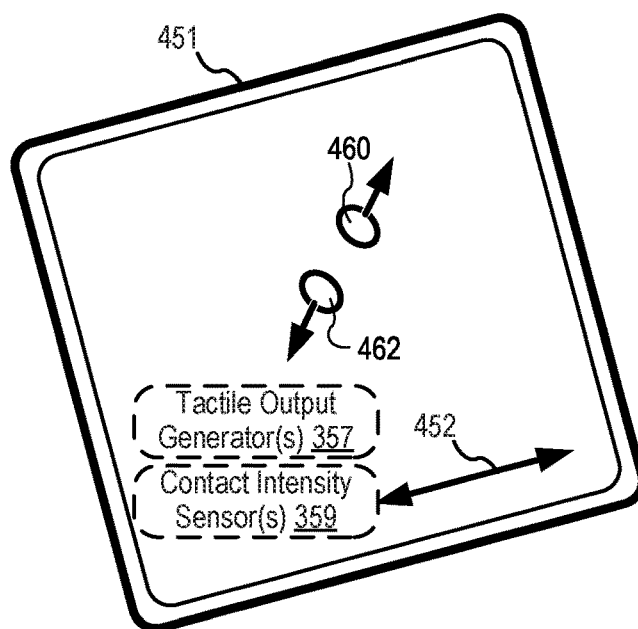

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
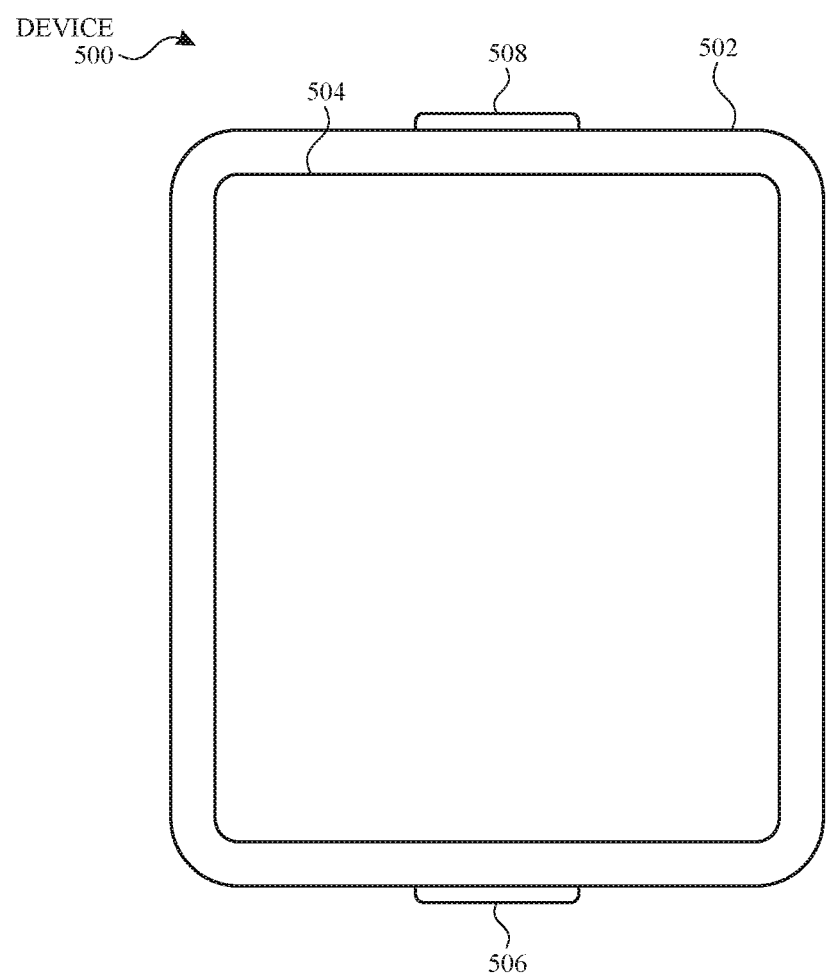
FIG. 5A illustrates a personal electronic device in accordance with some embodiments.
Figure 6A:
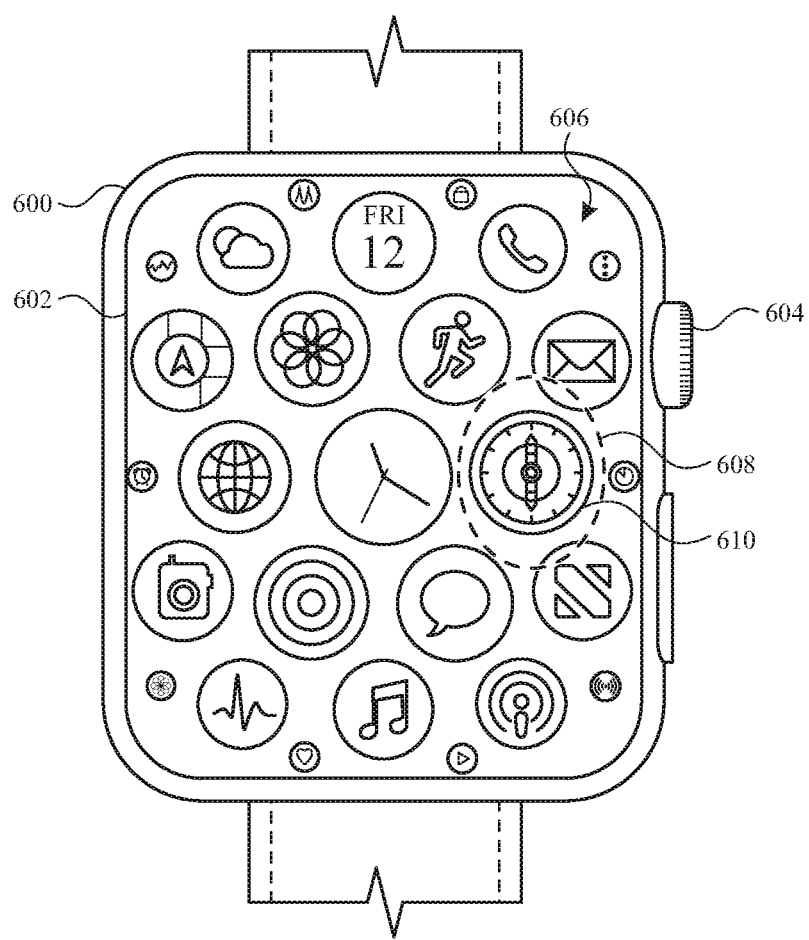
FIGS. 6A-6X illustrate exemplary user interfaces for a compass application, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/ 040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including method 700. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
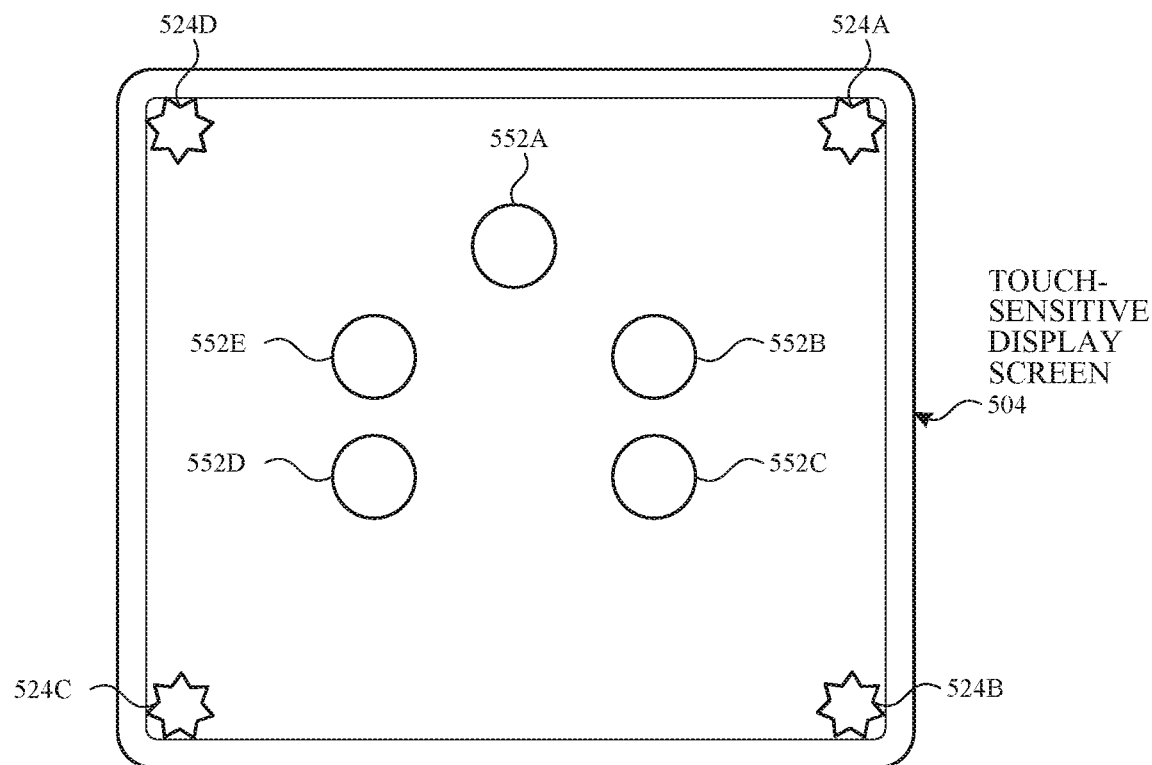
FIGS. 5C-5D illustrate exemplary components of a personal electronic device having a touch-sensitive display and intensity sensors in accordance with some embodiments.
Figure 5C:
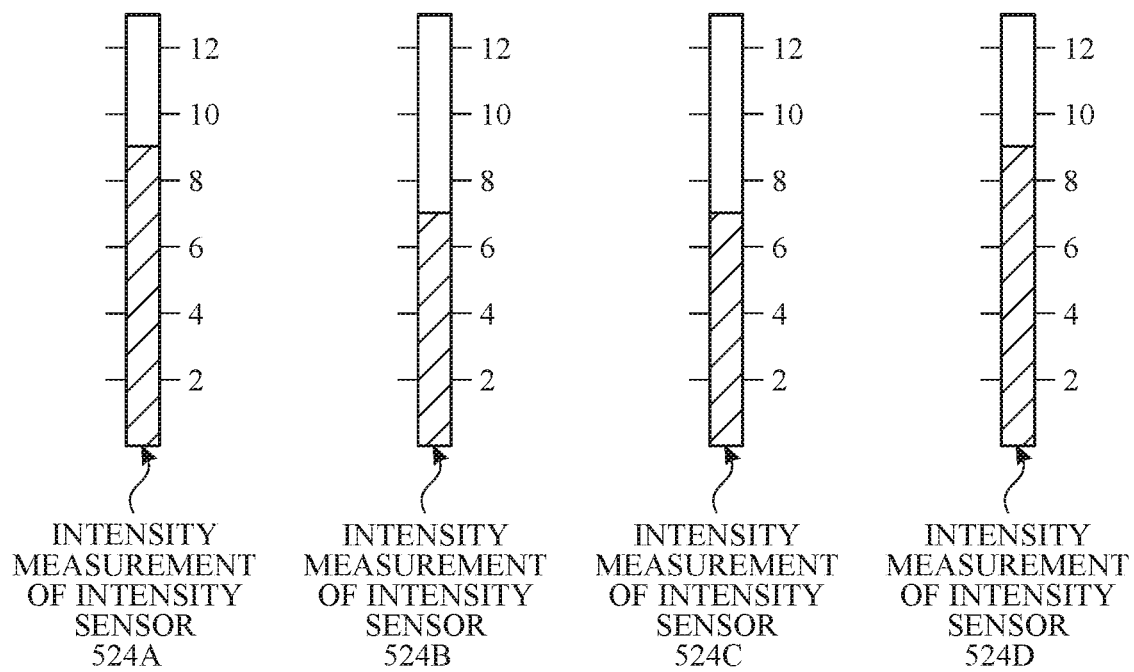
Figure 5D:
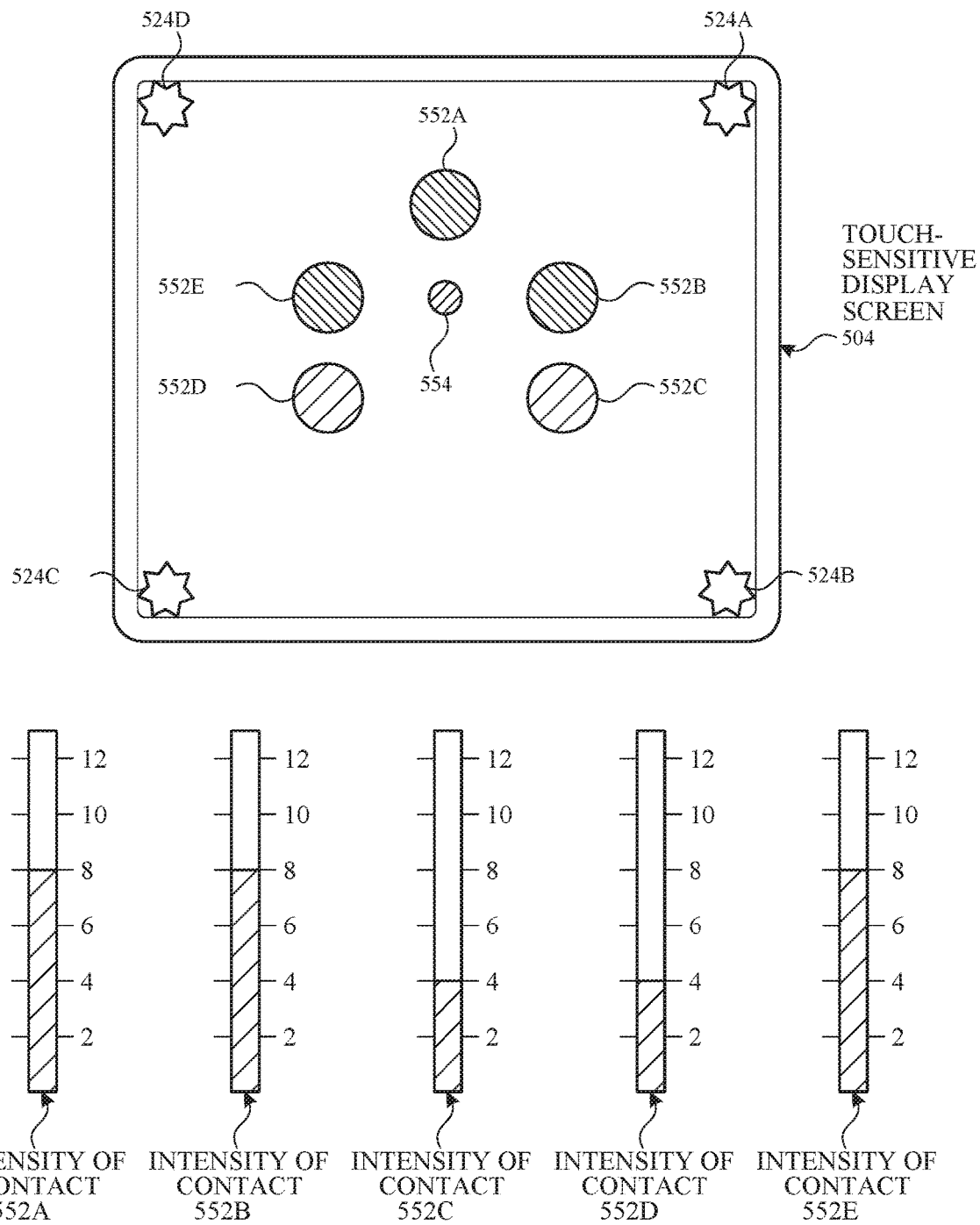

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts)

above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
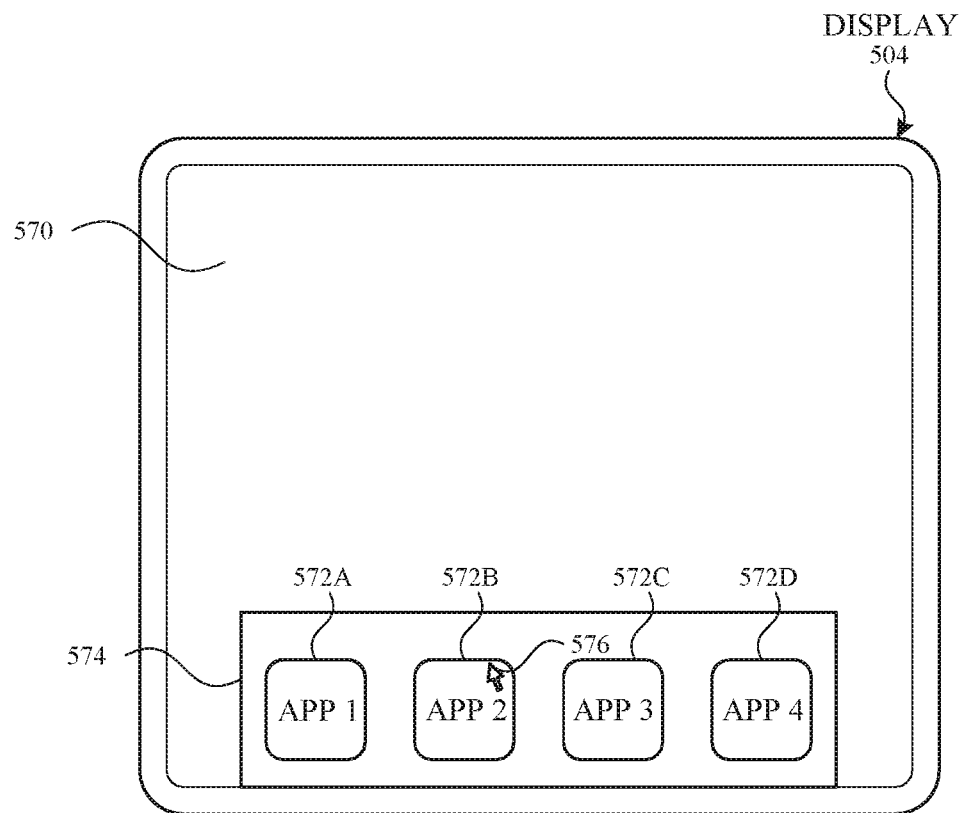
FIGS. 5E-5H illustrate exemplary components and user interfaces of a personal electronic device in accordance with some embodiments.
Figure 5E:
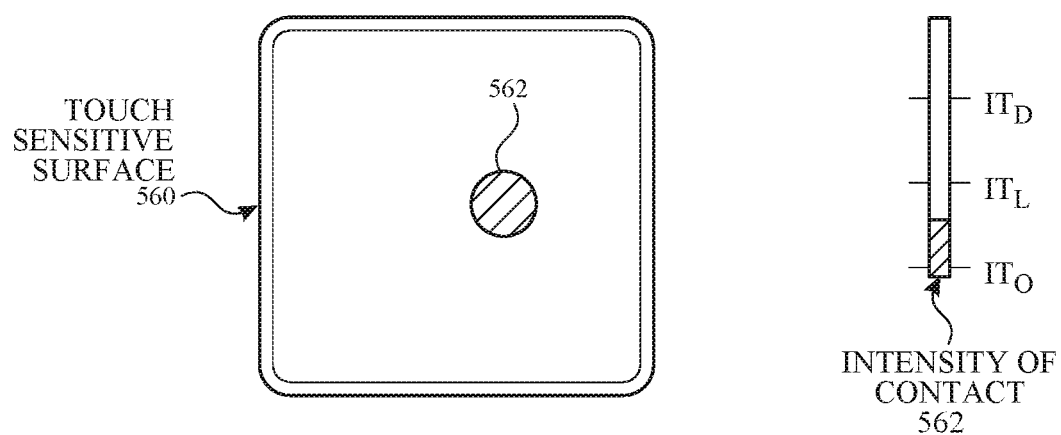
Figure 5F:
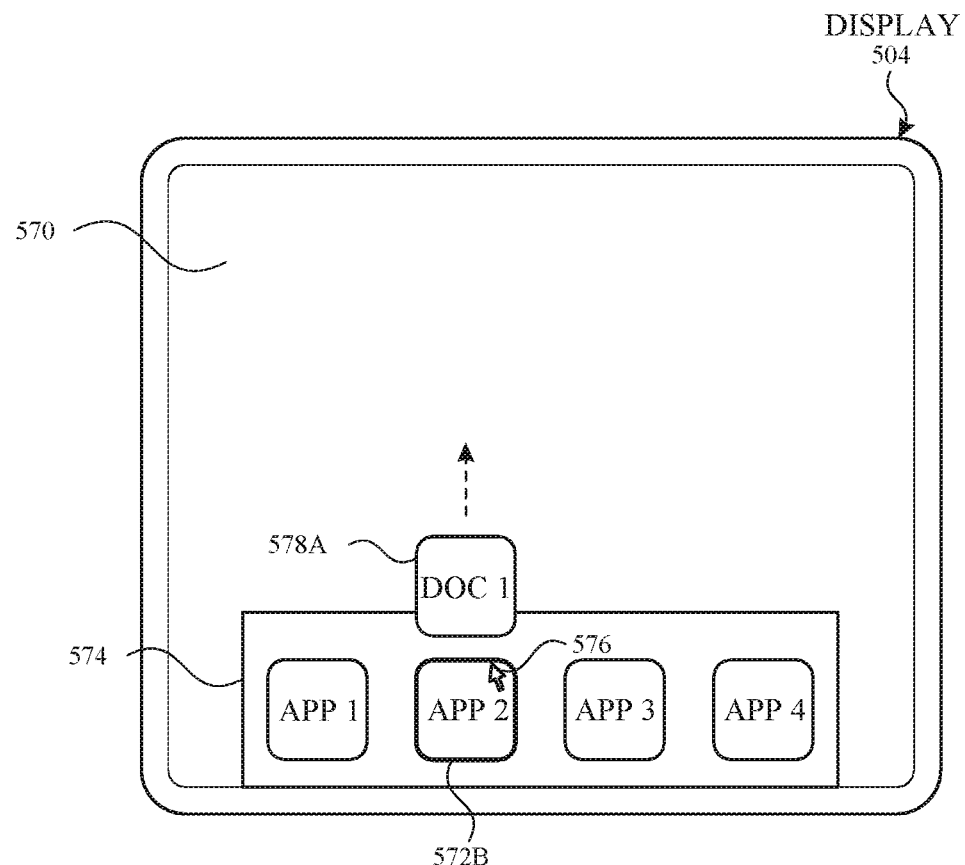
Figure 5F:
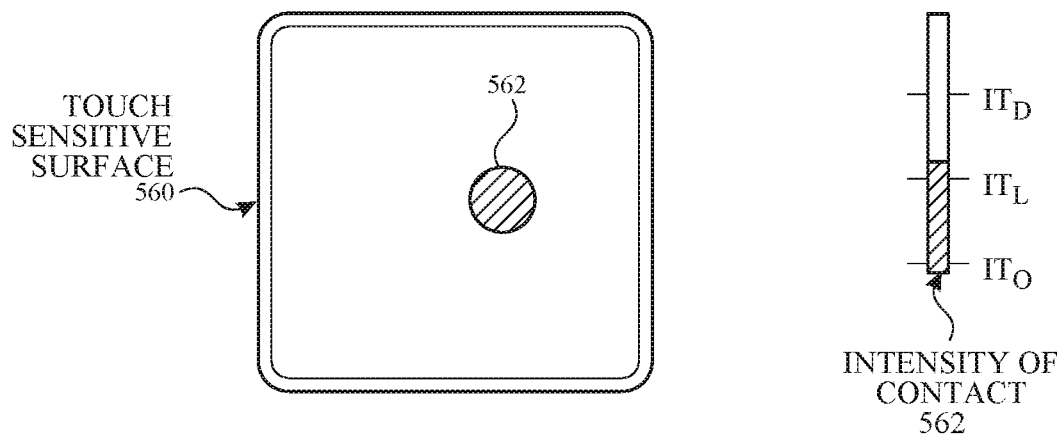
Figure 5G:
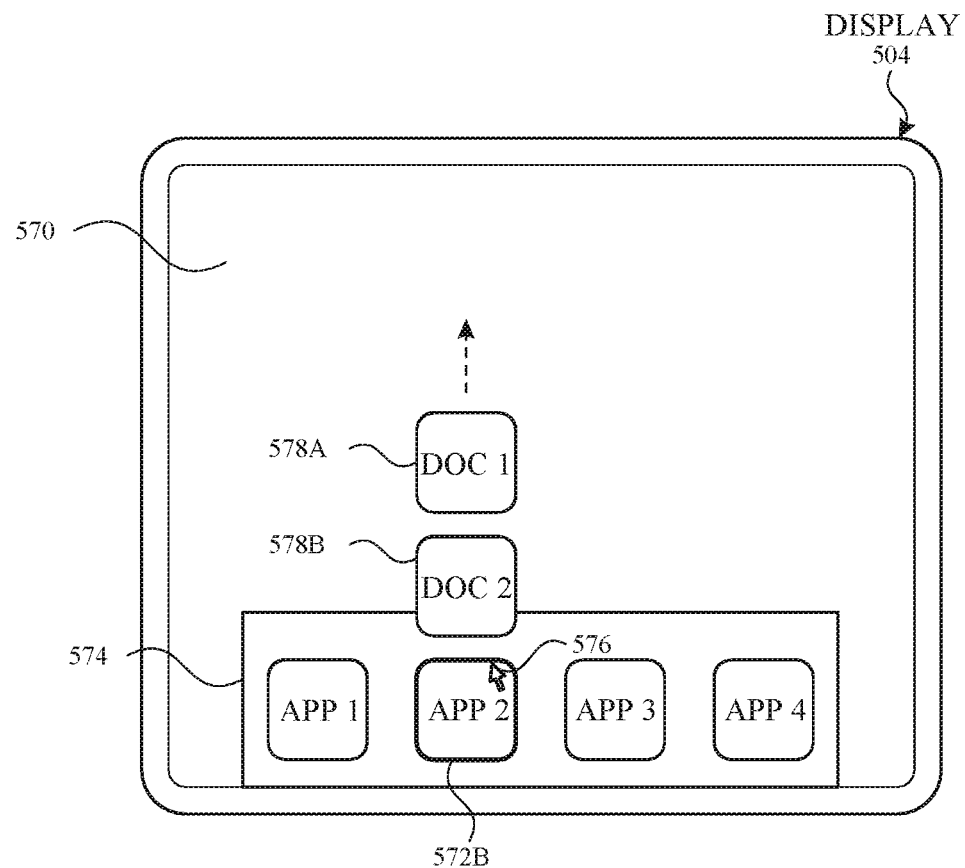
Figure 5G:
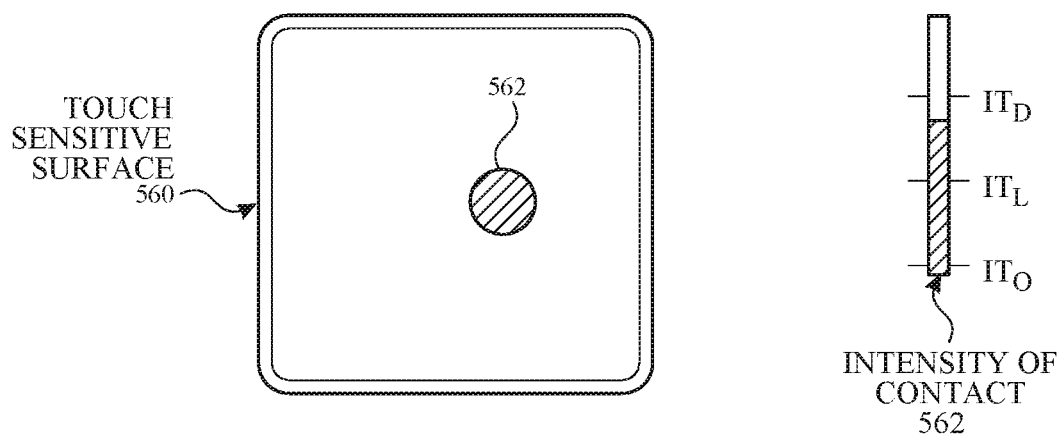
Figure 5H:
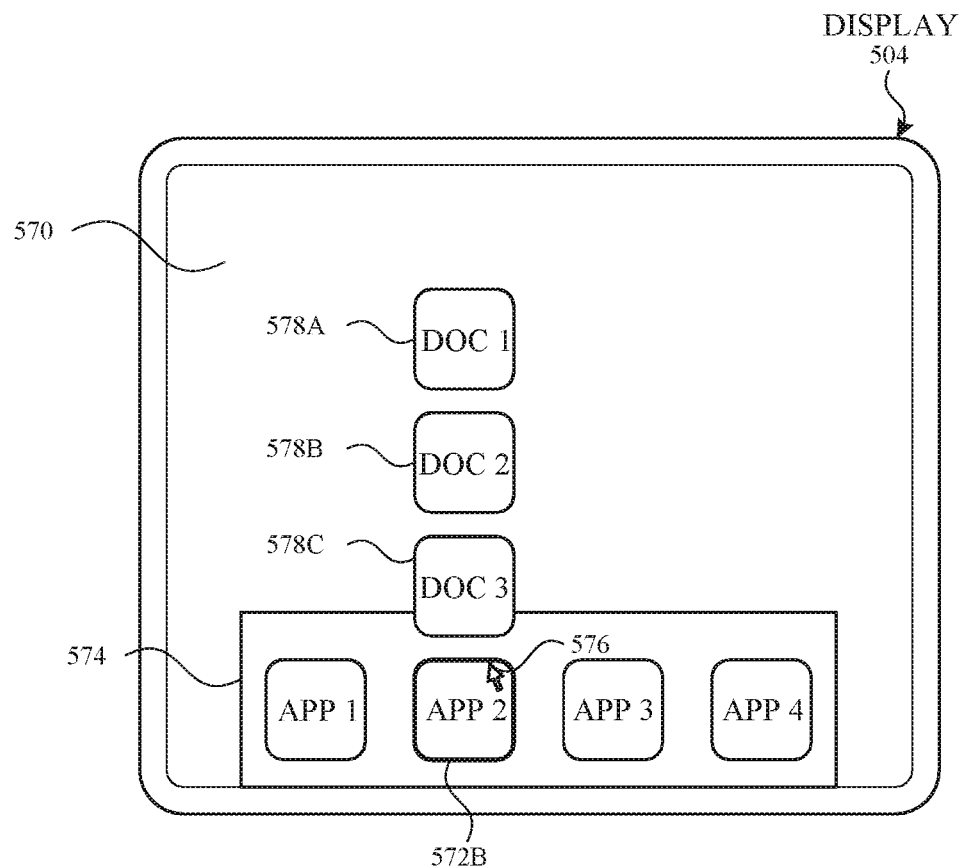
Figure 5H:
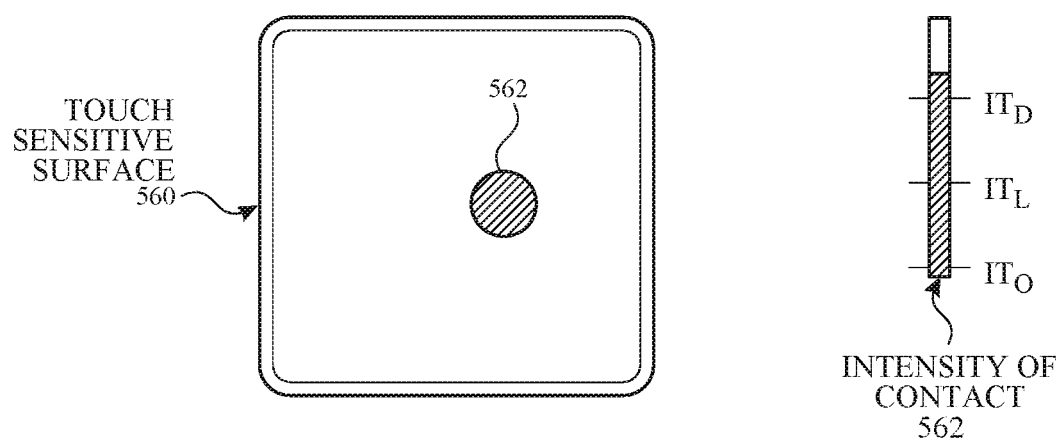

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6X illustrate exemplary user interfaces for providing compass application features, in accordance with some embodiments. The user interfaces in these figures are used to illustrate the processes described below, including the processes in FIG. 7.

FIGS. 6A-6X illustrate exemplary user interfaces for a compass application, in accordance with some embodiments. The user interfaces in these figures are used to illustrate the processes described below, including the processes in FIG. 7.

FIG. 6A depicts electronic device 600 displaying home screen 606 on display 602 (e.g., a touch-sensitive display). Home screen 606 includes a plurality of application icons for launching respective applications. In some embodiments, electronic device 600 includes one or more features of device 100, device 300, or device 500. In the embodiment illustrated in FIG. 6A, electronic device 600 includes rotatable input mechanism 604, which is also depressible. In some embodiments, electronic device 600 includes one or more features of device 100, device 300, or device 500.

At FIG. 6A, a user performs a tap gesture to launch a compass application. As a result, while displaying home screen 606, electronic device 600 detects input 608 at a location corresponding to compass icon 610.

Figure 6B:
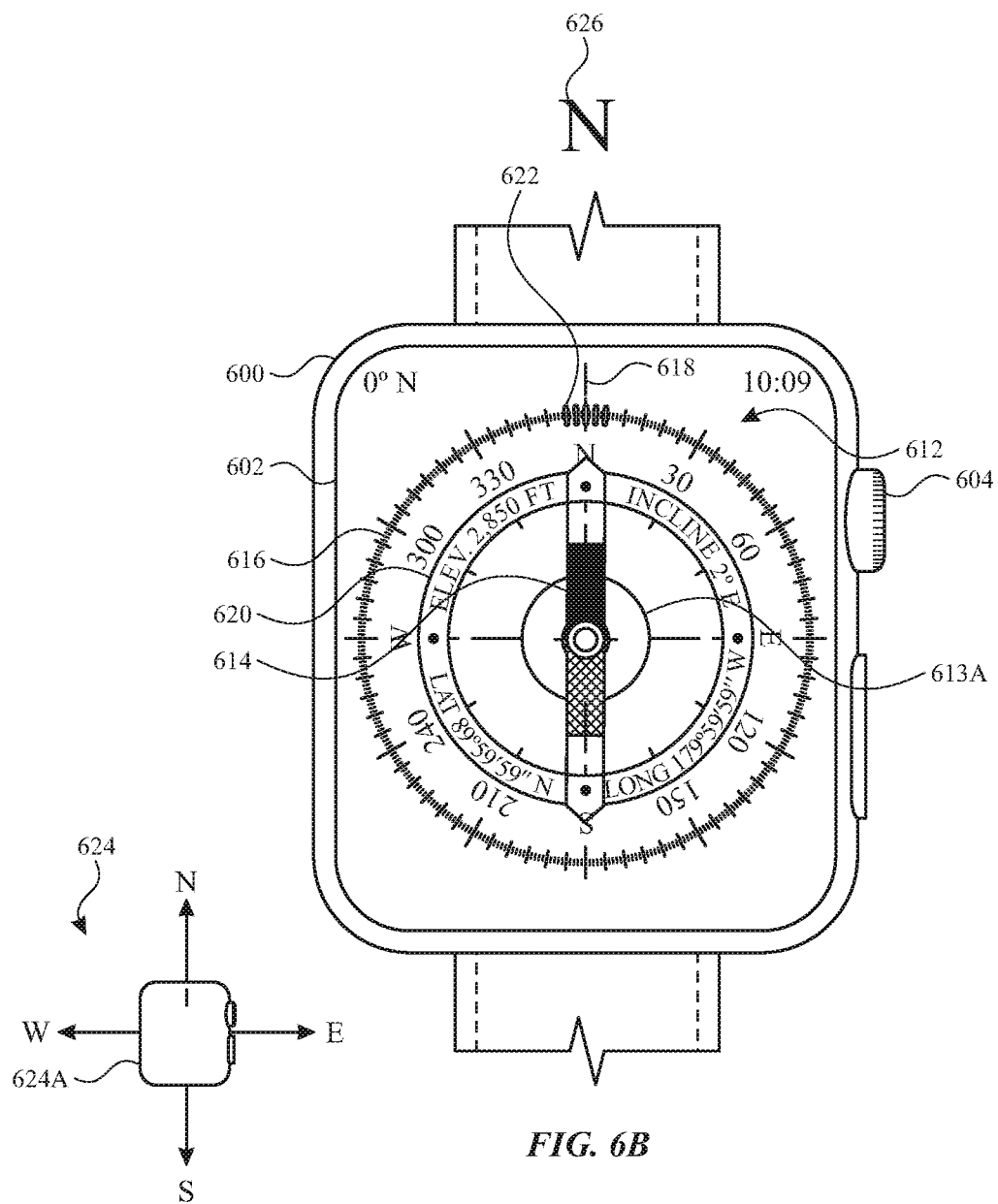

At FIG. 6B, in response to detecting input 608, electronic device 600 launches the compass application, and replaces display of home screen 606 with display of compass user interface 612 of a compass application. Compass user interface 612 provides an indication of a direction in which electronic device 600 is oriented (e.g., 0° N). In some embodiments, compass user interface 612 corresponds to a navigation mode for assisting a user with navigating a physical environment.

Compass user interface 612 includes needle 614 and dial 616. Needle 614 provides an indication of one or more predefined directions. As shown in FIG. 6B, needle 614 points north and south. In particular, the side of needle 614 with the solid portion is pointing north, while the side of needle 614 with the crosshatching is pointing south. Similarly, dial 616 provides an indication of one or more predefined directions. As depicted in FIG. 6B, dial 616 includes markings (e.g., ticks) corresponding to 0° to 359°. Dial 616 includes labels corresponding to the markings at certain intervals to provide an indication of respective predefined directions. For example, the marking corresponding to 0° is labeled "N" for north. As another example, the marking corresponding to 240° is labeled "240". Thus, needle 614, dial 616, or a combination thereof provides an indication of one or more predefined directions. In some embodiments, the movement of needle 614 is fixed to the movement of dial 616, or vice versa. Thus, in some embodiments, needle 614 does not move relative to dial 616. In some embodiments, dial 616 is displayed without needle 614.

Compass user interface 612 also includes direction of travel indicator 618, which provides an indication of the direction in which electronic device 600 is oriented and/or the direction in which the user intends to travel. Additionally, compass user interface 612 includes ring 620, which includes elevation, incline, latitude, and longitude.

As shown in FIG. 6B, electronic device 600 is oriented in the north direction. As a result, electronic device 600 displays compass user interface 612 with an indication that electronic device 600 is oriented in the north direction. For example, dial 616 is displayed such that the 0° N marking is aligned with direction of travel indicator 618. For ease of explanation, FIG. 6B as well as subsequent figures depict compass rose 624 and north indicator 626, which help to clarify the orientation of electronic device 600 with respect to north. For example, compass rose 624 includes device representation 624A, which includes physical features (e.g., a representation of rotatable input mechanism 604) to illustrate the orientation of electronic device 600 with respect to compass rose 624. Further, north indicator 626 is located in the north direction with respect to electronic device 600.

Figure 6C:
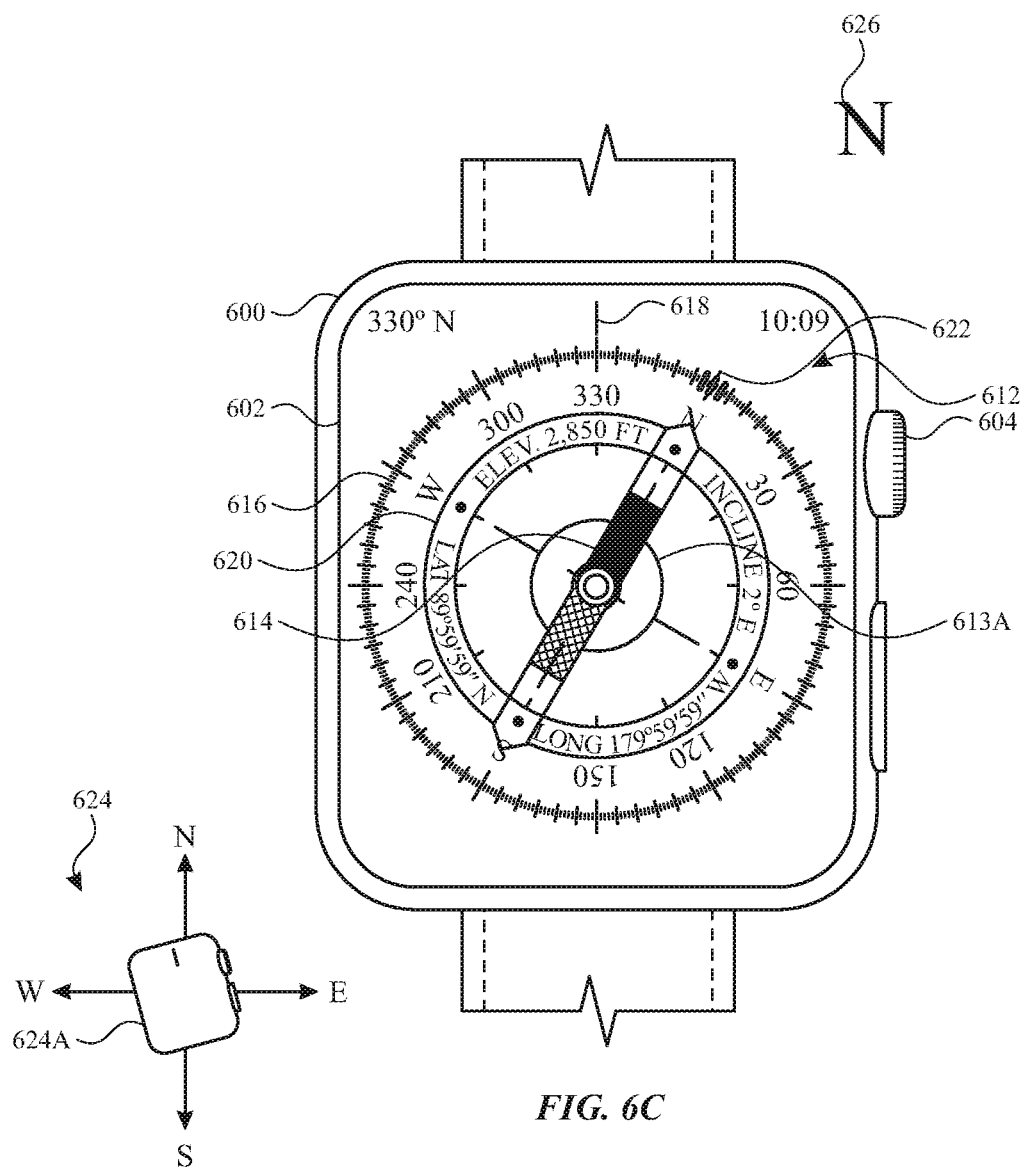
Figure 6D:
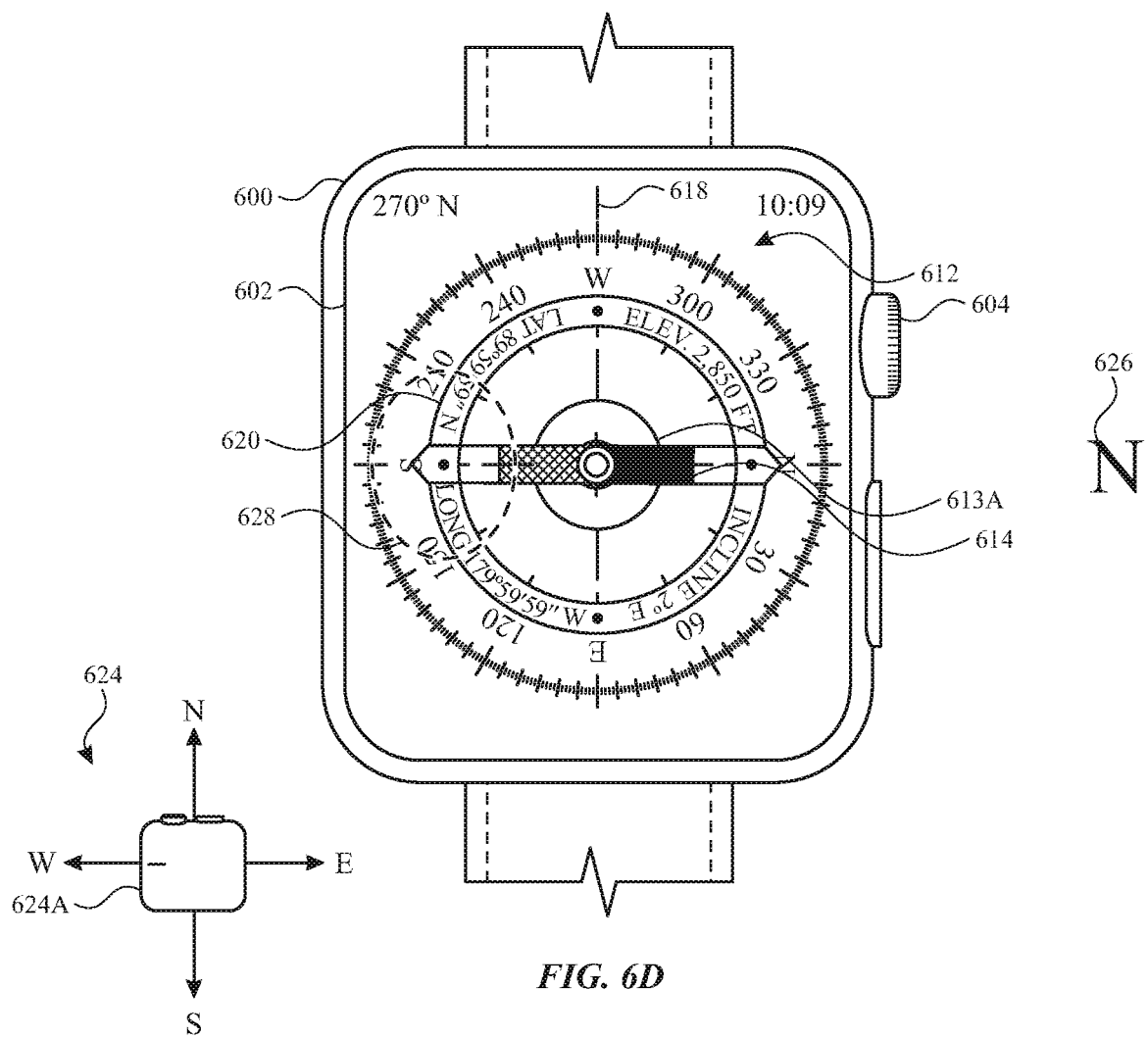

As discussed below, FIGS. 6B-6D illustrate how compass user interface 612 is updated as electronic device 600 changes orientation relative to the north direction. With reference to FIG. 6B, suppose the user wishes to travel west, so the user turns left towards the west direction. It is noted that, when the user turns, electronic device 600 moves in accordance with the movement of the user, as electronic device 600 is being worn on the user's wrist. At FIG. 6C, as a result of the user turning, electronic device 600 rotates dial 616 clockwise, and updates compass user interface 612 to reflect the new direction in which electronic device 600 is oriented. In particular, compass user interface 612 provides an indication that electronic device 600 is oriented in the northwest direction at 330°.

With reference to FIG. 6C, the user continues turning left until the user faces west. At FIG. 6D, as a result of the continued turning, electronic device 600 updates compass user interface 612 to provide an indication that electronic device 600 is oriented in the west direction at 270°.

In some embodiments, the accuracy of dial 616 and its indication of direction can vary. Returning to FIG. 6B, accuracy indicator 622 provides an indication of the accuracy of dial 616 and its indication of direction. For example, a high number of ticks (e.g., 5) in accuracy indicator 622 provides an indication that dial 616 has low accuracy. Thus, though dial 616 in FIG. 6B provides an indication that electronic device 600 is oriented in the north direction, accuracy indicator 622 indicates that this might be inaccurate. FIG. 6C depicts an improvement in accuracy of dial 616, as the number of ticks in accuracy indicator 622 decreases. As depicted in FIG. 6D, the ticks in accuracy indicator 622 cease to be displayed, indicating a high accuracy for dial 616. In some embodiments, high accuracy for dial 616 can also be indicated by accuracy indicator 622 having a single tick. In some embodiments, after receiving additional inputs that enable higher accuracy measurements of direction (e.g., after motion that enables improved calibration) the number of ticks in the accuracy indicator decreases to indicate the increased accuracy (or reduced uncertainty) of the measurement. In some embodiments, after the device determines that the measurements of direction have a reduced accuracy (e.g., due to motion of the device or interference with sensors of the device such as a nearby magnetic field) the number of ticks in the accuracy indicator increases to indicate the reduced accuracy (or increased uncertainty) of the measurement.

With reference to FIG. 6D, the user is facing west and compass user interface 612 has been updated accordingly, as discussed above. As shown in FIG. 6D, the user performs a deep press gesture to navigate to a menu for setting a bearing. As a result, while displaying compass user interface 612, electronic device 600 detects input 628. In some embodiments, a bearing represents a direction in which the user intends to travel, such as towards a landmark.

Figure 6E:
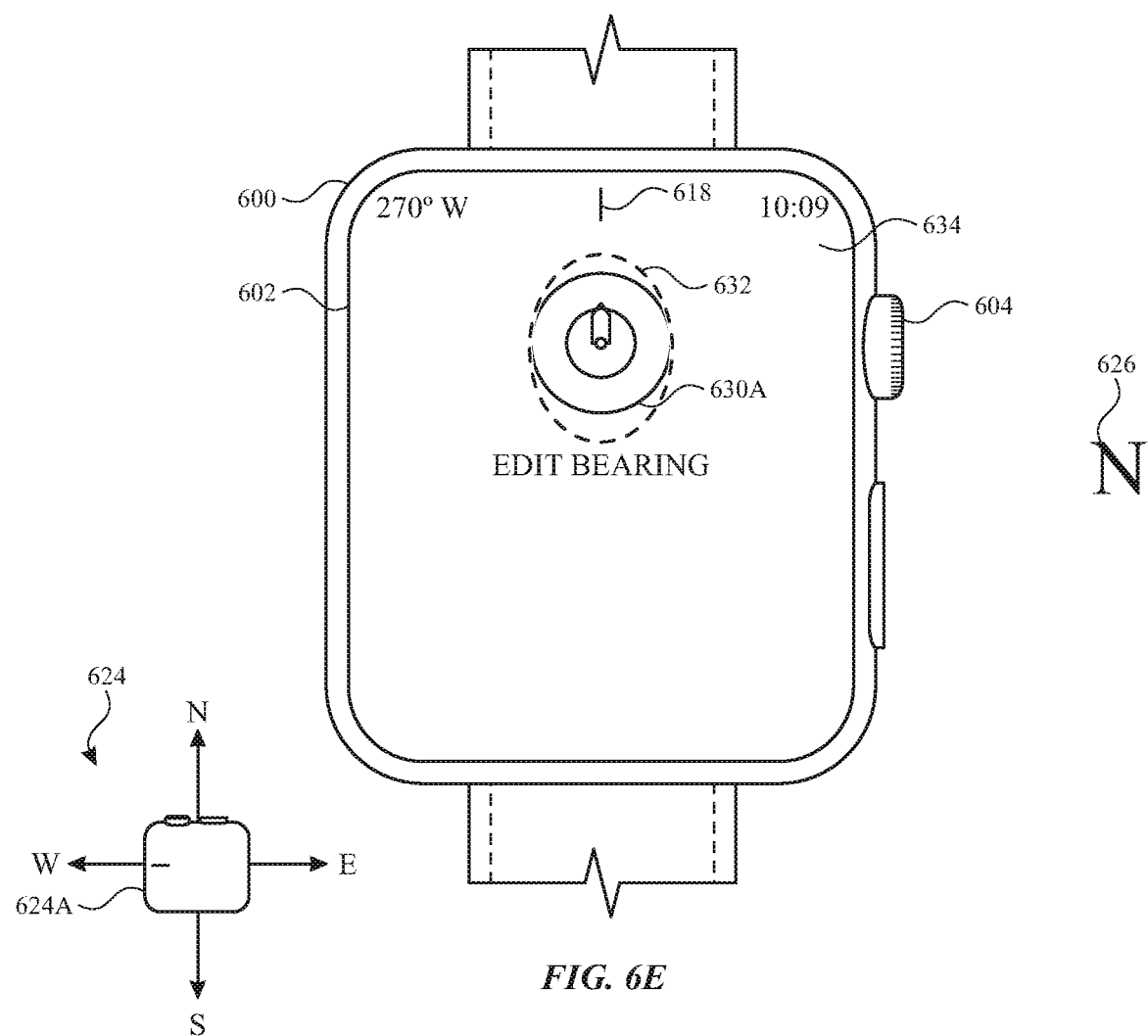

At FIG. 6E, in response to detecting input 628 and in accordance with a determination that an intensity of input 628 exceeds an intensity threshold, electronic device 600 replaces display of compass user interface 612 with display of bearing menu 634. Bearing menu 634 includes affordance 630A which, when selected, initiates a process for setting a bearing. In some embodiments, electronic device 600 replaces display of compass user interface 612 with display of bearing menu 634 regardless of the location at which input 628 is detected.

As shown in FIG. 6E, the user selects affordance 630A via a tap gesture. As a result, while displaying bearing menu 634, electronic device 600 detects tap gesture 632 at a location corresponding to affordance 630A.

Figure 6F:
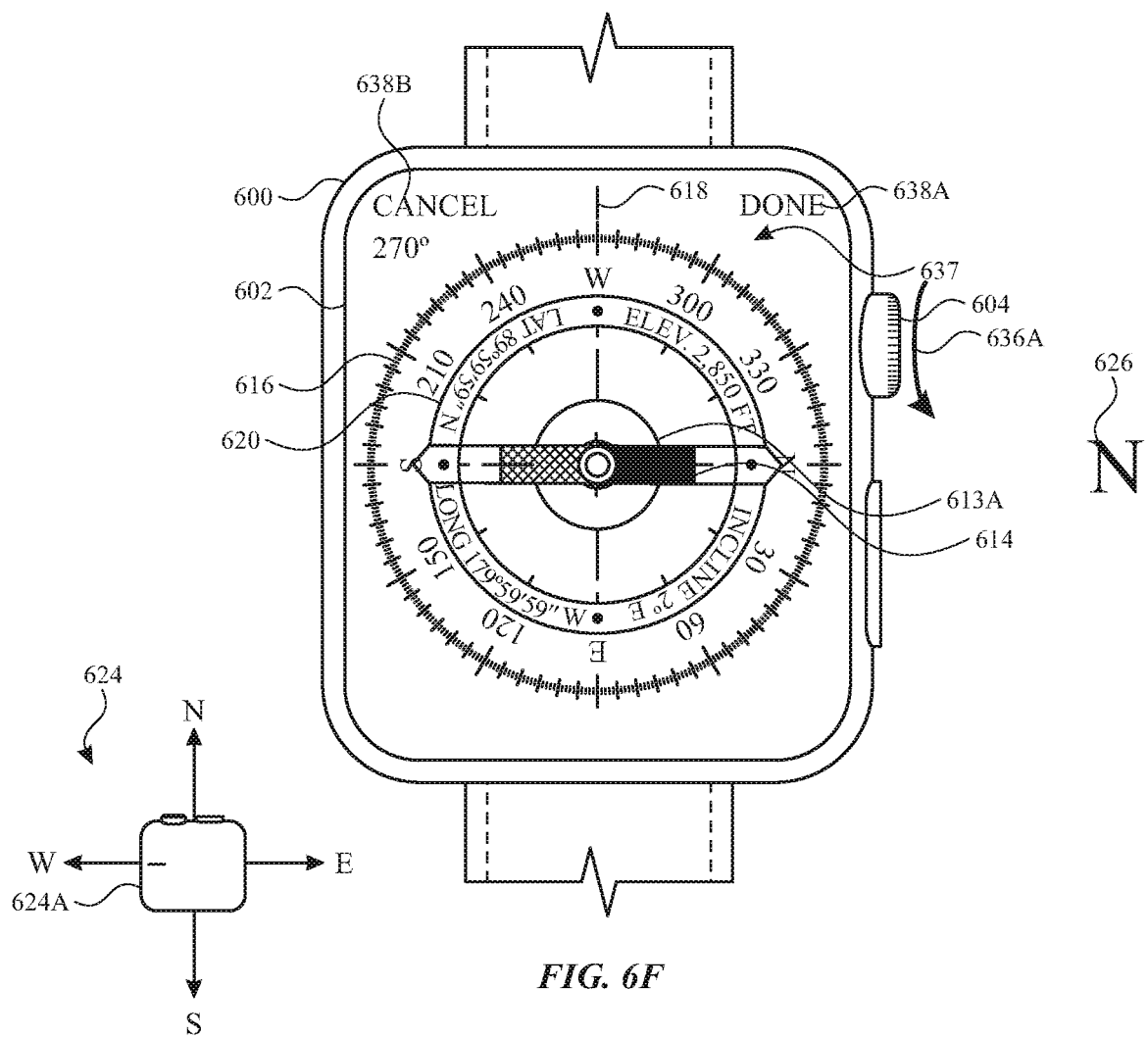

At FIG. 6F, in response to detecting tap gesture 632, electronic device 600 replaces display of bearing menu 634 with display of modified compass user interface 637. Modified compass user interface 637 includes one or more features of compass user interface 612, including needle 614, dial 616, and direction of travel indicator 618. Additionally, modified compass user interface 637 includes done affordance 638A and cancel affordance 638B. In some embodiments, modified compass user interface 637 corresponds to an edit mode for setting a bearing.

As depicted in FIG. 6F, the user begins rotating rotatable input mechanism 604 counterclockwise to adjust the bearing towards a landmark in the southwest direction at 240°.

While displaying modified compass user interface 637, electronic device 600 detects, via rotatable input mechanism 604, input 636A with a magnitude and directional component.

Figure 6G:
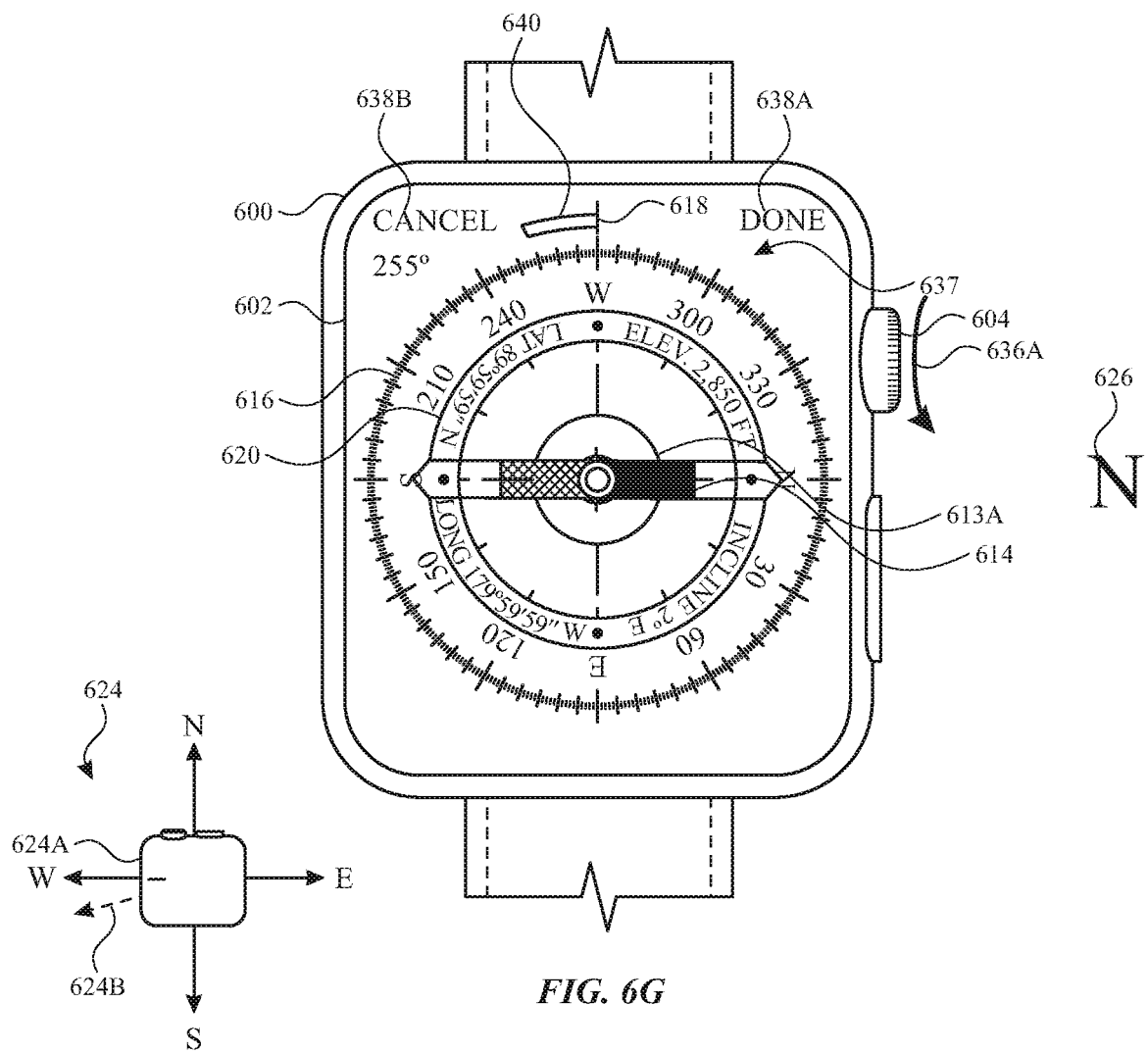

At FIG. 6G, in response to detecting input 636A, electronic device 600 displays bearing indicator 640, where the size of bearing indicator 640 is based on the magnitude of input 636A. Further, the displayed location of bearing indicator 640 is based on the directional component of input 636A. For example, in some embodiments, if the directional component of input 636A was in the opposite direction, bearing indicator 640 would be displayed to the right of direction of travel indicator 618. For ease of explanation, FIG. 6G depicts compass rose 624 with bearing direction 624B. Bearing direction 624B illustrates the direction of the bearing (e.g., 240°) relative to electronic device 600.

As shown in FIG. 6G, the user continues rotating rotatable input mechanism 604 to adjust the bearing to 240° from North. As a result, electronic device 600 continues detecting input 636A via rotatable input mechanism 604. At FIG. 6H, in response to continued detection of input 636A, electronic device 600 increases the size of bearing indicator 640 based on the magnitude of input 636A. In particular, bearing indicator 640 increases in size such that bearing indicator 640 corresponds to 240° (e.g., the direction of the landmark towards which the user intends to travel). In some embodiments, bearing indicator 640 represents an amount of offset from the current direction in which electronic device 600 is oriented.

Figure 6H:
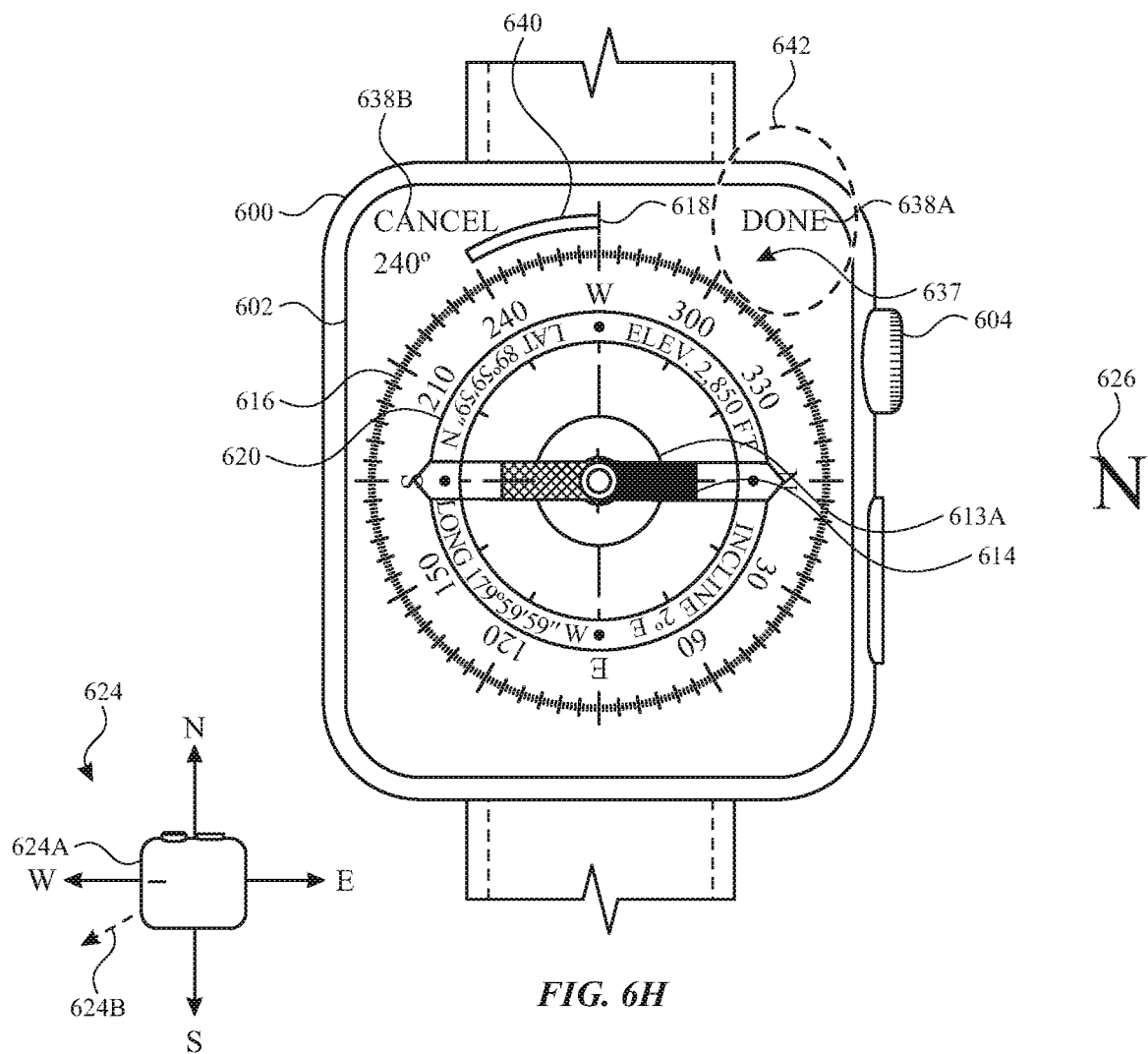
Figure 6I:
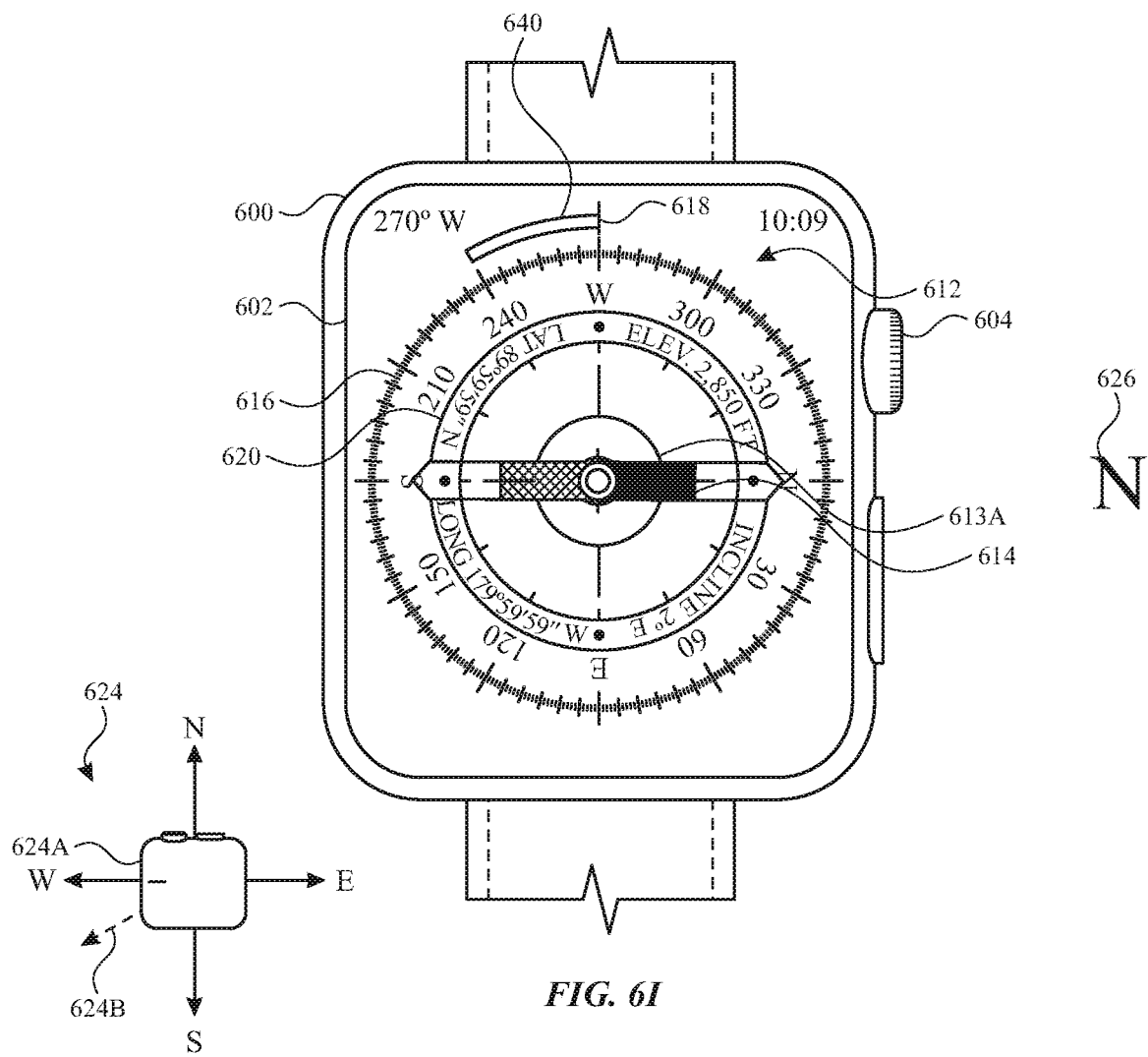

As depicted in FIG. 6H, the user sets the bearing by selecting done affordance 638A via a tap gesture. As a result, electronic device 600 detects input 642 at a location corresponding to done affordance 638A. At FIG. 6I, in response to detecting input 642, electronic device 600 replaces display of modified compass user interface 637 with display of compass user interface 612. Compass user interface 612 in FIG. 6I includes bearing indicator 640, which represents a bearing that is set at 240°.

As discussed above, the bearing is set in the direction of a landmark at 240° to which the user intends to travel. At FIG. 6I, the user is facing west at 270° from North. Bearing indicator 640 provides an indication that the user needs to turn left by a certain amount in order to face 240°. The user starts to turn left to face the landmark at 240°.

Figure 6J:
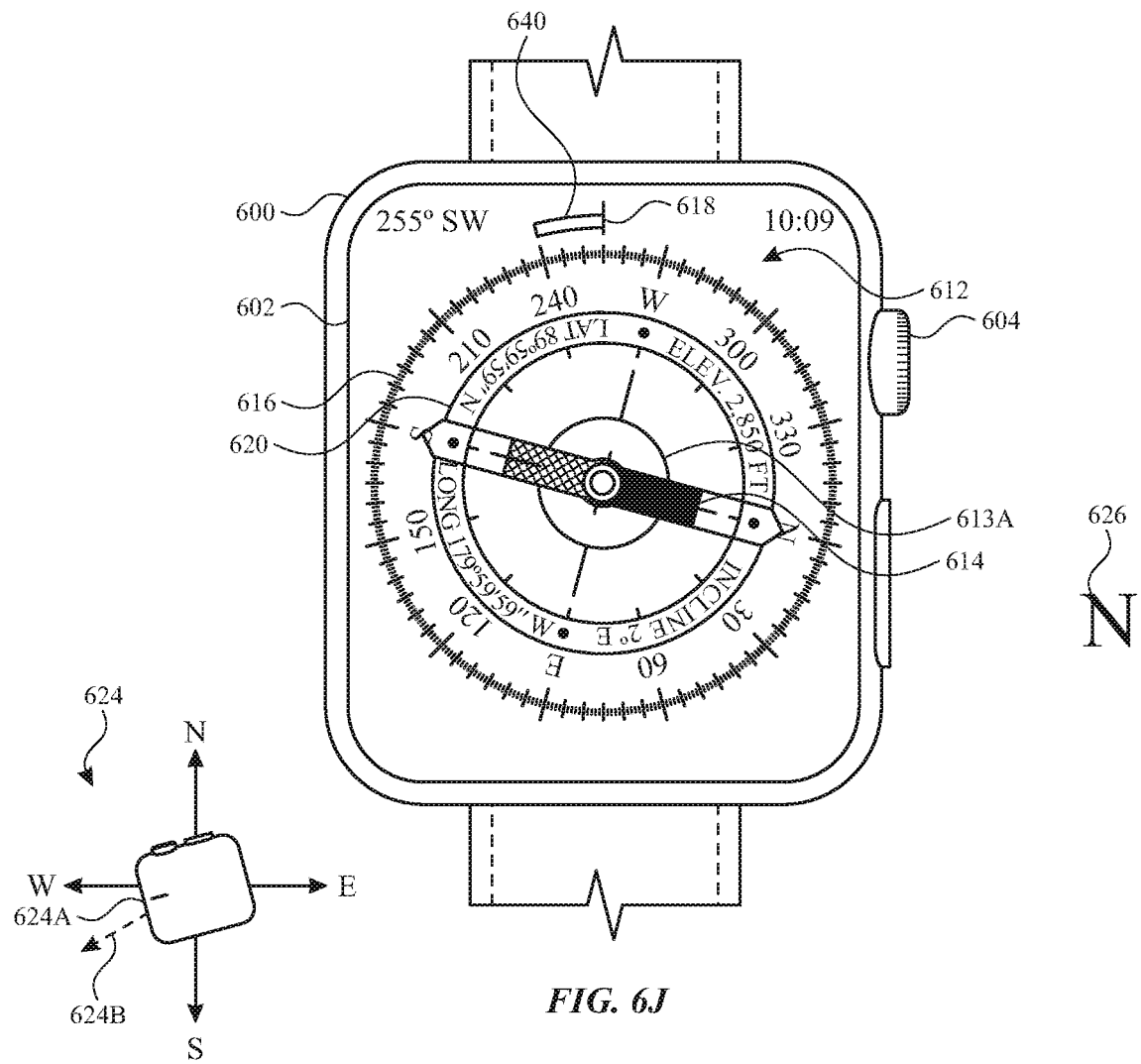

As shown in FIG. 6J, as a result of the user turning left, electronic device 600 updates compass user interface 612 to reflect the new direction in which electronic device 600 is oriented. In particular, compass user interface 612 provides an indication that electronic device 600 is oriented in the southwest direction at 255° from North. Additionally, updating compass user interface 612 includes changing bearing indicator 640 based on the movement of electronic device 600 relative to a predefined direction (e.g., north). As a result, bearing indicator 640 decreases in size as the electronic device 600 moves more closely towards the desired direction of 240°. At FIG. 6J, the user continues to turn left to face 240°.

Figure 6K:
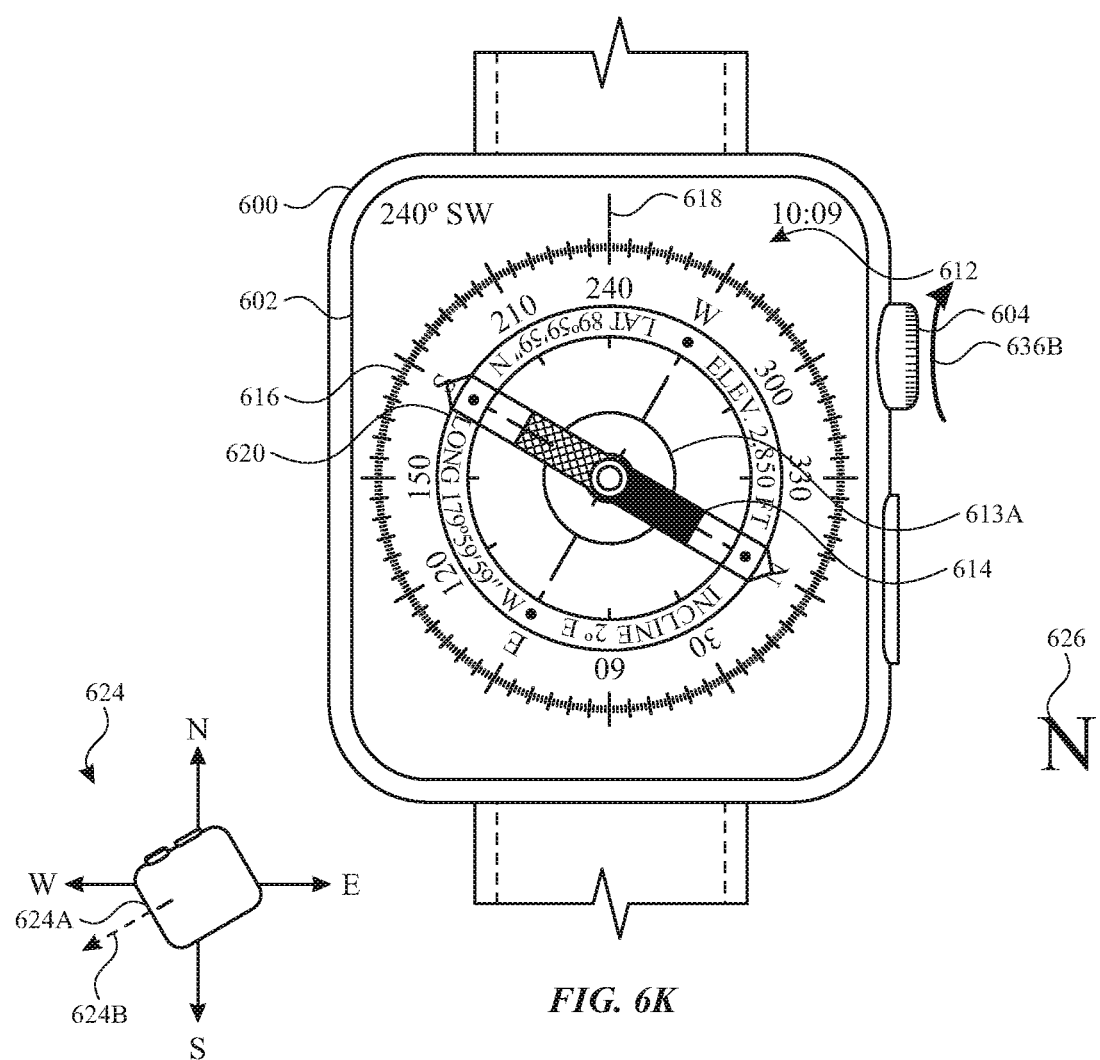
Figure 6L:
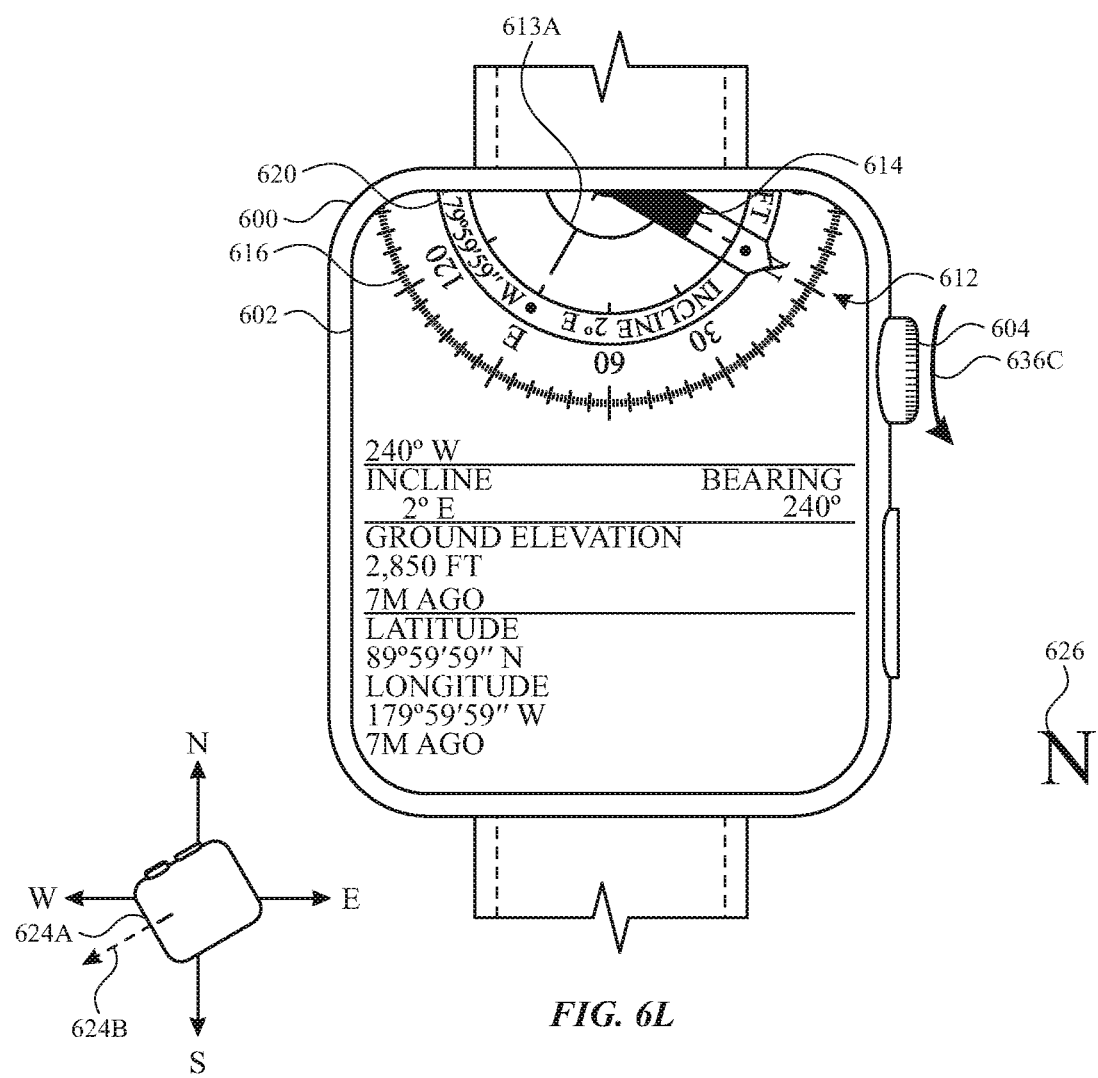
Figure 6M:
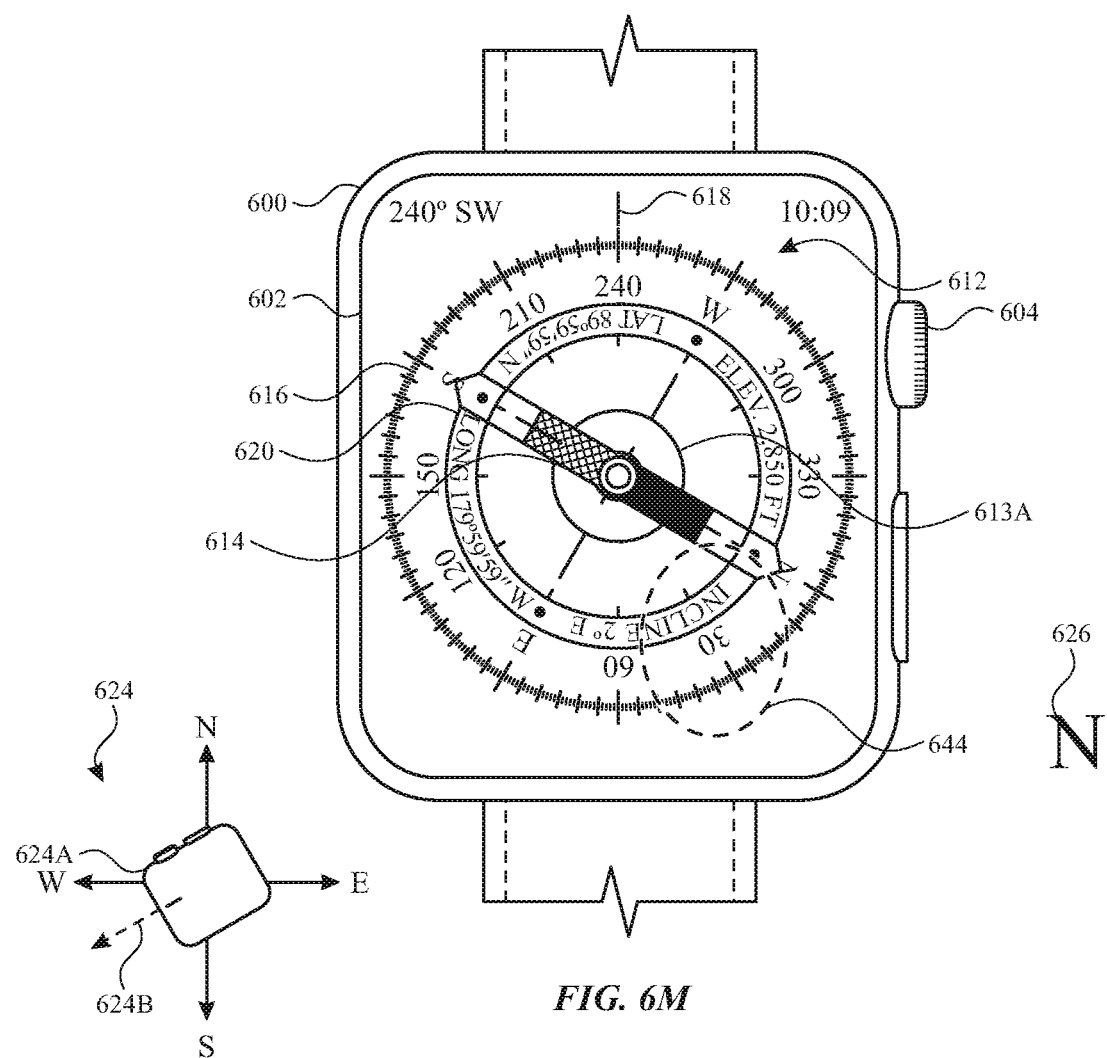

At FIG. 6K, as a result of the continued turning, electronic device 600 faces the direction of the bearing at 240°. Accordingly, electronic device 600 updates user interface 612 to provide an indication that electronic device 600 is oriented in the southwest direction at 240°. At this point, the user and electronic device 600 are facing the landmark at 240°, and the user can travel towards the landmark using compass user interface 612 as a guide.

As depicted in FIG. 6K, the user rotates rotatable input mechanism 604 to scroll for additional details. As a result, while displaying compass user interface 612, electronic device 600 detects input 636B. At FIG. 6L, in response to detecting input 636B, electronic device 600 scrolls compass user interface 612 and displays additional information. The additional information includes an indication of the direction in which electronic device 600 is oriented (e.g., 240°), incline angle (e.g., 2°), bearing (e.g., 240°), ground elevation (e.g., 2,850 feet), latitude (e.g., 89° 59'59" N), and longitude (e.g., 179° 59'59" W). It is noted that, in contrast to input 636A in FIG. 6F-6G, rotating the rotatable input mechanism 604 at FIG. 6K (e.g., once the bearing has been set) does not change the bearing. Thus, electronic device 600 does not, for example, change the size of bearing indicator 640 in response to rotation of rotatable input mechanism 604 at FIG. 6K.

Returning to FIG. 6L, the user rotates rotatable input mechanism 604 to scroll to the top of compass user interface 612. As a result, electronic device 600 detects input 636C, and in response, returns to displaying compass user interface 612, as shown in FIG. 6M. At FIG. 6M, the user performs a deep press gesture to navigate back to bearing menu 634. As a result, while displaying compass user interface 612, electronic device 600 detects input 644.

Figure 6N:
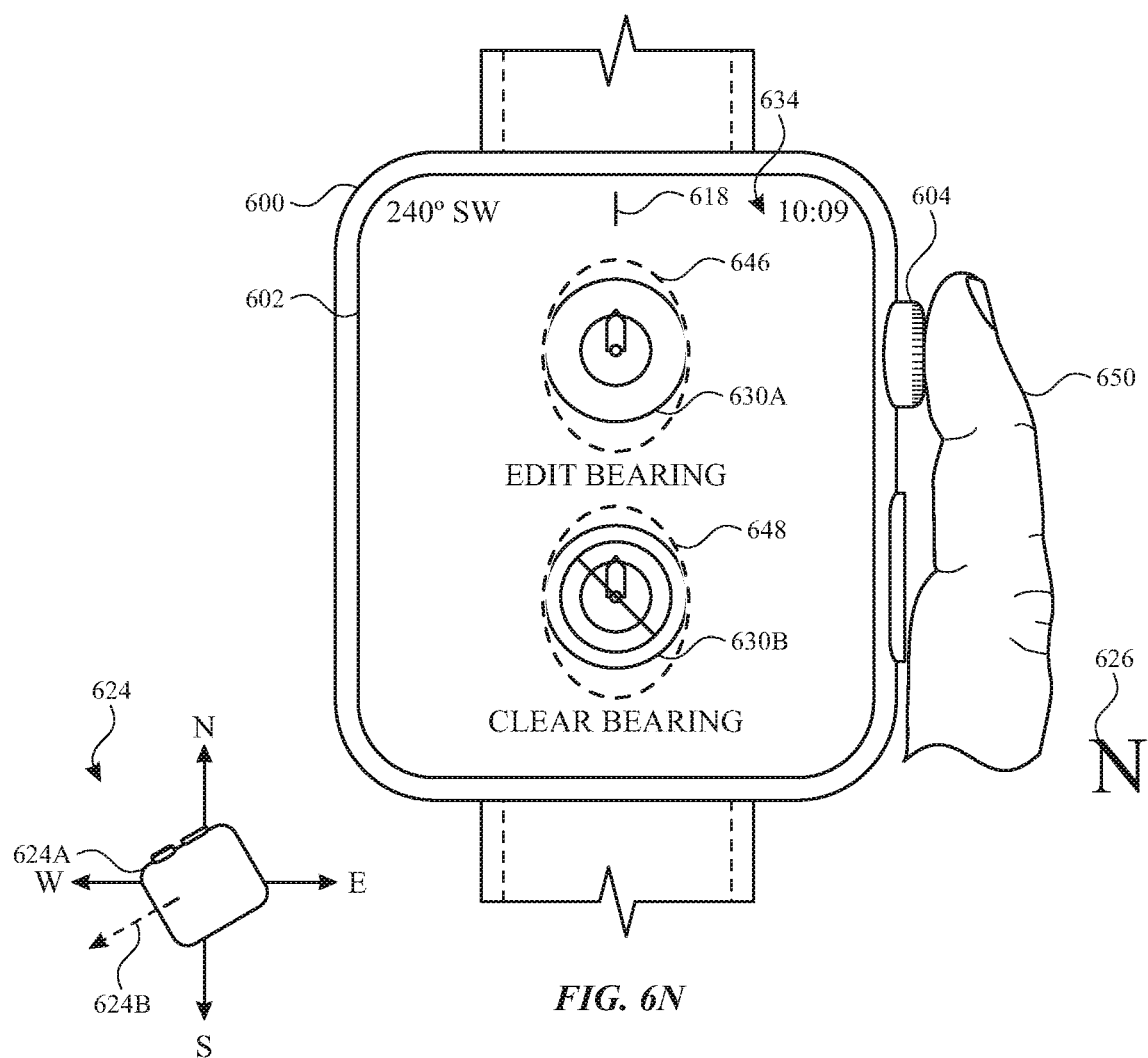

At FIG. 6N, in response to detecting input 644 and in accordance with a determination that an intensity of input 644 exceeds an intensity threshold, electronic device 600 replaces display of compass user interface 612 with display of bearing menu 634. In contrast to bearing menu 634 in FIG. 6E, bearing menu 634 in FIG. 6N also includes affordance 630B which, when selected, clears the set bearing. In some embodiments, electronic device 600 displays affordance 630B in response to detecting input 644 and in accordance with a determination that a bearing has been set. In some embodiments, clearing the set bearing causes bearing indicator 640 to cease to be displayed in compass user interface 612. As an example, in response to detecting input 648 (e.g., tap gesture) at affordance 630B, electronic device 600 replaces display of bearing menu 634 with display of compass user interface 612 without bearing indicator 640. Thus, electronic device 600 would return to displaying compass user interface 612 in FIG. 6B (prior to the bearing being set by the user), with the exception that compass user interface 612 would reflect that electronic device 600 is oriented to 240° (e.g., the 240° marker of dial 616 would be aligned with direction of travel indicator 618).

In some embodiments, electronic device 600 detects input 646 at affordance 630A and, in response, electronic device 600 replaces display of bearing menu 634 with display of modified compass user interface 637 in FIG. 6F, with the exception that modified compass user interface 637 would reflect that electronic device 600 is oriented to 240° (e.g., the 240° marker of dial 616 would be aligned with direction of travel indicator 618).

Figure 6O:
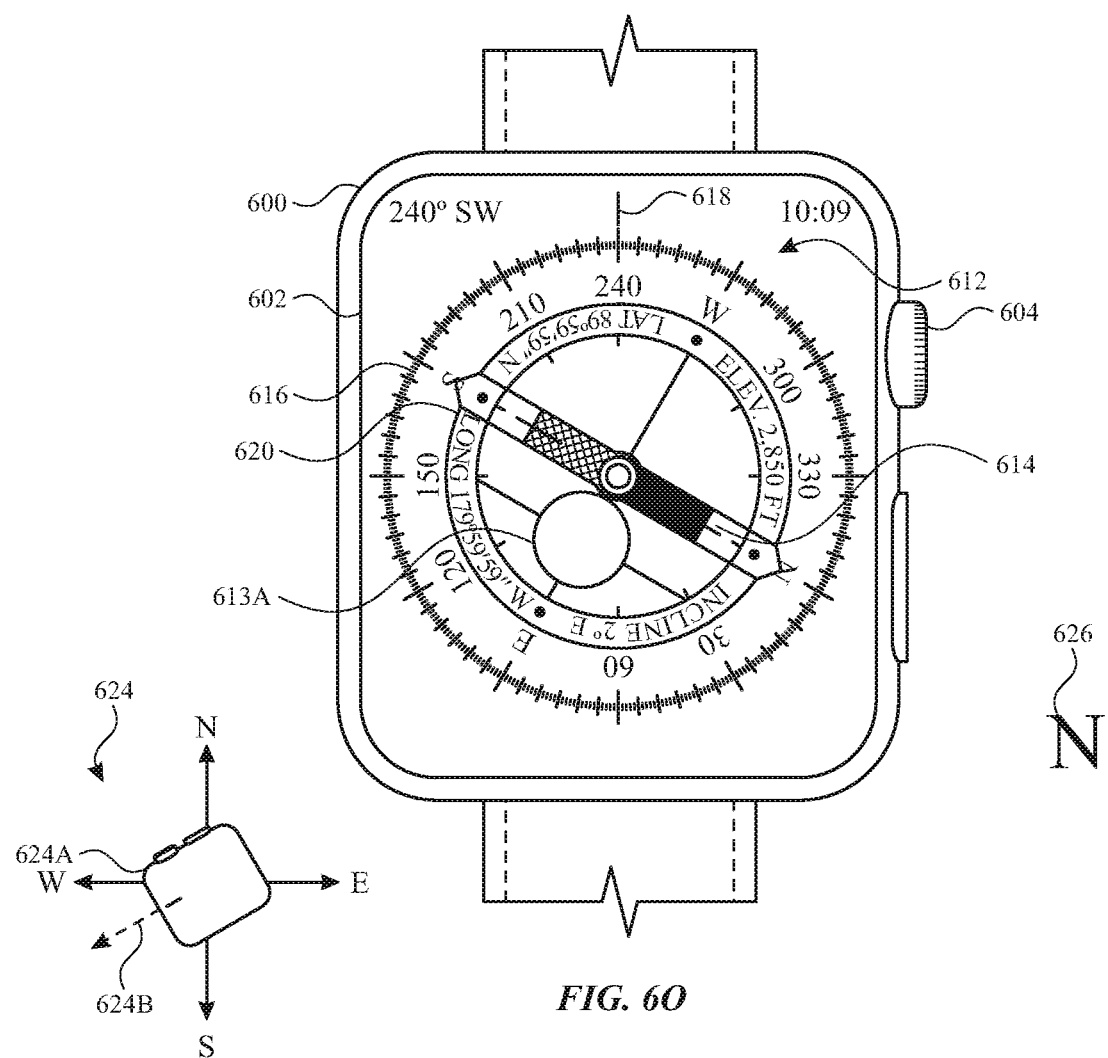

Returning to FIG. 6N, the user depresses rotatable input mechanism 604. As a result, electronic device 600 detects input 650 via rotatable input mechanism 604. At FIG. 6O, in response to detecting input 650, electronic device 600 returns to displaying compass user interface 612. FIG. 6N and previous figures such as FIG. 6M depict compass user interface 612 with level indicator 613A. With reference to FIG. 6M, level indicator 613A is substantially centered relative to compass user interface 612 (e.g., dial 616), which provides an indication that electronic device 600 is substantially parallel to the ground. In contrast, level indicator 613A in FIG. 6O is not substantially centered, which provides an indication that electronic device 600 is not substantially parallel to the ground. It is noted that level indicator 613A is used when electronic device 600 is oriented within a threshold range of orientations that correspond to measuring an orientation of the device relative to the ground.

Figure 6P:
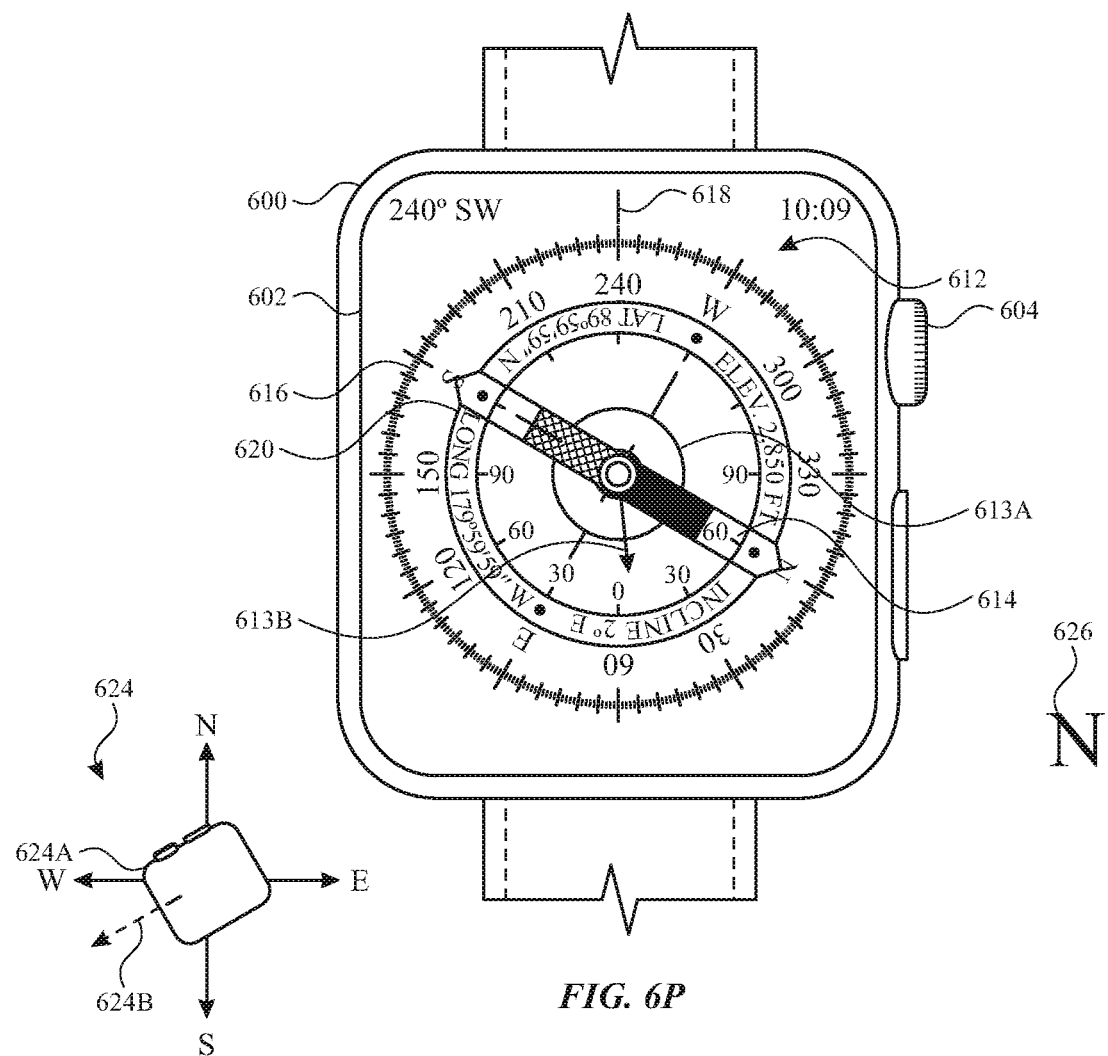

FIG. 6P depicts incline indicator 613B, which is used when electronic device 600 is oriented within a threshold range of orientations that correspond to measuring an orientation of the device relative to the direction of gravity. At FIG. 6P, the user has raised their wrist such that electronic device 600 is substantially parallel with to the direction of gravity. The user then rotates electronic device 600 to align the device with the slope angle of the ground. As shown in FIG. 6P, incline indicator 613B points to 2° as the slope angle, which provides an indication that the ground is roughly flat. In some embodiments, when electronic device 600 is oriented within a threshold range of orientations for measuring an orientation of the device relative to the direction of gravity, level indicator 613A ceases to be displayed.

Figure 6Q:
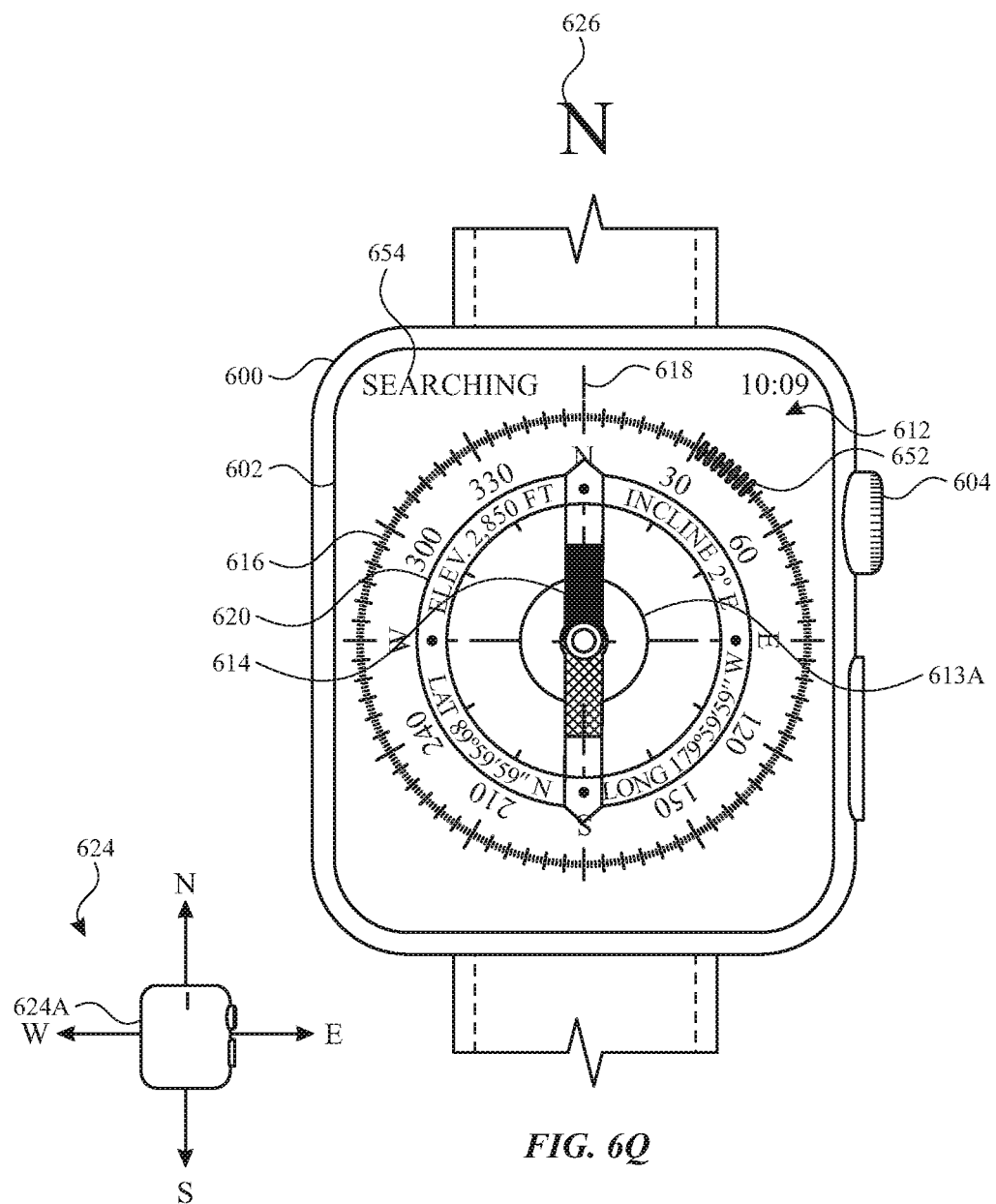
Figure 6R:
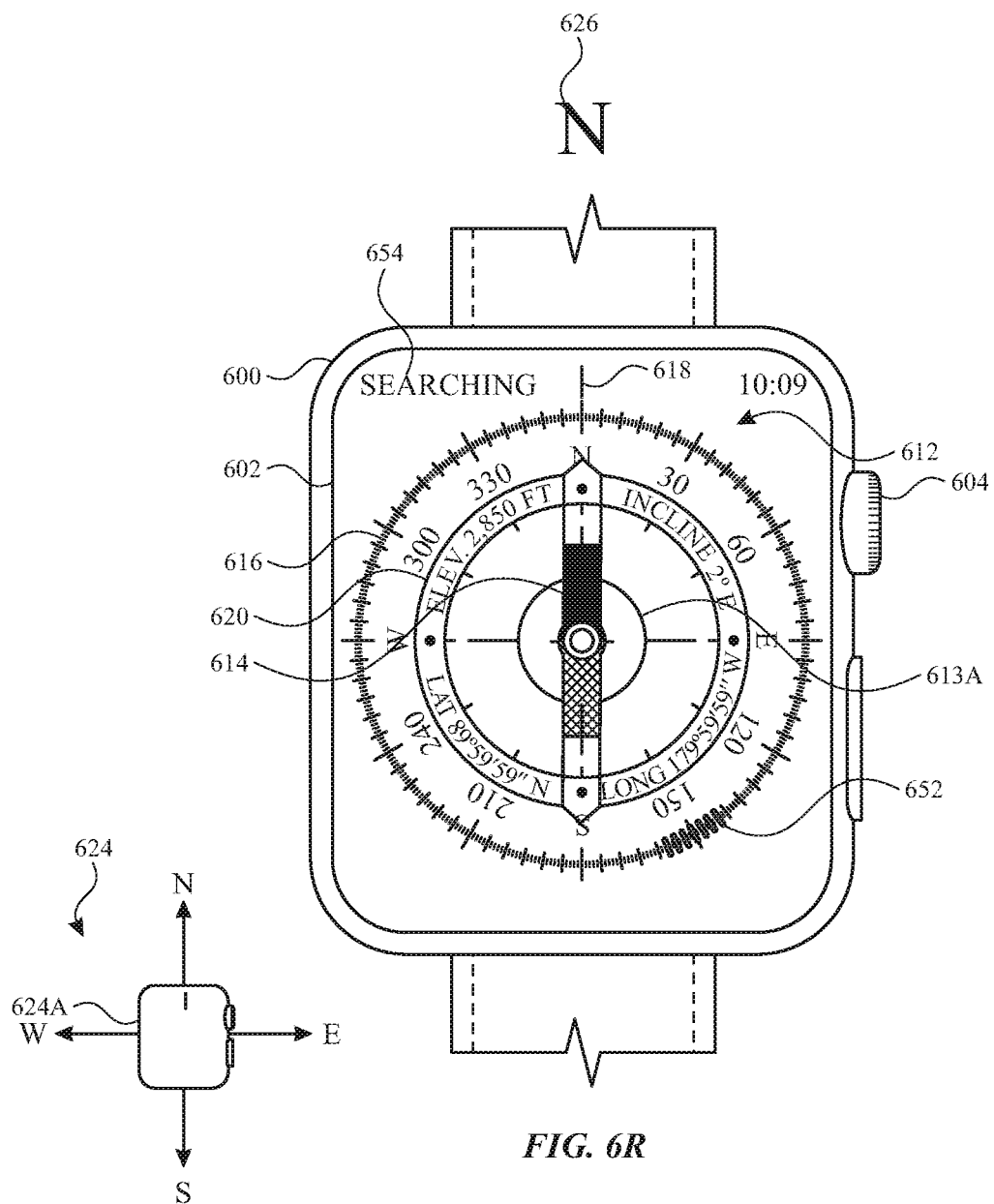

FIGS. 6Q-6R depict compass user interface 612 when the sensor data used to determine the orientation of electronic device 600 relative to a predefined direction is insufficient (e.g., not detected). When the sensor data is insufficient, electronic device 600 does not provide a valid indication of the orientation of electronic device 600 relative to a predefined direction. In some embodiments, in response to determining that the sensor data is insufficient, electronic device 600 displays compass user interface 612 with indicators 652 and 654, each of which provides an indication of insufficient sensor data. As illustrated in FIGS. 6Q-6R, electronic device 600 animates indicator 652 such that indicator 652 moves around dial 616 as time elapses.

FIGS. 6S-6X depict clock faces that include information from the compass application. With reference to FIG. 6I, the user turns right to face 300° and performs one or more inputs to navigate to a clock face. As a result, in response to detecting the one or more inputs, electronic device 600 displays clock face 656 in FIG. 6S, in accordance with some embodiments. Clock face 656 includes an indication of the time and date. Additionally, clock face 1800 includes complications 656A-656D. In some embodiments, a complication refers to a clock face feature other than those used to indicate the hours and minutes of a time (e.g., clock hands or hour/minute indications). In some embodiments, complications provide different types of information to a user, such as data obtained from an application. In some embodiments, the information conveyed to a user by a complication is customizable. In some embodiments, a complication that is displayed at a particular location on the display can be configured to be displayed at a different location on the clock face. In some embodiments, a complication or a version thereof can be displayed at two different locations on the clock face. In some embodiments, in response to detecting an input (e.g., tap gesture) at a complication, electronic device 600 replaces display of a clock face (e.g., 656) with display of a user interface for an application corresponding to the selected complication (e.g., compass application).

Figure 6S:
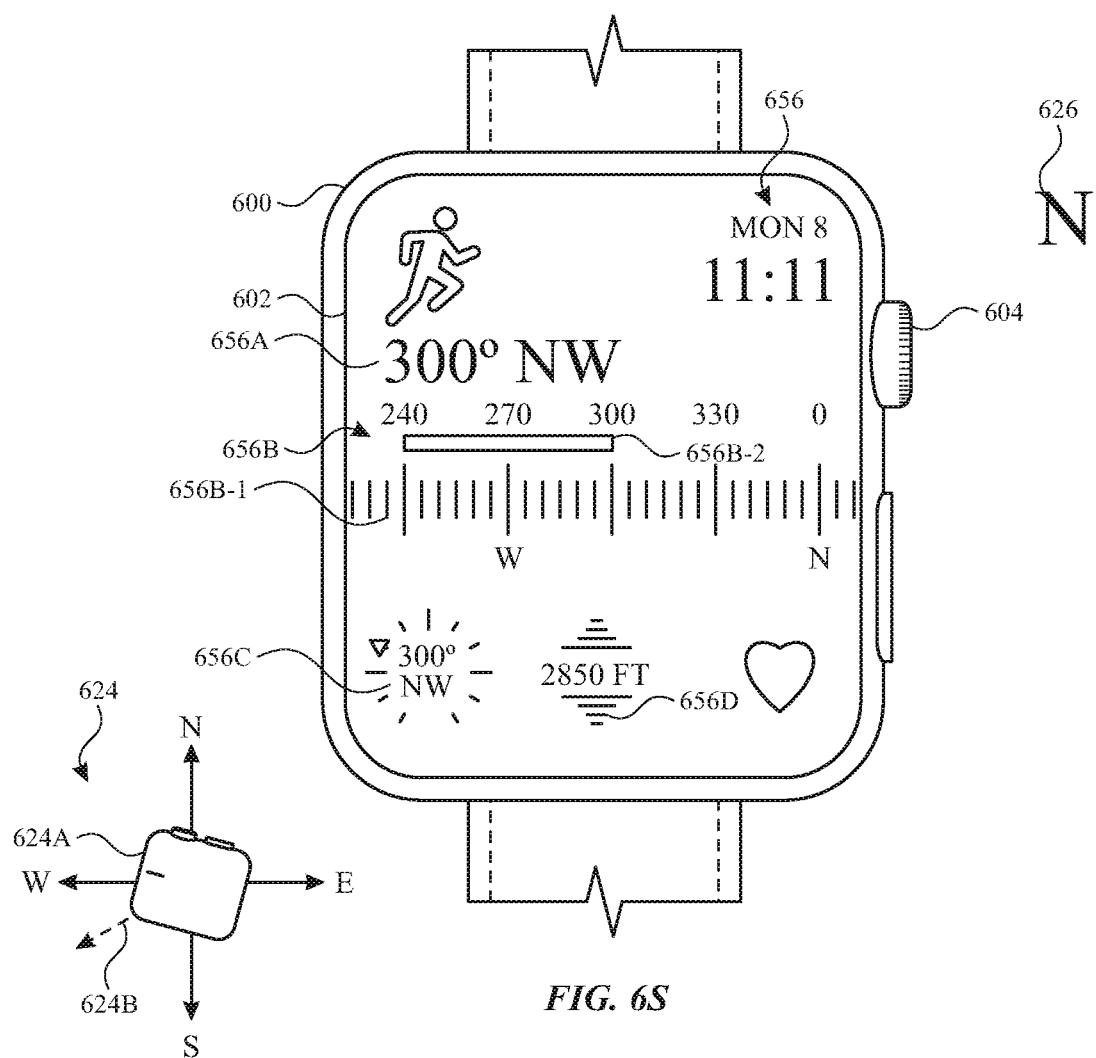

As shown in FIG. 6S, clock face 656 includes complication 656A and 656C, each of which provides an indication of the direction (e.g., 300°) in which electronic device 600 is oriented relative to a predefined direction (e.g., north). Clock face 656 also includes complication 656D, which provides an indication of the elevation of electronic device 600. Moreover, clock face 656 includes complication 656B, which also provides an indication of the direction in which electronic device 600 is oriented relative to the predefined direction. In particular, complication 656B includes dial 656B-1, which serves the same function as dial 616 in compass user interface 612, and bearing indicator 656B-2, which serves the same function as bearing indicator 640 in compass user interface 612.

Figure 6T:
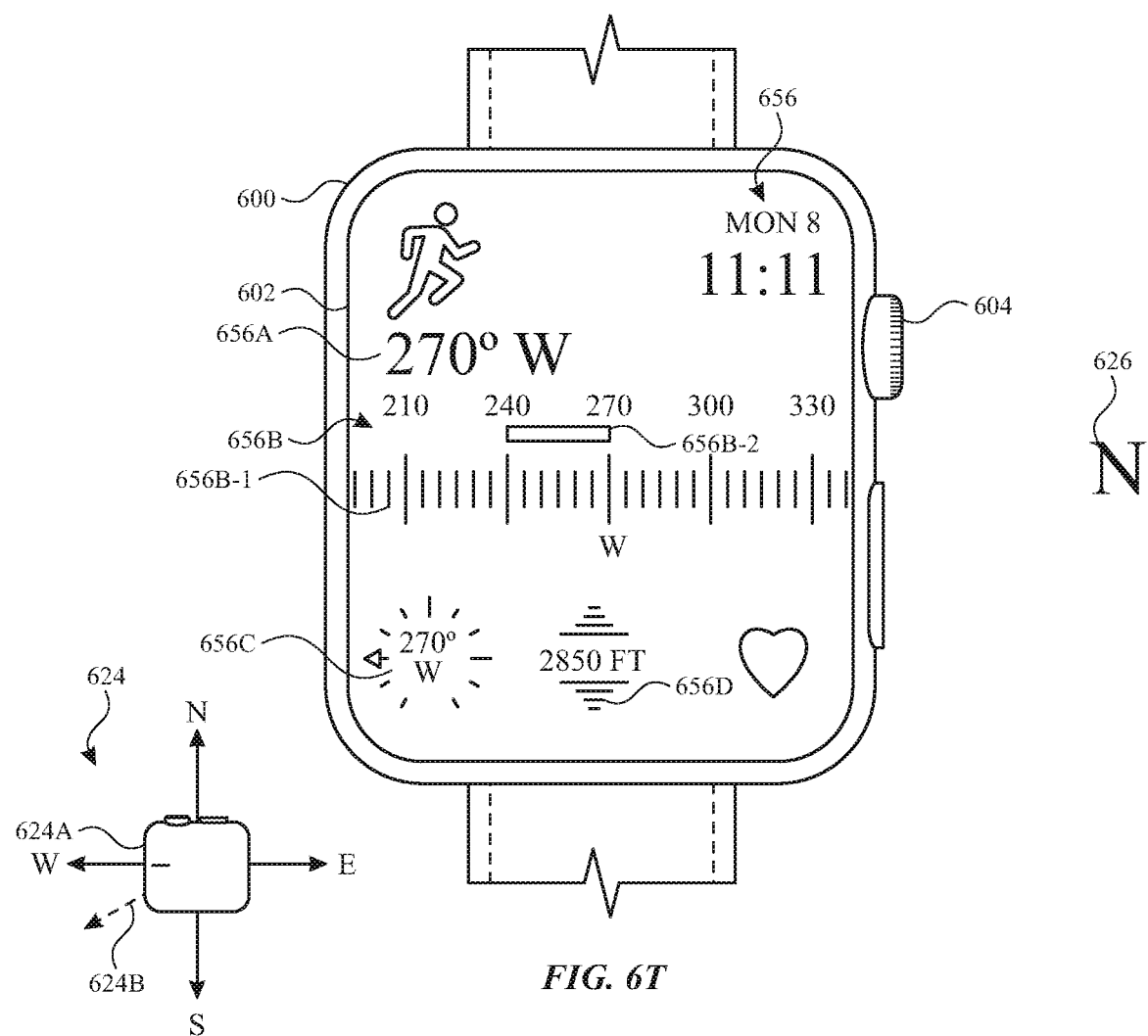
Figure 6U:
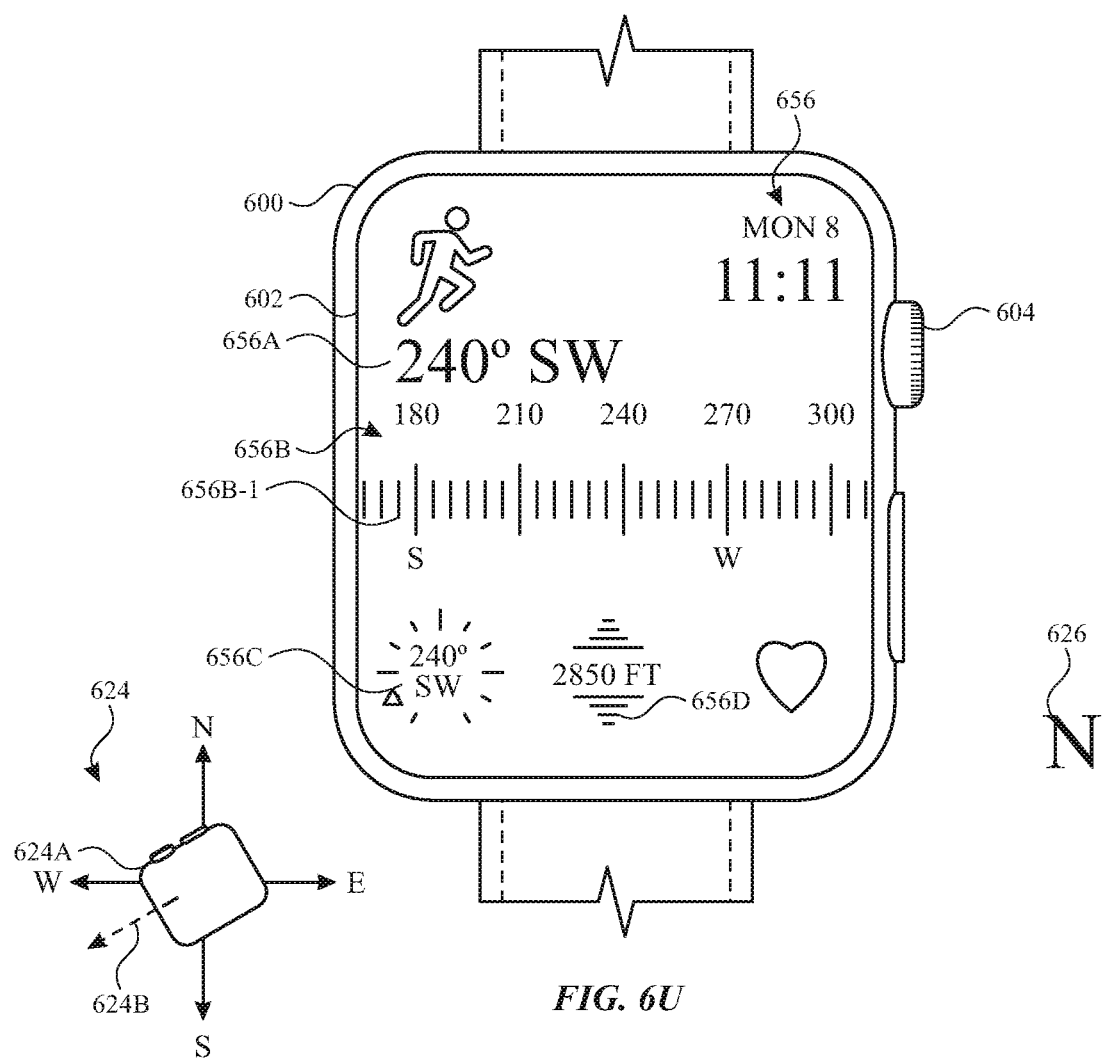

FIGS. 6S-6U illustrate how complication 656B is updated as the orientation of electronic device 600 changes with respect to a predefined direction (e.g., north). At FIG. 6S, the user turns left to face the direction of the bearing at 240°. At FIG. 6T, as result of the user turning, electronic device 600 updates clock face 656 to reflect the new direction in which electronic device 600 is oriented. Accordingly, dial 656B-1 slides to the right such that 270° is substantially centered, and bearing indicator 656B-2 reduces in size. Further, complications 656A and 656C change from 300° to 270°. With reference to FIG. 6T, the user continues to turn left to face the direction of the bearing at 240°. At FIG. 6U, as a result of the continued turning, electronic device 600 updates clock face 656 and the appropriate complications (e.g., 656A-656C) to indicate that electronic device 600 is now oriented to 240°.

Figure 6V:
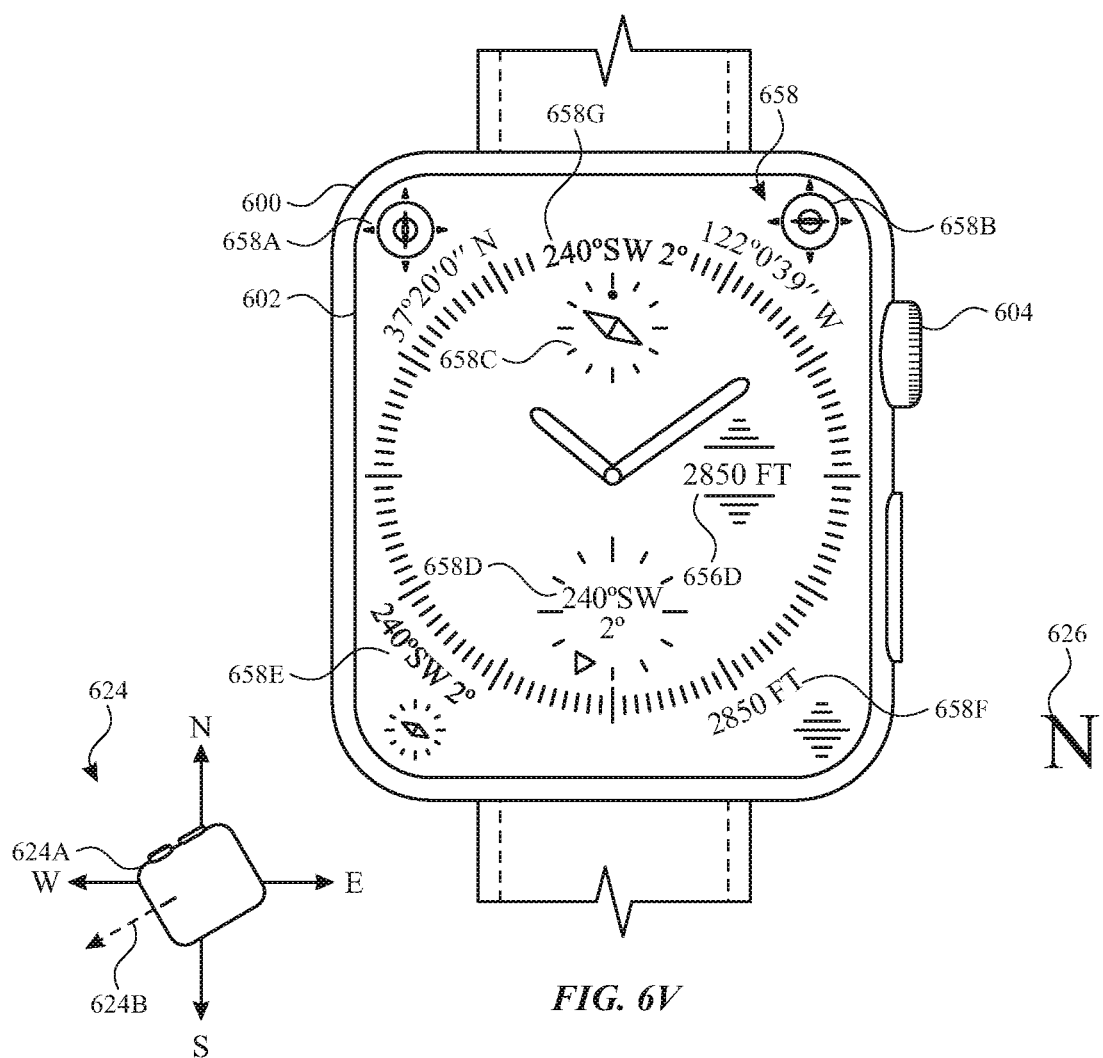
Figure 6W:
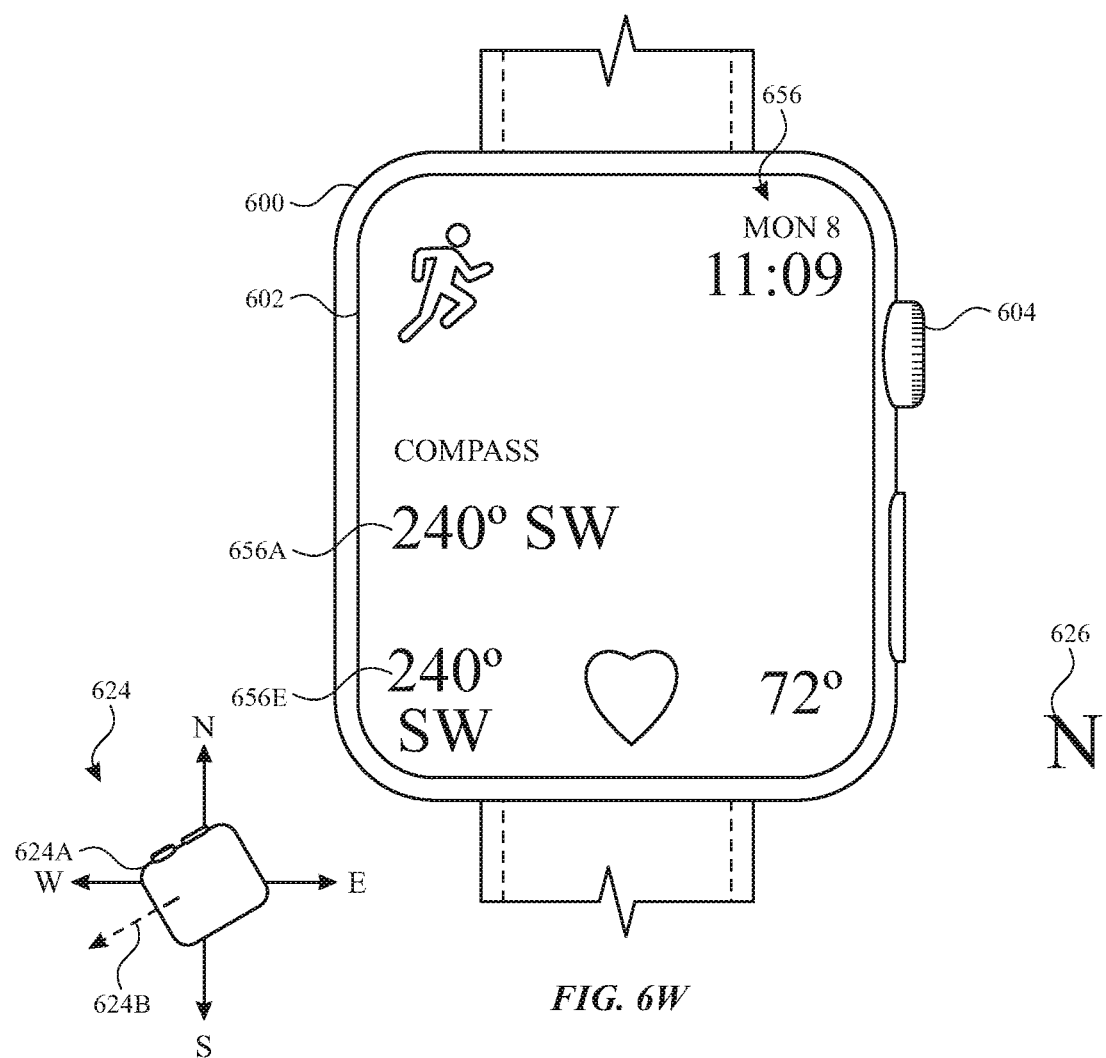
Figure 6X:
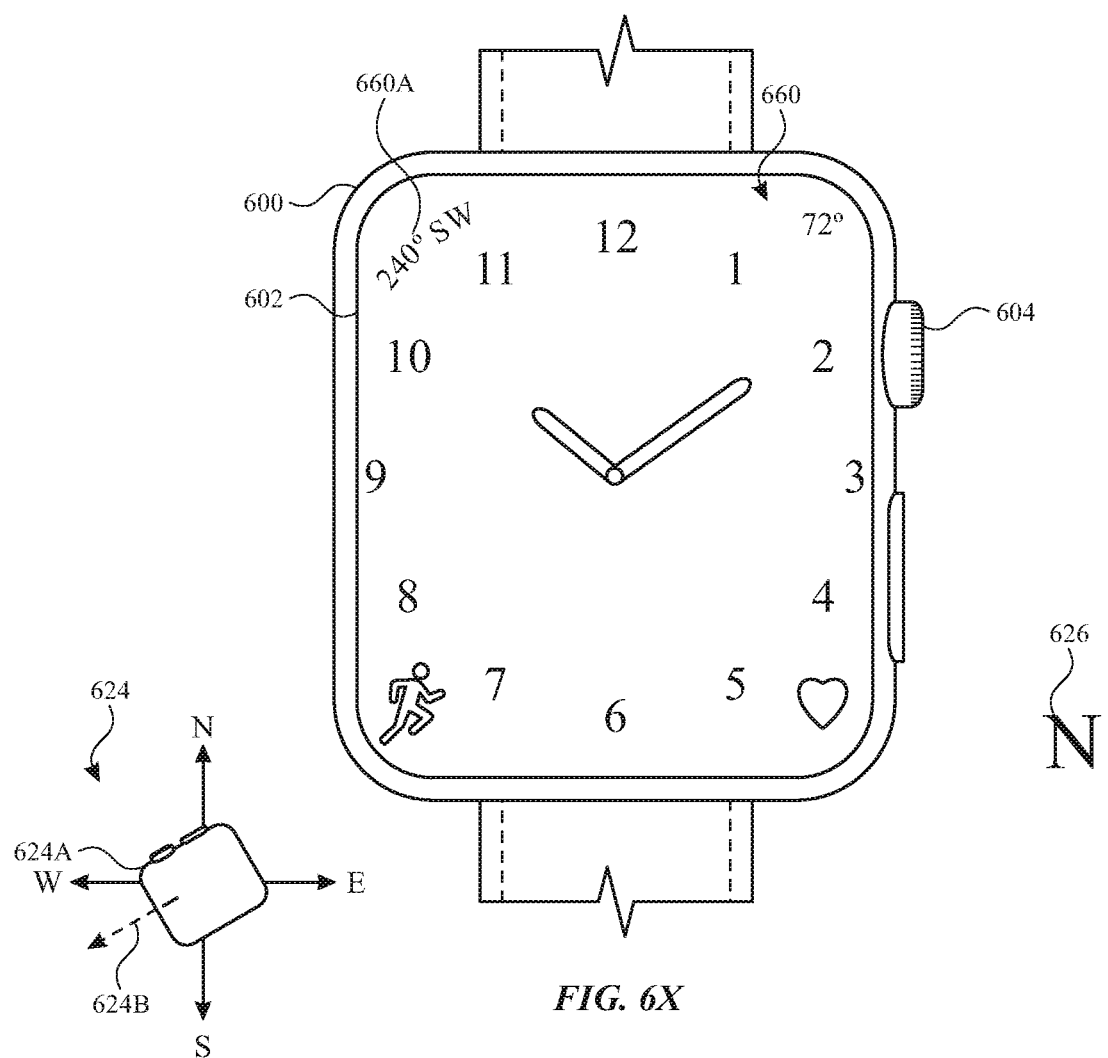

FIG. 6V-6X depict alternative clock faces for displaying data from the compass application. At FIG. 6V, electronic device 600 displays clock face 658, which includes complications 658A-658G and 656D. Complications 658A-658B provide indications of latitude and longitude, respectively. For example, complications 658A-658B include numerical values for latitude and longitude, as shown in FIG. 6V. Complications 658C-658E and 658G provide an indication of the direction (e.g., 240°) in which electronic device 600 is oriented relative to a predefined direction (e.g., north). Additionally, complication 658F provides an indication of the elevation of electronic device 600. At FIG. 6W, electronic device 600 displays clock face 656, which has been configured to display a different arrangement of complications, as compared to FIG. 6U. For example, clock face 656 in FIG. 6W does not include complication 656B of FIG. 6U. Instead, clock face 656 includes complication 656A at a new location as compared to FIG. 6U. Further, clock face 656 includes complication 656E, which provides an indication of the direction in which electronic device 600 is oriented relative to a predefined direction. At FIG. 6X, electronic device 600 displays clock face 660 with complication 660A, which also provides an indication of the direction in which electronic device 600 is oriented relative to a predefined direction.

FIG. 7 is a flow diagram illustrating an exemplary process for a compass application, in accordance with some embodiments. Method 700 is performed at a device (e.g., 100, 300, 500, 600) with a display device and a rotatable input mechanism (e.g., a physical crown that has a fixed axis about which the physical crown rotates relative to the display device and a housing of the electronic device). Some operations in method 700 are, optionally, combined, the orders of some operations are, optionally, changed, and some operations are, optionally, omitted.

As described below, method 700 provides an intuitive way for setting a bearing in a compass application. The method reduces the cognitive burden on a user for setting a bearing, thereby creating a more efficient human-machine interface. For battery-operated computing devices, enabling a user to set a bearing faster and more efficiently conserves power and increases the time between battery charges.

The electronic device (e.g., 600) displays (702), via the display device (e.g., 602), a compass user interface (in an edit mode) (e.g., 637) with a direction indicator (e.g., 614, 616) and a bearing indicator (e.g., 640), wherein: the direction indicator (e.g., a user interface element (e.g., chevron/needle/dial) that points to a predefined compass direction such as north, where the user interface element rotates on the display device as the device rotates so that the user interface element continues to point to north) provides an indication of a respective compass direction (e.g., a direction relative to the earth's magnetic field such as a cardinal direction (e.g., north (e.g., true north, magnetic north), south, west, east)), wherein the appearance of the direction indicator is determined based on the orientation of the electronic device relative to the respective compass direction; and the bearing indicator provides an indication of an offset from the respective compass direction (e.g., a direction relative to the earth's magnetic field) (e.g., while concurrently displaying the direction indicator and/or the direction of travel indicator e.g., 618)).

In some embodiments, the direction indicator (e.g., 614, 616) includes one or more of numerical elements (e.g., degrees), textual elements (e.g., cardinal directions), graphical dial (e.g., 616), and a graphical needle (e.g., 614). In some embodiments, the location/orientation of the direction indicator on the display device (e.g., 602) changes (e.g., with respect to a fixed point on the display device) based on (e.g., in response to) a change in orientation of the device relative to the particular direction. In some embodiments, the compass user interface (e.g., 637) includes a direction of travel indicator (e.g., 618), which is displayed at a fixed location/orientation on the display of the electronic device regardless of the change in orientation of the electronic device. In some embodiments, the direction of travel indicator provides an indication of the orientation of the electronic device with respect to the environment (e.g., the direction the electronic device and, optionally, the user is facing) direction in which the user intends to travel. In some embodiments, the location/orientation of the direction of travel indicator (on the display) does not change based on (e.g., in response to) a change in orientation of the device relative to the particular direction.)

In some embodiments, the bearing indicator (e.g., 640) includes a first point at a location (e.g., 618) corresponding to the respective compass direction (e.g., the direction in which the device is currently facing/oriented towards) and/or a second point at a location corresponding to the direction of the bearing indicator (e.g., the direction in which the user intends to travel). In some embodiments, the bearing indicator includes a graphical arc between the first point and the second point. In some embodiments, the graphical arc changes in size in response to the device (e.g., 600) detecting rotation of the rotatable input mechanism (e.g., 604). In some embodiments, the user configures the bearing indicator to set a direction pointing at a landmark to which the user wants to travel. In some embodiments, displaying the compass user interface (in the edit mode) (e.g., 637) includes changing visual characteristics (e.g., reducing opacity, darkening, blurring, ceasing display) of displayed elements (e.g., 614, 616) on the display device (e.g., the direction indicator or a portion thereof).)

While displaying the bearing indicator (e.g., 640) (in an edit mode), the electronic device (e.g., 600) detects (704) rotation (e.g., via input 636A) of the rotatable input mechanism (e.g., 604) (and, optionally, while concurrently displaying the bearing indicator and the direction indicator (e.g., 614, 616)).

In response (706) to detecting rotation of the rotatable input mechanism, the electronic device (e.g., 600) changes (708) the displayed position of the bearing indicator (e.g., 640) from a first position to a second position (e.g., relative to a position of the direction indicator) by an amount that is determined in accordance with a magnitude (and, optionally, direction) of the rotation (e.g., via input 636A) of the rotatable input mechanism (e.g., 604) (e.g., such that changing the position of the bearing indicator to the second position changes the amount of offset of the bearing indicator with the respective compass direction). Changing the displayed position of the bearing indicator via the rotatable input mechanism allows the user to precisely set the bearing while the compass user interface is displayed on a small display. Use of the rotatable input mechanism enhances the operability of the device and makes the user-device interface more efficient (e.g., by helping the user efficiently set the bearing in the compass application) which, additionally, reduces power usage and improves battery life of the device by enabling the users to use the devices more quickly and efficiently.

In some embodiments, changing the displayed position of the bearing indicator includes rotating the bearing indicator (e.g., in cases where the bearing indicator is a needle similar to needle 614). In some embodiments, in response to detecting rotation of the rotatable input mechanism (e.g., 604), a first point of the bearing indicator remains fixed while a second point of the bearing indicator changes. In some embodiments, further detecting rotation of the rotatable input mechanism results in changing the displayed position of the bearing indication from the second position to a third position. In some embodiments, detecting further rotation of the rotatable input mechanism results in changing the displayed position of the bearing indication from the third position to the first position. In some embodiments, the amount of change in the displayed position of the bearing indicator is based on the detected amount (e.g., magnitude, speed, and/or duration) of rotation of the rotatable input mechanism. In some embodiments, the amount of change in the displayed position of the bearing indicator is proportional to the detected amount of rotation of the rotatable input mechanism.

In some embodiments, detecting a change in orientation of the electronic device (e.g., 600) relative to the respective compass direction causes the displayed position of the bearing indicator (e.g., 640) to change in the first mode (e.g., a non-edit mode, when compass user interface 612 is displayed). In some embodiments, detecting a change in orientation of the electronic device relative to the respective compass direction does not cause the displayed position of the bearing indicator to change in the second mode (e.g., an edit mode, when compass user interface 637 is displayed). In some embodiments, detecting rotation of the rotatable input mechanism (e.g., 604) causes the displayed position of the bearing indicator to change in the second mode (e.g., an edit mode, when compass user interface 637 is displayed). In some embodiments, detecting rotation of the rotatable input mechanism does not cause the displayed position of the bearing indicator to change in the first mode (e.g., a non-edit mode, when compass user interface 612 is displayed). In some embodiments, activating the "done" button (e.g., 638A) (e.g., while in the second mode, an edit mode) causes the bearing indicator to be set relative to north as shown on the display (e.g., 602). In some embodiments, while in the second mode (e.g., an edit mode, when compass user interface 637 is displayed), the displayed position of the bearing indicator does not change in response to the electronic device detecting a change in orientation of the electronic device relative to the respective compass direction.

In some embodiments, prior to displaying the compass user interface (e.g., 637), the electronic device (e.g., 600) displays, via the display device (e.g., 602), a second compass user interface (e.g., 612, a navigation mode, a first mode) with the direction indicator (e.g., 614, 616) and the bearing indicator (e.g., 640). In some embodiments, the second compass user interface does not include the bearing indicator. In some embodiments, the direction indicator provides an indication of the respective compass direction (e.g., a direction relative to the earth's magnetic field such as a cardinal direction (e.g., north (e.g., true north, magnetic north), south, west, east)). In some embodiments, the appearance of the direction indicator is determined based on the orientation of the electronic device relative to the respective compass direction.

In some embodiments, the bearing indicator (e.g., 640) provides an indication of an offset (e.g., thus providing an indication of the direction to a destination to which the user intends to travel) from the respective compass direction (e.g., a direction relative to the earth's magnetic field) (e.g., while concurrently displaying the direction of travel indicator (e.g., 618)). In some embodiments, the user configures the bearing indicator to set a direction pointing at a landmark to which the user wants to travel. In some embodiments, the bearing indicator is configured to indicate that there is no offset from the respective compass direction. In some embodiments, displaying the bearing setting user interface (e.g., 637) includes changing visual characteristics (e.g., reducing opacity, darkening, blurring, ceasing display) of displayed elements on the display device (e.g., the direction indicator or a portion thereof). In some embodiments, the bearing indicator includes a first point at a location corresponding to the respective compass direction (e.g., the direction in which the device is currently facing/oriented towards) and/or a second point at a location corresponding to the direction of the bearing indicator (e.g., the direction in which the user intends to travel). In some embodiments, the bearing indicator includes a graphical arc between the first point and the second point. In some embodiments, the graphical arc changes in size in response to the device detecting a change in orientation relative to the respective compass direction. Thus, when the graphical arc ceases to display, the electronic device is oriented directly towards the direction of the bearing indicator (e.g., the direction in which the user intends to travel). In some embodiments, even when the electronic device is oriented directly towards the direction of the bearing indicator, the bearing indicator continues to be displayed.

In some embodiments, while displaying the bearing indicator (e.g., 640) (in the first position, in the navigation mode (e.g., when compass user interface 612 is displayed) different from the edit mode), the electronic device (e.g., 600) detects rotation (e.g., via input 636B) of the rotatable input mechanism (e.g., 604) (and, optionally, while concurrently displaying the bearing indicator and the direction indicator). In some embodiments, in response to detecting rotation of the rotatable input mechanism, the electronic device forgoes changing the displayed position of (e.g., forgoing rotating) the bearing indicator (e.g., 640) relative to the direction indicator (e.g., 614, 616) (e.g., thereby not changing the amount of offset of the bearing indicator with the respective compass direction). Forgoing changing the displayed position in response to detecting rotation of the rotatable input mechanism requires the user to enter an edit mode to set the bearing. Since the user needs to enter an edit mode to adjust the bearing using the rotatable input mechanism, accidental changes to a previously set bearing (e.g., the current bearing setting) are avoided while in the navigation mode. Preventing unintentional changes to the set bearing enhances the operability of the device and makes the user-device interface more efficient (e.g., by helping to avoid extraneous inputs that would otherwise be needed to correct the set bearing) which, additionally, reduces power usage and improves battery life of the device by enabling the user to use the device more quickly and efficiently.

In some embodiments, the electronic device (e.g., 600) displays (concurrently with the direction indicator and the bearing indicator), via the display device (e.g., 602), a first representation of a first geographic information (e.g., longitude as depicted in ring 620 of FIG. 6B, a geographic coordinate that specifies the east—west position of the electronic device on the Earth's surface) of the electronic device and a second representation of a second geographic information (e.g., latitude as depicted in ring 620 of FIG. 6B, a geographic coordinate that specifies the north—south position of the electronic device on the Earth's surface) of the electronic device. Exemplary geographic information of the electronic device includes: geographic coordinates (longitude, latitude) of the location electronic device, elevation (e.g., height above or below a fixed reference point (such as the surface of the Earth or sea level) as depicted in ring 620 of FIG. 6B) of the location of the electronic device, and incline (e.g., angle from horizontal as depicted in ring 620 of FIG. 6B) of the orientation of the electronic device. In some embodiments the first representation of the first geographic information and the second representation of second geographic information are arranged in a circle (e.g., 620) or an arc (a minor arc, a major arc) of a circle. In some embodiments, the direction indicator (e.g., 614, 616) and/or bearing indicator are configured to rotate using the center of the circle (e.g., 620) as a pivot point. In some embodiments, the first representation of the first geographic information and the second representation of the second geographic information are displayed in both the edit mode (e.g., when compass user interface 637 is displayed) and the navigation mode (e.g., when compass user interface 612 is displayed). In some embodiments, the display of the representations of the geographic information is updated live (e.g., continuously, periodically) based on information collected by the electronic device.

In some embodiments, while displaying (e.g., in the navigation mode) the first representation of the first geographic information (e.g., longitude as depicted in ring 620 of FIG. 6K) at a first size (and optionally at a first orientation (e.g., non-horizontal) on the display device) and the second representation of the second geographic information (e.g., latitude as depicted in ring 620 of FIG. 6K) at a second size (and optionally at a second orientation on the display device), the electronic device (e.g., 600) detects a scroll input (e.g., 636B) that includes a directional component (e.g., a swipe up input on a touch-sensitive surface, a rotation of the rotatable input mechanism (e.g., 604)).

In some embodiments, in response to detecting the scroll input (e.g., 636B), the electronic device shifts the compass user interface (e.g., 612) in accordance with the directional component to display: a third representation (e.g., longitude information as depicted in the bottom portion of FIG. 6L) of the first geographic information at a third size that is larger than the first size (and optionally at a third orientation (e.g., horizontal) different from the first orientation on the display device) and a fourth representation (e.g., latitude information as depicted in the bottom portion of FIG. 6L) of the second geographic information at a fourth size that is larger than the second size (e.g., and at a fourth orientation (e.g., horizontal) different from the second orientation on the display device).

In some embodiments, detecting the scroll input (e.g., 636B) (while in the navigation mode (e.g., when compass user interface 612 is displayed)) causes the direction indicator (e.g., 614, 616) and the bearing indicator (e.g., 640) (or at least a portion thereof) to scroll off of the display (e.g., 602) and for geographic information to scroll onto the display (e.g., as shown in FIG. 6L). In some embodiments, in response to detecting the scroll input (while in the navigation mode), the electronic device (e.g., 600) displays one or more of (or all of) a numerical heading (e.g., in degrees) based on the orientation of the electronic device, a numerical incline (e.g., in degrees) based on the orientation of the electronic device, a numerical bearing (e.g., in degrees) that is not based on the orientation of the electronic device, a numerical ground elevation (e.g., in feet) that is based on the geographic location of the electronic device, a numerical longitude and numerical latitude (e.g., in degrees) that are based on the geographic location of the electronic device. In some embodiments, the third representation provides a more precise value for the first geographic information as compared to the first representation, and the fourth representation provides a more precise value for the second geographic information as compared to the second representation. In some embodiments, in response to detecting the scroll input, the electronic device displays one or more additional geographic information(s) that were not displayed concurrently with the first representation of the first geographic information. In some embodiments, in response to detecting the scroll input (e.g., 636B, detecting rotation of the rotatable input mechanism (e.g., 604)), the electronic device forgoes changing the displayed position of (e.g., forgoing rotating) the bearing indicator (e.g., 640) relative to the direction indicator (e.g., 614, 616) (thereby not changing the amount of offset of the bearing indicator with the respective compass direction).

In some embodiments, the displayed third representation of the first geographic information and the fourth representation of the second geographic information (e.g., as depicted in FIG. 6L) are updated (e.g., periodically, continuously, repeatedly) to reflect an updated location or orientation of the electronic device (e.g., 600). In some embodiments, the electronic device displays (e.g., adjacent to the respective geographic information) an amount of time in which the respective geographic information was last updated (e.g., "7M AGO" as shown in FIG. 6). In some embodiments, the displayed first representation of the first geographic information and the second representation of the second geographic information are updated (e.g., periodically, continuously, repeatedly) to reflect an updated location or orientation of the electronic device.

In some embodiments, prior to displaying the compass user interface (e.g., 637), the electronic device (e.g., 600) displays, via the display device (e.g., 602), the second compass user interface (e.g., 612, a navigation mode, a first mode) with the direction indicator (e.g., 614, 616) (and optionally without the bearing indicator (e.g., 640)). In some embodiments, the direction indicator provides an indication of the respective compass direction (e.g., a direction relative to the earth's magnetic field such as a cardinal direction (e.g., north (e.g., true north, magnetic north), south, west, east)), wherein the appearance of the direction indicator is determined based on the orientation of the electronic device relative to the respective compass direction.

In some embodiments, the electronic device (e.g., 600) detects, via the touch-sensitive surface (e.g., of display device 602), a user input (e.g., 628, at a location corresponding to the second compass user interface (e.g., 612), at a location corresponding to the direction indicator (e.g., 614, 616). In some embodiments, in response to detecting the user input (e.g., 628): in accordance with a determination that a characteristic intensity of the user input exceeds an intensity threshold (e.g., a non-zero threshold), the electronic device displays an edit affordance (e.g., 630A) which, when selected, results in display of the compass user interface (e.g., 637) (e.g., 637, edit mode, a second mode) (and optionally independent of a location of the user input (e.g., 628) on the touch-sensitive surface). Requiring the user to enter an edit mode to set the bearing prevents accidental changes to the set bearing while in the navigation mode. Preventing unintentional changes to the set bearing enhances the operability of the device and makes the user-device interface more efficient (e.g., by helping to avoid extraneous inputs that would otherwise be needed to correct the set bearing) which, additionally, reduces power usage and improves battery life of the device by enabling the user to use the device more quickly and efficiently.

In some embodiments, in response to detecting the user input (e.g., 628): in accordance with a determination that the second compass user interface (e.g., 612) includes the bearing indicator (e.g., 640) (e.g., in accordance with a determination that a bearing has been set for the device (e.g., via input 642)), the electronic device displays, via the display device, a clear affordance (e.g., 630B) which, when selected (e.g., via input 648), initiates a process for removing the bearing indicator from the second compass user interface (e.g., 612), wherein the clear affordance is concurrently displayed with the edit affordance. In some embodiments, initiating the process including displaying the second compass user interface (e.g., 612) without the bearing indicator (e.g., 640). In some embodiments, in accordance with a determination that the second compass user interface does not include the bearing indicator, the electronic device forgoes display of the clear affordance (e.g., 630B).

In some embodiments, displaying the compass user interface (e.g., 637) includes emphasizing the bearing indicator (e.g., 640) while de-emphasizing one or more displayed visual objects (e.g., 614, 616). In some embodiments, displaying the compass user interface (e.g., 637) includes changing a visual property (e.g., opacity, brightness, color) of the direction indicator (e.g., dimming the direction indicator (e.g., 614, 616)) while maintaining the visual property of the bearing indicator (e.g., not dimming the bearing indicator (e.g., 640)). In some embodiments, displaying the compass user interface (e.g., 637) includes visually changing (e.g., opacity, brightness, color, dimming) the direction indicator, the first representation of the first geographic information, and the second representation of the second geographic information, while maintaining the bearing indicator (e.g., not dimming the bearing indicator), thereby emphasizing the bearing indicator.

In some embodiments, in response to detecting the user input (e.g., 628): in accordance with a determination that the characteristic intensity of the user input does not exceed the intensity threshold (e.g., a non-zero threshold), the electronic device (e.g., 600) forgoes displaying the edit affordance (e.g., 630A). In some embodiments, the edit affordance is displayed as part of a menu user interface (e.g., 634) that include options (e.g., edit affordance 630A, clear affordance 630B) for configuring a bearing indicator (e.g., 640).

In some embodiments, displaying the compass user interface (e.g., 637, in an edit mode) includes displaying (e.g., concurrently with the direction indicator and the bearing indicator) a done affordance (e.g., 638A). In some embodiments, subsequent to changing the displayed position of the bearing indicator from the first position to the second position, the electronic device receives a second user input (e.g., 642). In some embodiments, in response to receiving the second user input: in accordance with a determination that the second user input corresponds to activation of the done affordance, the electronic device transitions from the compass user interface (e.g., 637, in an edit mode) to the second compass user interface (e.g., 612, in a navigation mode) and maintains the displayed position of the bearing indicator (e.g., 640 in FIGS. 6H-6I) in the second position (e.g., relative to a position of the direction indicator).

In some embodiments, displaying the compass user interface (e.g., 637, in an edit mode) further includes displaying (e.g., concurrently with the direction indicator and the bearing indicator) a cancel affordance (e.g., 638B). In response to receiving the second user input, and in accordance with a determination that the second user input corresponds to activation of the cancel affordance, the electronic device (e.g., 600) transitions from the compass user interface (e.g., 637, in an edit mode) to the second compass user interface (e.g., 612, in a navigation mode) and without maintaining the displayed position of the bearing indicator (e.g., 640) in the second position relative to the position of the direction indicator (and optionally reverts the displayed position of the bearing indicator to the first position).

In some embodiments, while displaying the second compass user interface (e.g., 612, a navigation mode, a first mode) including the direction indicator (e.g., 614, 616), the electronic device (e.g., 600) detects a change in orientation of the electronic device. In some embodiments, in response to detecting the change in orientation of the electronic device, the electronic device displays an indication (e.g., 613A-613B) of the amount of offset at which the electronic device is oriented relative to a fixed orientation (e.g., in comparison to horizontal or vertical) (and optionally ceasing to display the direction indicator).

In some embodiments, displaying the indication (e.g., 613A-613B) of the amount of offset at which the electronic device is oriented relative to the fixed orientation includes: in accordance with a determination that the electronic device is in a first range of orientations (e.g., substantially parallel to the ground, within a threshold range of a predefined orientation (e.g., parallel to the ground)) while detecting the change in orientation of the electronic device, the indication of the amount of offset includes a first visual object (e.g., 613A, bubble). In some embodiments, displaying the indication of the amount of offset at which the electronic device is oriented relative to the fixed orientation includes: in accordance with a determination that the electronic device is in a second range of orientations different from the first range of orientations (e.g., substantially vertical with respect to the ground, within a threshold range of a predefined orientation (e.g., vertical with respect to the ground)) while detecting the change in orientation of the electronic device, the indication of the amount of offset includes a second visual object (e.g., 613B, an arrow) that is different from the first visual object.

In some embodiments, the first visual object (e.g., 613A) includes a bubble and the bubble size increases as the electronic device becomes less parallel to the ground, and decreases as the electronic device moves to be closer to parallel to the ground. In some embodiments, the electronic device displays an animation (e.g., flashing the bubble) indicating when the first criteria are satisfied (e.g., within a threshold range of being parallel relative to the ground). In some embodiments, the second visual object (e.g., 613B) includes an arrow that points to a displayed number representing a slope angle with respect to gravity's direction.

In some embodiments, displaying the direction indicator (e.g., 614, 616) includes displaying an indication (e.g., 622) of accuracy of the direction indicator. In some embodiments, in accordance with a determination that the accuracy of the direction indicator has a first degree of accuracy, the electronic device (e.g., 600) displays the indication of accuracy with a first appearance. In some embodiments, in accordance with a determination that the accuracy of the direction indicator has a second degree of accuracy different from the first degree of accuracy, the electronic device displays the indication of accuracy with a second appearance that is different from the first appearance. Thus, the indication of the accuracy of the direction indicator visually changes in accordance with the electronic device determining that the accuracy of the direction indicator has changed. In some embodiments, the indication of the accuracy of the direction indicator includes an indication of a range (e.g., of degrees). In some embodiments, the indication (e.g., 622) includes one or more tick marks along a path of a circle, wherein as the accuracy of the direction indicator decreases the quantity of tick marks in the indication increases (e.g., 1 tick mark means high accuracy, 5 tick marks means lower accuracy). In some embodiments, the tick marks are a predefined distance from each other. In some embodiments, the indication includes visually differentiating (e.g., highlighting, changing color, enlarging) one or more tick marks (from among a plurality of tick marks along a path of a circle), wherein as the accuracy of the direction indicator decreases the quantity of tick marks visually differentiated increases (e.g., 1 differentiated tick mark means high accuracy, 5 differentiated tick marks means lower accuracy).

In some embodiments, prior to (and/or while) displaying the compass user interface (e.g., 637) (and optionally prior to (and/or while) displaying the second compass user interface (e.g., 612)), the electronic device (e.g., 600) initiates a process to detect (e.g., using one or more sensors of the electronic device) sensor data (e.g., device location, device GPS data, device orientation data). In some embodiments, initiating the process causes the device to detect data that is sufficient to use. In some embodiments, initiating the process does not cause the device to detect data that is sufficient to use (e.g., no data is detected, data detected is not complete). In some embodiments, prior to (and/or while) displaying the compass user interface (and optionally prior to (and/or while) displaying the second compass user interface): in accordance with failing to detect data that satisfies a data sufficiency criteria (e.g., insufficient GPS data, insufficient data about the orientation of the electronic device relative to the respective compass direction), the electronic device displays an indication (e.g., 652, 654) (changing a visual appearance (e.g., dimming, change opacity, swinging back-and-forth, and/or rotating) of the directional indicator (e.g., 614)) that the data sufficient criteria has not been met. In some embodiments, prior to (and/or while) displaying the compass user interface (and optionally prior to (and/or while) displaying the second compass user interface): in accordance with detecting data that satisfies the data sufficiency criteria (e.g., sufficient GPS data, sufficient data about the orientation of the electronic device relative to the respective compass direction), the electronic device forgoes displaying the indication that the data sufficient criteria has not been met.

In some embodiments, displaying the indication that the data sufficient criteria has not been met includes one or more of: dimming a portion (or all) of the compass user interface (e.g., 612) (e.g., the direction indicator (e.g., 614, 616) or a portion thereof), animating the direction indicator (e.g., moving back and forth between two positions), and causing one or more user interface elements to repeatedly flash/blink.

In some embodiments, while displaying the direction indicator (e.g., 614, 616) (e.g., as part of the navigation mode or edit mode of the compass application, when compass user interface 612 is displayed), the electronic device detects a third user input (e.g., a gesture to return to a predetermined clock face (e.g., 656, 658, 660)). In some embodiments, the third user input is one or more inputs (e.g., depresses) of the rotatable input mechanism (e.g., 604). In some embodiments, in response to detecting the third user input, the electronic device (e.g., 600) displays a clock face (e.g., 656, 658, 660) that indicates the current time, wherein the clock face further includes (current display of) a compass object (e.g., 656A-656E, 658A-658G, 660A). In some embodiments, while displaying the clock face that indicates the current time and includes the compass object, the electronic device detects activation of (e.g., tap gesture at a location on a touch-sensitive surface corresponding to the location of) the compass object. In some embodiments, in response to detecting activation of the compass object, the electronic device displays a second compass user interface (e.g., 612, in the navigation mode, not the edit mode) that includes the direction indicator (e.g., 614, 616) that provides an indication of the respective compass direction, wherein the appearance of the direction indicator is determined based on the orientation of the electronic device relative to the respective compass direction (e.g., and ceasing to display the clock face).

In some embodiments, the compass object (e.g., 656A-656E, 658A-658G, 660A) includes: a representation of a third geographic information (e.g., longitude as depicted in FIG. 6V, a geographic coordinate that specifies the east-west position of the electronic device on the Earth's surface) of the electronic device (e.g., 600) that updates as a location or orientation of the electronic device changes, and a representation of a fourth geographic information (e.g., latitude as depicted in FIG. 6V, a geographic coordinate that specifies the north-south position of the electronic device on the Earth's surface) of the electronic device that updates as the location or orientation of the electronic device changes. Exemplary geographic information of the electronic device includes: geographic coordinates (longitude, latitude) of the location electronic device, elevation (e.g., height above or below a fixed reference point (such as the surface of the Earth or sea level) as depicted in FIGS. 6S-6V) of the location of the electronic device, and incline (angle (e.g., 2°) from horizontal as depicted in FIG. 6V) of the orientation of the electronic device. In some embodiments, the electronic device concurrently displays a plurality of complications (e.g., 656A-656E, 658A-658G, 660A) (e.g., received for the same compass application) that have different geographic information. In some embodiments, the electronic device detects an input (e.g., tap gesture) at a location corresponding to a complication (e.g., a representation of geographic information). In some embodiments, in response to detecting the input at the location corresponding to the complication, the electronic device launches an application corresponding to the complication. Thus, the electronic device displays a user interface (e.g., 612) of the application (e.g., a compass application).

In some embodiments, the compass object (e.g., 656B) includes a second bearing indicator (e.g., 656B-2) that provides an indication of the offset from the respective compass direction. In some embodiments, the visual appearance of the second bearing indicator changes as the orientation of the electronic device changes with respect to a predefined direction such as north. In some embodiments, the second bearing indicator is a (colored) portion that is located between a representation of the direction in which the device is currently oriented (e.g., 300° from North in FIG. 6S) and a representation of the direction corresponding to the bearing indicator (e.g., 240° in FIG. 6S). In some embodiments, the clock face (e.g., 656) includes a complication (e.g., 656B) that includes a bearing indicator complication (e.g., 656B-2) that provides an indication of an offset from the respective compass direction.

In some embodiments, the compass object (e.g., 656B) includes an orientation indicator (e.g., 656B-1, a dial, a needle that slides across a scale, a scale that slides past a needle) that moves laterally on the display (e.g., does not rotate around a point on the display), wherein the orientation indicator provides an indication of the orientation of the electronic device (e.g., as the device detects changes in the orientation of the electronic device). In some embodiments, the clock face (e.g., 656) includes a complication (e.g., 656B) that includes needle/dial (e.g., 656B-1) that moves laterally on the display (e.g., instead of rotating) as the orientation of the electronic device changes, wherein the needle/dial indicates a direction in which the electronic device (e.g., 600) is oriented (e.g., a direction relative to the earth's magnetic field such as a cardinal direction (e.g., north (e.g., true north, magnetic north), south, west, east)). Providing an indication of the orientation of the electronic device provides the user with visual feedback about the orientation of the user in relation to the set bearing. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Subsequent to displaying the compass user interface (e.g., 637) (e.g., and after the bearing has been set (e.g., via input 642)), the electronic device (e.g., 600) displays (710), via the display device (e.g., 602), a third compass user interface (e.g., 612 in FIG. 6I) (e.g., a navigation mode, a first mode) with the direction indicator (e.g., 614, 616) and the bearing indicator (e.g., 640), wherein a visual appearance of the bearing indicator changes as the orientation of the electronic device changes (relative to a predefined direction such as north) (e.g., as depicted in FIGS. 6I-6K). In some embodiments, the visual appearance of the bearing indicator (e.g., 640) changes while the third compass user interface (e.g., 612) is displayed. Changing the visual appearance of the bearing indicator as the orientation of the electronic device changes provides the user with visual feedback about the orientation of the electronic device and the user in relation to the set bearing. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to provide certain compass application features. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enhance compass application features. Accordingly, use of such personal information data enables users to have a richer experience within the compass application. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of a compass application, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, location data can be inferred based on non-personal information data or a bare minimum amount of personal information, other non-personal information available to the compass application, or publicly available information.

What is claimed is:

1. An electronic device, comprising:
a display device;
a rotatable input mechanism;
one or more processors; and
memory storing one or more programs configured to be executed by the one or more processors, the one or more programs including instructions for:
displaying, via the display device, a compass user interface with a direction indicator and a bearing indicator, wherein:
the direction indicator provides an indication of a respective compass direction, wherein an appearance of the direction indicator is determined based on an orientation of the electronic device relative to the respective compass direction; and
the bearing indicator provides an indication of an offset from the respective compass direction;

while concurrently displaying, via the display device, the direction indicator and the bearing indicator, detecting rotation of the rotatable input mechanism; and in response to detecting rotation of the rotatable input mechanism:
in accordance with a determination that the electronic device is in a first mode, changing the displayed position of the bearing indicator from a first position to a second position by an amount that is determined in accordance with a magnitude of the rotation of the rotatable input mechanism; and
in accordance with a determination that the electronic device is in a second mode different from the first mode:
forgoing changing the displayed position of the bearing indicator relative to the direction indicator; and
scrolling the compass user interface.

2. The electronic device of claim 1, the one or more programs further including instructions for:
prior to displaying the compass user interface, displaying, via the display device, a second compass user interface with the direction indicator and the bearing indicator, wherein:
the direction indicator provides an indication of the respective compass direction, wherein the appearance of the direction indicator is determined based on the orientation of the electronic device relative to the respective compass direction; and
the bearing indicator provides an indication of an offset from the respective compass direction;
while displaying the bearing indicator, detecting rotation of the rotatable input mechanism; and
in response to detecting rotation of the rotatable input mechanism, forgoing changing the displayed position of the bearing indicator relative to the direction indicator.

3. The electronic device of claim 2, wherein the electronic device includes a touch-sensitive surface, the one or more programs further including instructions for:
prior to displaying the compass user interface, displaying, via the display device, the second compass user interface with the direction indicator, wherein:
the direction indicator provides an indication of the respective compass direction, wherein the appearance of the direction indicator is determined based on the orientation of the electronic device relative to the respective compass direction; and
detecting, via the touch-sensitive surface, a user input; and
in response to detecting the user input:
in accordance with a determination that a characteristic intensity of the user input exceeds an intensity threshold, displaying an edit affordance which, when selected, results in display of the compass user interface; and
in accordance with a determination that the characteristic intensity of the user input does not exceed the intensity threshold, forgoing displaying the edit affordance.

4. The electronic device of claim 3, the one or more programs further including instructions for:
in response to detecting the user input:
in accordance with a determination that the second compass user interface includes the bearing indicator, displaying, via the display device, a clear affordance which, when selected, initiates a process for removing the bearing indicator from the second compass user interface, wherein the clear affordance is concurrently displayed with the edit affordance.

5. The electronic device of claim 2, wherein displaying the compass user interface includes displaying a done affordance, the one or more programs further including instructions for:
subsequent to changing the displayed position of the bearing indicator from the first position to the second position, receiving a second user input; and
in response to receiving the second user input:
in accordance with a determination that the second user input corresponds to activation of the done affordance, transitioning from the compass user interface to the second compass user interface and maintaining the displayed position of the bearing indicator in the second position.

6. The electronic device of claim 2, the one or more programs further including instructions for:
while displaying the second compass user interface including the direction indicator, detecting a change in orientation of the electronic device; and
in response to detecting the change in orientation of the electronic device, displaying an indication of the amount of offset at which the electronic device is oriented relative to a fixed orientation.

7. The electronic device of claim 6, wherein displaying the indication of the amount of offset at which the electronic device is oriented relative to the fixed orientation includes:
in accordance with a determination that the electronic device is in a first range of orientations while detecting the change in orientation of the electronic device, the indication of the amount of offset includes a first visual object; and
in accordance with a determination that the electronic device is in a second range of orientations different from the first range of orientations while detecting the change in orientation of the electronic device, the indication of the amount of offset includes a second visual object that is different from the first visual object.

8. The electronic device of claim 1, wherein displaying the compass user interface further includes:
displaying, via the display device, a first representation of a first geographic information of the electronic device and a second representation of a second geographic information of the electronic device.

9. The electronic device of claim 8, the one or more programs further including instructions for:
while displaying the first representation of the first geographic information at a first size and the second representation of the second geographic information at a second size, detecting a scroll input that includes a directional component; and
in response to detecting the scroll input, shifting the compass user interface in accordance with the directional component to display:
a third representation of the first geographic information at a third size that is larger than the first size and a fourth representation of the second geographic information at a fourth size that is larger than the second size.

10. The electronic device of claim 9, wherein the displayed third representation of the first geographic information and the fourth representation of the second geographic information are updated to reflect an updated location or orientation of the electronic device.

11. The electronic device of claim 1, wherein displaying the direction indicator includes displaying an indication of accuracy of the direction indicator, the one or more programs further including instructions for:
in accordance with a determination that the accuracy of the direction indicator has a first degree of accuracy, displaying the indication of accuracy with a first appearance; and
in accordance with a determination that the accuracy of the direction indicator has a second degree of accuracy different from the first degree of accuracy, displaying the indication of accuracy with a second appearance that is different from the first appearance.

12. The electronic device of claim 1, the one or more programs further including instructions for:
prior to displaying the compass user interface:
initiating a process to detect sensor data;
in accordance with failing to detect data that satisfies a data sufficiency criteria, displaying an indication that the data sufficient criteria has not been met; and
in accordance with detecting data that satisfies the data sufficiency criteria, forgoing displaying the indication that the data sufficient criteria has not been met.

13. The electronic device of claim 1, the one or more programs further including instructions for:
while displaying the direction indicator, detecting a third user input;
in response to detecting the third user input, displaying a clock face that indicates the current time, wherein the clock face further includes a compass object;
while displaying the clock face that indicates the current time and includes the compass object, detecting activation of the compass object; and
in response to detecting activation of the compass object, displaying a second compass user interface that includes the direction indicator that provides an indication of the respective compass direction, wherein the appearance of the direction indicator is determined based on the orientation of the electronic device relative to the respective compass direction.

14. The electronic device of claim 13, wherein the compass object includes:
a representation of a third geographic information of the electronic device that updates as a location or orientation of the electronic device changes, and
a representation of a fourth geographic information of the electronic device that updates as the location or orientation of the electronic device changes.

15. The electronic device of claim 13, wherein the compass object includes:
a second bearing indicator that provides an indication of the offset from the respective compass direction.

16. The electronic device of claim 13, wherein the compass object includes:
an orientation indicator that moves laterally on the display, wherein the orientation indicator provides an indication of the orientation of the electronic device.

17. The electronic device of claim 1, the one or more programs further including instructions for:
subsequent to displaying the compass user interface, displaying, via the display device, a third compass user interface with the direction indicator and the bearing indicator, wherein a visual appearance of the bearing indicator changes as the orientation of the electronic device changes.

18. A non-transitory computer-readable storage medium storing one or more programs configured to be executed by one or more processors of an electronic device with a display device and a rotatable input mechanism, the one or more programs including instructions for:
displaying, via the display device, a compass user interface with a direction indicator and a bearing indicator, wherein:
the direction indicator provides an indication of a respective compass direction, wherein an appearance of the direction indicator is determined based on an orientation of the electronic device relative to the respective compass direction; and
the bearing indicator provides an indication of an offset from the respective compass direction;
while concurrently displaying, via the display device, the direction indicator and the bearing indicator, detecting rotation of the rotatable input mechanism; and
in response to detecting rotation of the rotatable input mechanism:
in accordance with a determination that the electronic device is in a first mode, changing the displayed position of the bearing indicator from a first position to a second position by an amount that is determined in accordance with a magnitude of the rotation of the rotatable input mechanism; and
in accordance with a determination that the electronic device is in a second mode different from the first mode:
forgoing changing the displayed position of the bearing indicator relative to the direction indicator; and
scrolling the compass user interface.

19. The non-transitory computer-readable storage medium of claim 18, the one or more programs further including instructions for:
prior to displaying the compass user interface, displaying, via the display device, a second compass user interface with the direction indicator and the bearing indicator, wherein:
the direction indicator provides an indication of the respective compass direction, wherein the appearance of the direction indicator is determined based on the orientation of the electronic device relative to the respective compass direction; and
the bearing indicator provides an indication of an offset from the respective compass direction;
while displaying the bearing indicator, detecting rotation of the rotatable input mechanism; and
in response to detecting rotation of the rotatable input mechanism, forgoing changing the displayed position of the bearing indicator relative to the direction indicator.

20. The non-transitory computer-readable storage medium of claim 19, wherein the electronic device includes a touch-sensitive surface, the one or more programs further including instructions for:
prior to displaying the compass user interface, displaying, via the display device, the second compass user interface with the direction indicator, wherein:
the direction indicator provides an indication of the respective compass direction, wherein the appearance of the direction indicator is determined based on the orientation of the electronic device relative to the respective compass direction; and detecting, via the touch-sensitive surface, a user input; and in response to detecting the user input:
in accordance with a determination that a characteristic intensity of the user input exceeds an intensity threshold, displaying an edit affordance which, when selected, results in display of the compass user interface; and
in accordance with a determination that the characteristic intensity of the user input does not exceed the intensity threshold, forgoing displaying the edit affordance.

21. The non-transitory computer-readable storage medium of claim 20, the one or more programs further including instructions for:
in response to detecting the user input:
in accordance with a determination that the second compass user interface includes the bearing indicator, displaying, via the display device, a clear affordance which, when selected, initiates a process for removing the bearing indicator from the second compass user interface, wherein the clear affordance is concurrently displayed with the edit affordance.

22. The non-transitory computer-readable storage medium of claim 19, wherein displaying the compass user interface includes displaying a done affordance, the one or more programs further including instructions for:
subsequent to changing the displayed position of the bearing indicator from the first position to the second position, receiving a second user input; and
in response to receiving the second user input:
in accordance with a determination that the second user input corresponds to activation of the done affordance, transitioning from the compass user interface to the second compass user interface and maintaining the displayed position of the bearing indicator in the second position.

23. The non-transitory computer-readable storage medium of claim 19, the one or more programs further including instructions for:
while displaying the second compass user interface including the direction indicator, detecting a change in orientation of the electronic device; and
in response to detecting the change in orientation of the electronic device, displaying an indication of the amount of offset at which the electronic device is oriented relative to a fixed orientation.

24. The non-transitory computer-readable storage medium of claim 23, wherein displaying the indication of the amount of offset at which the electronic device is oriented relative to the fixed orientation includes:
in accordance with a determination that the electronic device is in a first range of orientations while detecting the change in orientation of the electronic device, the indication of the amount of offset includes a first visual object; and
in accordance with a determination that the electronic device is in a second range of orientations different from the first range of orientations while detecting the change in orientation of the electronic device, the indication of the amount of offset includes a second visual object that is different from the first visual object.

25. The non-transitory computer-readable storage medium of claim 18, wherein displaying the compass user interface further includes:
displaying, via the display device, a first representation of a first geographic information of the electronic device and a second representation of a second geographic information of the electronic device.

26. The non-transitory computer-readable storage medium of claim 25, the one or more programs further including instructions for:
while displaying the first representation of the first geographic information at a first size and the second representation of the second geographic information at a second size, detecting a scroll input that includes a directional component; and
in response to detecting the scroll input, shifting the compass user interface in accordance with the directional component to display:
a third representation of the first geographic information at a third size that is larger than the first size and a fourth representation of the second geographic information at a fourth size that is larger than the second size.

27. The non-transitory computer-readable storage medium of claim 26, wherein the displayed third representation of the first geographic information and the fourth representation of the second geographic information are updated to reflect an updated location or orientation of the electronic device.

28. The non-transitory computer-readable storage medium of claim 18, wherein displaying the direction indicator includes displaying an indication of accuracy of the direction indicator, the one or more programs further including instructions for:
in accordance with a determination that the accuracy of the direction indicator has a first degree of accuracy, displaying the indication of accuracy with a first appearance; and
in accordance with a determination that the accuracy of the direction indicator has a second degree of accuracy different from the first degree of accuracy, displaying the indication of accuracy with a second appearance that is different from the first appearance.

29. The non-transitory computer-readable storage medium of claim 18, the one or more programs further including instructions for:
prior to displaying the compass user interface:
initiating a process to detect sensor data;
in accordance with failing to detect data that satisfies a data sufficiency criteria, displaying an indication that the data sufficient criteria has not been met; and
in accordance with detecting data that satisfies the data sufficiency criteria, forgoing displaying the indication that the data sufficient criteria has not been met.

30. The non-transitory computer-readable storage medium of claim 18, the one or more programs further including instructions for:
while displaying the direction indicator, detecting a third user input;
in response to detecting the third user input, displaying a clock face that indicates the current time, wherein the clock face further includes a compass object;
while displaying the clock face that indicates the current time and includes the compass object, detecting activation of the compass object; and
in response to detecting activation of the compass object, displaying a second compass user interface that includes the direction indicator that provides an indication of the respective compass direction, wherein the appearance of the direction indicator is determined based on the orientation of the electronic device relative to the respective compass direction.

31. The non-transitory computer-readable storage medium of claim 30, wherein the compass object includes:
a representation of a third geographic information of the electronic device that updates as a location or orientation of the electronic device changes, and
a representation of a fourth geographic information of the electronic device that updates as the location or orientation of the electronic device changes.

32. The non-transitory computer-readable storage medium of claim 30, wherein the compass object includes:
a second bearing indicator that provides an indication of the offset from the respective compass direction.

33. The non-transitory computer-readable storage medium of claim 30, wherein the compass object includes:
an orientation indicator that moves laterally on the display, wherein the orientation indicator provides an indication of the orientation of the electronic device.

34. The non-transitory computer-readable storage medium of claim 18, the one or more programs further including instructions for:
subsequent to displaying the compass user interface, displaying, via the display device, a third compass user interface with the direction indicator and the bearing indicator, wherein a visual appearance of the bearing indicator changes as the orientation of the electronic device changes.

35. A method, comprising:
at an electronic device with a display device and a rotatable input mechanism:
displaying, via the display device, a compass user interface with a direction indicator and a bearing indicator, wherein:
the direction indicator provides an indication of a respective compass direction, wherein an appearance of the direction indicator is determined based on an orientation of the electronic device relative to the respective compass direction; and
the bearing indicator provides an indication of an offset from the respective compass direction;
while concurrently displaying, via the display device, the direction indicator and the bearing indicator, detecting rotation of the rotatable input mechanism; and
in response to detecting rotation of the rotatable input mechanism:
in accordance with a determination that the electronic device is in a first mode, changing the displayed position of the bearing indicator from a first position to a second position by an amount that is determined in accordance with a magnitude of the rotation of the rotatable input mechanism; and
in accordance with a determination that the electronic device is in a second mode different from the first mode:
forgoing changing the displayed position of the bearing indicator relative to the direction indicator; and
scrolling the compass user interface.

36. The method of claim 35, further comprising:
prior to displaying the compass user interface, displaying, via the display device, a second compass user interface with the direction indicator and the bearing indicator, wherein:
the direction indicator provides an indication of the respective compass direction, wherein the appearance of the direction indicator is determined based on the orientation of the electronic device relative to the respective compass direction; and
the bearing indicator provides an indication of an offset from the respective compass direction;
while displaying the bearing indicator, detecting rotation of the rotatable input mechanism; and
in response to detecting rotation of the rotatable input mechanism, forgoing changing the displayed position of the bearing indicator relative to the direction indicator.

37. The method of claim 36, wherein the electronic device includes a touch-sensitive surface, further comprising:
prior to displaying the compass user interface, displaying, via the display device, the second compass user interface with the direction indicator, wherein:
the direction indicator provides an indication of the respective compass direction, wherein the appearance of the direction indicator is determined based on the orientation of the electronic device relative to the respective compass direction; and
detecting, via the touch-sensitive surface, a user input; and
in response to detecting the user input:
in accordance with a determination that a characteristic intensity of the user input exceeds an intensity threshold, displaying an edit affordance which, when selected, results in display of the compass user interface; and
in accordance with a determination that the characteristic intensity of the user input does not exceed the intensity threshold, forgoing displaying the edit affordance.

38. The method of claim 37, further comprising:
in response to detecting the user input:
in accordance with a determination that the second compass user interface includes the bearing indicator, displaying, via the display device, a clear affordance which, when selected, initiates a process for removing the bearing indicator from the second compass user interface, wherein the clear affordance is concurrently displayed with the edit affordance.

39. The method of claim 36, wherein displaying the compass user interface includes displaying a done affordance, further comprising:
subsequent to changing the displayed position of the bearing indicator from the first position to the second position, receiving a second user input; and
in response to receiving the second user input:
in accordance with a determination that the second user input corresponds to activation of the done affordance, transitioning from the compass user interface to the second compass user interface and maintaining the displayed position of the bearing indicator in the second position.

40. The method of claim 36, further comprising:
while displaying the second compass user interface including the direction indicator, detecting a change in orientation of the electronic device; and
in response to detecting the change in orientation of the electronic device, displaying an indication of the amount of offset at which the electronic device is oriented relative to a fixed orientation.

41. The method of claim 40, wherein displaying the indication of the amount of offset at which the electronic device is oriented relative to the fixed orientation includes:
in accordance with a determination that the electronic device is in a first range of orientations while detecting the change in orientation of the electronic device, the indication of the amount of offset includes a first visual object; and in accordance with a determination that the electronic device is in a second range of orientations different from the first range of orientations while detecting the change in orientation of the electronic device, the indication of the amount of offset includes a second visual object that is different from the first visual object.

42. The method of claim 35, wherein displaying the compass user interface further includes:

displaying, via the display device, a first representation of a first geographic information of the electronic device and a second representation of a second geographic information of the electronic device.

43. The method of claim 42, further comprising:

while displaying the first representation of the first geographic information at a first size and the second representation of the second geographic information at a second size, detecting a scroll input that includes a directional component; and in response to detecting the scroll input, shifting the compass user interface in accordance with the directional component to display:

a third representation of the first geographic information at a third size that is larger than the first size and a fourth representation of the second geographic information at a fourth size that is larger than the second size.

44. The method of claim 43, wherein the displayed third representation of the first geographic information and the fourth representation of the second geographic information are updated to reflect an updated location or orientation of the electronic device.

45. The method of claim 35, wherein displaying the direction indicator includes displaying an indication of accuracy of the direction indicator, further comprising:

in accordance with a determination that the accuracy of the direction indicator has a first degree of accuracy, displaying the indication of accuracy with a first appearance; and in accordance with a determination that the accuracy of the direction indicator has a second degree of accuracy different from the first degree of accuracy, displaying the indication of accuracy with a second appearance that is different from the first appearance.

46. The method of claim 35, further comprising:
prior to displaying the compass user interface:
initiating a process to detect sensor data;
in accordance with failing to detect data that satisfies a data sufficiency criteria, displaying an indication that the data sufficient criteria has not been met; and
in accordance with detecting data that satisfies the data sufficiency criteria, forgoing displaying the indication that the data sufficient criteria has not been met.

47. The method of claim 35, further comprising:
while displaying the direction indicator, detecting a third user input;
in response to detecting the third user input, displaying a clock face that indicates the current time, wherein the clock face further includes a compass object;
while displaying the clock face that indicates the current time and includes the compass object, detecting activation of the compass object; and
in response to detecting activation of the compass object, displaying a second compass user interface that includes the direction indicator that provides an indication of the respective compass direction, wherein the appearance of the direction indicator is determined based on the orientation of the electronic device relative to the respective compass direction.

48. The method of claim 47, wherein the compass object includes:
a representation of a third geographic information of the electronic device that updates as a location or orientation of the electronic device changes, and
a representation of a fourth geographic information of the electronic device that updates as the location or orientation of the electronic device changes.

49. The method of claim 47, wherein the compass object includes:
a second bearing indicator that provides an indication of the offset from the respective compass direction.

50. The method of claim 47, wherein the compass object includes:
an orientation indicator that moves laterally on the display, wherein the orientation indicator provides an indication of the orientation of the electronic device.

51. The method of claim 35, further comprising:
subsequent to displaying the compass user interface, displaying, via the display device, a third compass user interface with the direction indicator and the bearing indicator, wherein a visual appearance of the bearing indicator changes as the orientation of the electronic device changes.

* * * * *